United States Patent
Smith et al.

(10) Patent No.: US 10,587,866 B2
(45) Date of Patent: *Mar. 10, 2020

(54) PARALLAX BARRIER WITH INDEPENDENTLY CONTROLLABLE REGIONS

(71) Applicant: Sharp Kabushiki Kaisha, Osaka (JP)

(72) Inventors: Nathan James Smith, Oxford (GB); Hywel Hopkin, Oxford (GB); Takehiro Murao, Osaka (JP); Ryoh Kikuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 47 days.

This patent is subject to a terminal disclaimer.

(21) Appl. No.: 15/741,073

(22) PCT Filed: Jul. 14, 2016

(86) PCT No.: PCT/JP2016/003335
§ 371 (c)(1),
(2) Date: Dec. 29, 2017

(87) PCT Pub. No.: WO2017/010105
PCT Pub. Date: Jan. 19, 2017

(65) Prior Publication Data
US 2018/0192038 A1 Jul. 5, 2018

(30) Foreign Application Priority Data
Jul. 14, 2015 (GB) .................................. 1512309.4

(51) Int. Cl.
*H04N 13/31* (2018.01)
*G02B 27/22* (2018.01)
(Continued)

(52) U.S. Cl.
CPC ......... *H04N 13/31* (2018.05); *G02B 27/2214* (2013.01); *G02F 1/29* (2013.01);
(Continued)

(58) Field of Classification Search
CPC ........... H04N 13/0409; H04N 13/0468; H04N 13/0497; H04N 13/302; G02F 1/0018;
(Continued)

(56) References Cited

U.S. PATENT DOCUMENTS 5,969,850 A    10/1999  Harrold et al.
6,310,675 B1 * 10/2001  Yaniv ................ G02F 1/134363
                                                    349/141
(Continued)

FOREIGN PATENT DOCUMENTS

EP       0833183       4/1998
EP       1816510       8/2007
(Continued)

OTHER PUBLICATIONS

International Search Report for PCT/JP2016/003334, dated Sep. 27, 2016, which corresponds to related U.S. Appl. No. 15/742,506, filed Jan. 6, 2018.
(Continued)

*Primary Examiner* — Thai Q Tran
*Assistant Examiner* — Syed Y Hasan
(74) *Attorney, Agent, or Firm* — Renner, Otto, Boisselle & Sklar, LLP

(57) ABSTRACT

A reconfigurable parallax barrier panel comprising an electro-optic material has a first region, a second region and a first compensation region. First electrodes are addressable to define, in the first region of the panel, a parallax barrier array selected from a plurality of predetermined parallax barrier arrays, and second electrodes are addressable define, in the second region of the panel, independently of the first par-
(Continued)

allax barrier array, a parallax barrier array selected from the plurality of predetermined parallax barrier arrays. Electrodes of the first compensation region are addressable to define, dependent on the first parallax barrier array and on the second parallax barrier array, at least one slit and/or at least one barrier between the first region and the second region. Where the first electrodes are addressed to define a first one of the predetermined parallax barrier arrays in the first region and the second electrodes are addressed to define a second, different one of the predetermined parallax barrier arrays in the second region, the electrodes of the first compensation region may define the at least one slit and/or at least one barrier to at least partially obscure any line artefact at the transition between the first one of the predetermined parallax barrier arrays and the second one of the predetermined parallax barrier arrays.

27 Claims, 37 Drawing Sheets

(51) Int. Cl.
| | | |
|---|---|---|
| *H04N 13/373* | (2018.01) | |
| *H04N 13/398* | (2018.01) | |
| *G02F 1/29* | (2006.01) | |
| *H04N 13/366* | (2018.01) | |
| *G02F 1/00* | (2006.01) | |
| *G02F 1/1333* | (2006.01) | |

(52) U.S. Cl.
CPC ......... *H04N 13/373* (2018.05); *H04N 13/398* (2018.05); *G02F 1/0018* (2013.01); *G02F 1/133345* (2013.01); *H04N 13/366* (2018.05); *H04N 2213/001* (2013.01)

(58) Field of Classification Search
CPC .................. G02F 1/29; G02F 1/133345; G02F 1/134309; G02F 1/133509; G02B 6/0056; G02B 27/2214
USPC ........ 348/51, 42; 349/15, 96, 104, 138, 141, 349/143; 359/245, 464
See application file for complete search history.

(56) References Cited

U.S. PATENT DOCUMENTS

| | | | |
|---|---|---|---|
| 7,813,042 B2 | 10/2010 | Mather et al. | |
| 8,018,482 B2 * | 9/2011 | Kim | H04N 13/351 348/42 |
| 8,331,023 B2 | 12/2012 | Wu et al. | |
| 8,629,945 B2 | 1/2014 | Lo | |
| 2007/0183015 A1 * | 8/2007 | Jacobs | G02F 1/1323 359/245 |
| 2009/0102990 A1 * | 4/2009 | Walton | G02F 1/1323 349/15 |
| 2010/0110316 A1 | 5/2010 | Huang et al. | |
| 2011/0001894 A1 | 1/2011 | Owaku | |
| 2011/0006979 A1 | 1/2011 | Min | |
| 2011/0157171 A1 | 6/2011 | Lin | |
| 2011/0169913 A1 | 7/2011 | Karaoguz | |
| 2012/0194509 A1 | 8/2012 | Yun | |
| 2012/0200680 A1 | 8/2012 | So et al. | |
| 2012/0268704 A1 * | 10/2012 | Inoue | G02B 27/2214 349/143 |
| 2013/0021329 A1 | 1/2013 | Sakamoto et al. | |
| 2013/0088653 A1 | 4/2013 | Lee | |
| 2013/0100101 A1 | 4/2013 | Li | |
| 2013/0187961 A1 | 7/2013 | Hunt | |
| 2013/0293534 A1 | 11/2013 | Sato | |
| 2013/0342586 A1 | 12/2013 | Kim et al. | |
| 2014/0022241 A1 | 1/2014 | Lee | |
| 2014/0078268 A1 | 3/2014 | Watanabe et al. | |
| 2014/0192298 A1 * | 7/2014 | Sumiyoshi | G02F 1/134336 349/96 |
| 2014/0198099 A1 | 7/2014 | Tseng et al. | |
| 2016/0037155 A1 | 2/2016 | Yoshino et al. | |
| 2016/0261857 A1 | 9/2016 | Kikuchi et al. | |
| 2016/0286206 A1 | 9/2016 | Yoshino et al. | |
| 2018/0205942 A1 | 7/2018 | Smith | |

FOREIGN PATENT DOCUMENTS

| | | |
|---|---|---|
| WO | WO 2014/092172 | 6/2014 |
| WO | WO 2014/136610 | 9/2014 |
| WO | WO 2014/141813 | 9/2014 |
| WO | WO 2015/060002 | 4/2015 |
| WO | WO 2015/060011 | 4/2015 |

OTHER PUBLICATIONS

Non-Final Office Action for related U.S. Appl. No. 15/742,506, dated Jan. 24, 2019.
International Search Report for PCT/JP2016/003335, dated Sep. 13, 2016.

* cited by examiner

Figure 9

| Slit Position Number | Electrode | | | | | | | | | | | |
|---|---|---|---|---|---|---|---|---|---|---|---|---|
| | E1 | E2 | E3 | E4 | E5 | E6 | E7 | E8 | E9 | E10 | E11 | E12 |
| 1 | 0 | 0 | 0 | 0 | 0 | 0 | 0 | 0 | 1 | 1 | 1 | 0 |
| 2 | 0 | 0 | 1 | 1 | 1 | 0 | 0 | 0 | 0 | 0 | 0 | 0 |
| 3 | 0 | 0 | 0 | 0 | 0 | 0 | 0 | 0 | 0 | 1 | 1 | 1 |
| 4 | 0 | 0 | 0 | 1 | 1 | 1 | 0 | 0 | 0 | 0 | 0 | 0 |
| 5 | 0 | 0 | 0 | 0 | 0 | 0 | 1 | 0 | 0 | 0 | 1 | 1 |
| 6 | 1 | 0 | 0 | 0 | 1 | 1 | 0 | 0 | 0 | 0 | 0 | 0 |
| 7 | 0 | 0 | 0 | 0 | 0 | 0 | 1 | 1 | 0 | 0 | 0 | 1 |
| 8 | 1 | 1 | 0 | 0 | 0 | 1 | 0 | 0 | 0 | 0 | 0 | 0 |
| 9 | 0 | 0 | 0 | 0 | 0 | 0 | 1 | 1 | 1 | 0 | 0 | 0 |
| 10 | 1 | 1 | 1 | 0 | 0 | 0 | 0 | 0 | 0 | 0 | 0 | 0 |
| 11 | 0 | 0 | 0 | 0 | 0 | 0 | 0 | 1 | 1 | 1 | 0 | 0 |
| 12 | 0 | 1 | 1 | 1 | 0 | 0 | 0 | 0 | 0 | 0 | 0 | 0 |

Figure 13

| Viewing Distance (mm) | Slit Position Number in Region | | | | | | | | |
|---|---|---|---|---|---|---|---|---|---|
| | R1 | R2 | R3 | R4 | R5 | R6 | R7 | R8 | R9 |
| 580 | 9 | 8 | 8 | 7 | 7 | 7 | 6 | 6 | 5 |
| 610 | 8 | 8 | 8 | 7 | 7 | 7 | 6 | 6 | 6 |
| 650 | 8 | 8 | 7 | 7 | 7 | 7 | 7 | 6 | 6 |
| 690 | 8 | 7 | 7 | 7 | 7 | 7 | 7 | 7 | 6 |
| 730 | 7 | 7 | 7 | 7 | 7 | 7 | 7 | 7 | 7 |
| 770 | 6 | 7 | 7 | 7 | 7 | 7 | 7 | 7 | 8 |
| 810 | 6 | 6 | 7 | 7 | 7 | 7 | 7 | 8 | 8 |
| 850 | 6 | 6 | 6 | 7 | 7 | 7 | 8 | 8 | 8 |
| 900 | 5 | 6 | 6 | 7 | 7 | 7 | 8 | 8 | 9 |

Figure 24

| Slit Position Number | | Sub-Region 1 electrodes state | | | | | | | |
|---|---|---|---|---|---|---|---|---|---|
| Region 1 | Region 2 | SR1E2 | SR1E1 | SR1E6 | SR1E5 | SR1E8 | SR1E7 | SR1E12 | SR1E11 |
| 1 | 1 | 0 | 0 | 0 | 0 | 0 | 0 | 0 | 1 |
| 2 | 2 | 0 | 0 | 0 | 1 | 0 | 0 | 0 | 0 |
| 3 | 3 | 0 | 0 | 1 | 0 | 0 | 0 | 1 | 1 |
| 4 | 4 | 0 | 1 | 0 | 1 | 0 | 1 | 0 | 0 |
| 5 | 5 | 0 | 0 | 1 | 0 | 0 | 0 | 1 | 1 |
| 6 | 6 | 0 | 1 | 1 | 0 | 0 | 1 | 0 | 0 |
| 7 | 7 | 1 | 0 | 1 | 0 | 1 | 0 | 1 | 0 |
| 8 | 8 | 0 | 1 | 0 | 0 | 0 | 1 | 0 | 0 |
| 9 | 9 | 1 | 0 | 0 | 0 | 1 | 0 | 0 | 0 |
| 10 | 10 | 0 | 0 | 0 | 0 | 0 | 0 | 0 | 0 |
| 11 | 11 | 0 | 0 | 0 | 0 | 0 | 0 | 0 | 0 |
| 12 | 12 | 1 | 0 | 0 | 0 | 0 | 0 | 0 | 0 |

Figure 26

| Bright Line entry | Slit position number | | Sub-Region 1 electrode state (Bright Line) | | | | | | | | Multiplex with Dark Line entry |
|---|---|---|---|---|---|---|---|---|---|---|---|
| | Region 1 | Region 2 | SR1E2 | SR1E1 | SR1E6 | SR1E5 | SR1E8 | SR1E7 | SR1E12 | SR1E11 | |
| 1 | 12 | 1 | 0 | 0 | 0 | 0 | 0 | 0 | 0 | 1 | 1 |
| 2 | 12 | 1 | 1 | 0 | 0 | 0 | 0 | 0 | 0 | 0 | 1 |
| 3 | 1 | 2 | 0 | 0 | 0 | 0 | 0 | 0 | 0 | 1 | 2 |
| 4 | 2 | 3 | 0 | 0 | 0 | 0 | 0 | 0 | 0 | 1 | 3 |
| 5 | 3 | 4 | 0 | 0 | 0 | 1 | 0 | 0 | 1 | 0 | 4 |
| 6 | 4 | 5 | 0 | 0 | 1 | 0 | 0 | 0 | 0 | 1 | 5 |
| 7 | 5 | 6 | 0 | 0 | 0 | 1 | 0 | 1 | 1 | 0 | 6 |
| 8 | 5 | 6 | 0 | 1 | 1 | 0 | 0 | 1 | 0 | 0 | 7 |
| 9 | 6 | 7 | 0 | 0 | 1 | 0 | 1 | 0 | 1 | 0 | 8 |
| 10 | 6 | 7 | 1 | 1 | 0 | 0 | 0 | 1 | 0 | 0 | 9 |
| 11 | 7 | 8 | 0 | 1 | 0 | 0 | 1 | 0 | 0 | 0 | 10 |
| 12 | 7 | 8 | 1 | 0 | 0 | 0 | 0 | 0 | 0 | 0 | 11 |
| 13 | 8 | 9 | 0 | 0 | 0 | 0 | 0 | 0 | 0 | 0 | 12 |
| 14 | 9 | 10 | 0 | 0 | 0 | 0 | 0 | 0 | 0 | 0 | 13 |
| 15 | 10 | 11 | 0 | 0 | 0 | 0 | 0 | 0 | 0 | 0 | 14 |
| 16 | 11 | 12 | 0 | 0 | 0 | 0 | 0 | 0 | 0 | 0 | 15 |

Figure 28

| Dark Line entry | Slit position number | | Sub-Region 1 electrode state (Dark Line) | | | | | | | | Multiplex with Bright Line entry |
|---|---|---|---|---|---|---|---|---|---|---|---|
| | Region 1 | Region 2 | SR1E2 | SR1E1 | SR1E6 | SR1E5 | SR1E8 | SR1E7 | SR1E12 | SR1E11 | |
| 1 | 12 | 1 | 1 | 0 | 0 | 0 | 0 | 0 | 0 | 1 | 1 or 2 |
| 2 | 1 | 2 | 0 | 0 | 0 | 1 | 0 | 0 | 0 | 0 | 3 |
| 3 | 2 | 3 | 0 | 0 | 1 | 0 | 0 | 0 | 1 | 1 | 4 |
| 4 | 3 | 4 | 0 | 1 | 1 | 1 | 0 | 1 | 0 | 0 | 5 |
| 5 | 4 | 5 | 0 | 0 | 0 | 0 | 0 | 0 | 1 | 1 | 6 |
| 6 | 5 | 6 | 0 | 1 | 1 | 1 | 0 | 1 | 0 | 0 | 7 |
| 7 | 5 | 6 | 0 | 0 | 0 | 0 | 1 | 1 | 1 | 0 | 8 |
| 8 | 6 | 7 | 1 | 1 | 1 | 0 | 1 | 0 | 0 | 0 | 9 |
| 9 | 6 | 7 | 1 | 1 | 1 | 0 | 0 | 0 | 0 | 0 | 10 |
| 10 | 7 | 8 | 0 | 0 | 0 | 0 | 1 | 1 | 0 | 0 | 11 |
| 11 | 7 | 8 | 1 | 1 | 0 | 0 | 0 | 0 | 0 | 0 | 12 |
| 12 | 8 | 9 | 0 | 0 | 0 | 0 | 0 | 0 | 0 | 0 | 13 |
| 13 | 9 | 10 | 1 | 1 | 0 | 0 | 1 | 0 | 0 | 0 | 14 |
| 14 | 10 | 11 | 0 | 0 | 0 | 0 | 0 | 0 | 0 | 0 | 15 |
| 15 | 11 | 12 | 0 | 0 | 0 | 0 | 1 | 0 | 0 | 0 | 16 |

Figure 30

| Bright Line entry | Slit position number | | Sub-Region 1 electrode state (Bright Line) | | | | | | | | Multiplex with Dark Line entry |
|---|---|---|---|---|---|---|---|---|---|---|---|
| | Region 1 | Region 2 | SR1E2 | SR1E1 | SR1E6 | SR1E5 | SR1E8 | SR1E7 | SR1E12 | SR1E11 | |
| 17 | 1 | 12 | 0 | 0 | 0 | 0 | 0 | 0 | 0 | 0 | 16 or 17 |
| 18 | 2 | 1 | 0 | 0 | 0 | 0 | 0 | 0 | 0 | 1 | 18 or 19 |
| 19 | 3 | 2 | 0 | 0 | 0 | 1 | 0 | 0 | 0 | 0 | 20 |
| 20 | 4 | 3 | 0 | 0 | 0 | 0 | 0 | 0 | 1 | 1 | 21 |
| 21 | 5 | 4 | 0 | 0 | 1 | 1 | 0 | 0 | 1 | 0 | 22 |
| 22 | 6 | 5 | 0 | 1 | 0 | 0 | 0 | 1 | 0 | 1 | 23 |
| 23 | 7 | 6 | 1 | 1 | 1 | 0 | 1 | 1 | 0 | 0 | 24 |
| 24 | 7 | 6 | 0 | 0 | 0 | 1 | 0 | 0 | 0 | 0 | 25 |
| 25 | 8 | 7 | 1 | 1 | 0 | 0 | 0 | 1 | 0 | 0 | 26 |
| 26 | 9 | 8 | 0 | 0 | 0 | 0 | 1 | 0 | 0 | 0 | 27 |
| 27 | 10 | 9 | 0 | 0 | 0 | 0 | 0 | 0 | 0 | 0 | 28 |
| 28 | 11 | 10 | 0 | 0 | 0 | 0 | 0 | 0 | 0 | 0 | 29 |
| 29 | 12 | 11 | 1 | 0 | 0 | 0 | 0 | 0 | 0 | 0 | 30 or 31 |

Figure 32

| Dark Line entry | Slit position number | | Sub-Region 1 electrode state (Dark Line) | | | | | | | | Multiplex with Bright Line entry |
|---|---|---|---|---|---|---|---|---|---|---|---|
| | Region 1 | Region 2 | SR1E2 | SR1E1 | SR1E6 | SR1E5 | SR1E8 | SR1E7 | SR1E12 | SR1E11 | |
| 16 | 1 | 12 | 0 | 0 | 0 | 0 | 1 | 0 | 0 | 0 | 17 |
| 17 | 1 | 12 | 0 | 0 | 0 | 1 | 0 | 0 | 0 | 0 | 17 |
| 18 | 2 | 1 | 0 | 0 | 0 | 0 | 0 | 0 | 1 | 1 | 18 |
| 19 | 2 | 1 | 1 | 0 | 1 | 1 | 0 | 0 | 0 | 1 | 18 |
| 20 | 3 | 2 | 0 | 0 | 0 | 0 | 0 | 1 | 1 | 0 | 19 |
| 21 | 4 | 3 | 0 | 1 | 1 | 1 | 0 | 0 | 0 | 1 | 20 |
| 22 | 5 | 4 | 0 | 0 | 0 | 0 | 0 | 1 | 0 | 1 | 21 |
| 23 | 6 | 5 | 0 | 0 | 1 | 1 | 1 | 1 | 1 | 1 | 22 |
| 24 | 7 | 6 | 1 | 1 | 1 | 1 | 0 | 0 | 0 | 0 | 23 |
| 25 | 7 | 6 | 1 | 1 | 1 | 1 | 1 | 1 | 0 | 0 | 24 |
| 26 | 8 | 7 | 0 | 0 | 0 | 0 | 0 | 0 | 1 | 0 | 25 |
| 27 | 9 | 8 | 1 | 1 | 0 | 0 | 1 | 1 | 0 | 0 | 26 |
| 28 | 10 | 9 | 0 | 0 | 0 | 0 | 0 | 0 | 0 | 0 | 27 |
| 29 | 11 | 10 | 1 | 1 | 0 | 0 | 1 | 0 | 0 | 0 | 28 |
| 30 | 12 | 11 | 1 | 0 | 0 | 0 | 0 | 0 | 0 | 0 | 29 |
| 31 | 12 | 11 | 1 | 0 | 0 | 0 | 0 | 0 | 0 | 1 | 29 |

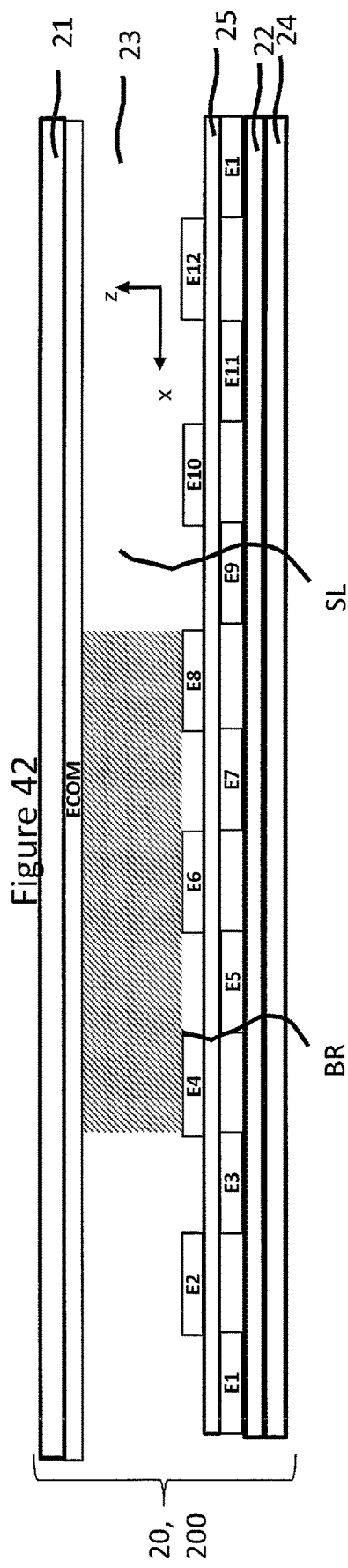

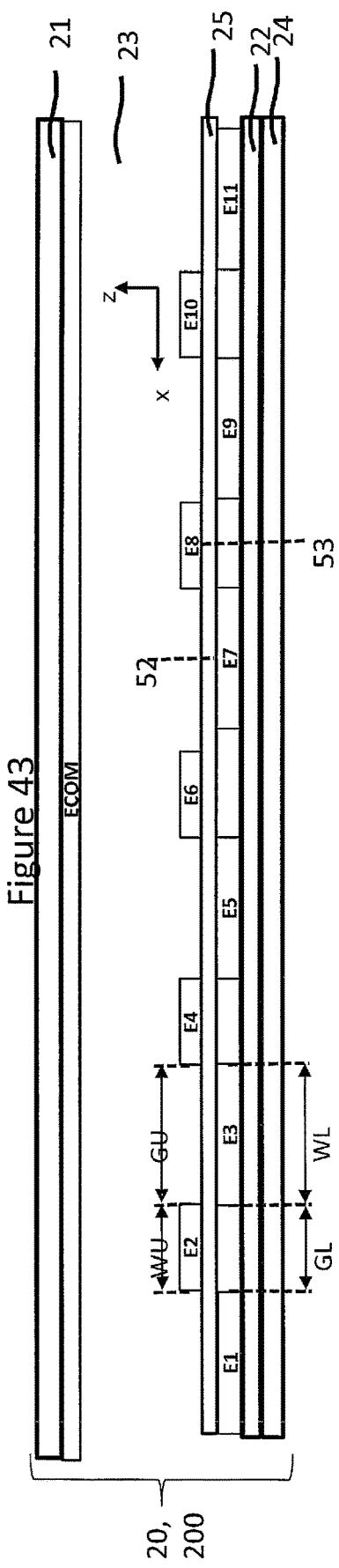

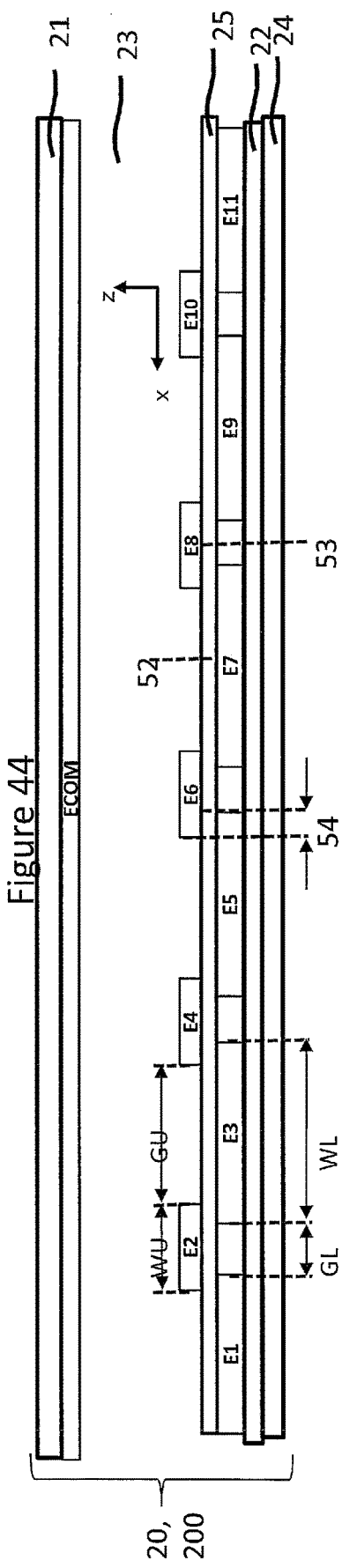

PARALLAX BARRIER WITH INDEPENDENTLY CONTROLLABLE REGIONS

TECHNICAL FIELD

This invention relates to switchable imaging optics for use in 3D autostereoscopic (no glasses) devices.

BACKGROUND ART

For many years people have been trying to create better autostereoscopic three dimensional (3D) displays, and this invention provides a further advance in this field. An autostereoscopic display is a display that gives stereoscopic depth without the user needing to wear special glasses. This is accomplished by projecting a different image to each eye. An autostereoscopic 3D display can be realised by using parallax optic technology such as a parallax barrier or lenticular lenses.

Many applications exist whereby a display is also required to operate in a high quality 2D mode and a high quality 3D mode. For the image display to show an image with 100% native resolution in the 2D mode, the parallax barrier must be switchable between a first mode that provides substantially no imaging function (2D mode) to a second mode of operation that provides an imaging function (3D mode). An example of a liquid crystal switchable parallax barrier technology is disclosed in U.S. Pat. No. 7,813,042B2.

The use of a parallax barrier to direct a different image directly to each eye to create a stereoscopic image for a static, non-moving user is well known. However, the user must remain fixed in space in order to view a high quality 3D image. Movement of the user's head from side to side (lateral movement of the head relative to the display device) causes the left eye image to be viewed with the right eye and vice versa. Viewing the left eye image with the right eye causes severe discomfort to the viewer. In order to solve this problem, a liquid crystal parallax barrier comprising multiple independently addressable electrodes may be used in conjunction with a head tracking system so that for a given viewing distance the left eye image is always directed to the left eye and the right eye image is always directed to the right eye. The head tracking system determines the lateral position of the user's eyes and switches the appropriate electrodes of on the liquid crystal parallax barrier to enable viewing of a stereoscopic image. Examples of such laterally tracking liquid crystal parallax barriers comprising multiple independently addressable electrodes and head tracking systems are disclosed in US20130342586A1, WO000002014136610A1, U.S. Pat. No. 8,629,945B2, US 20120200680A1, US20130342586A1, US20110157171A1, EP00833183A1, US20100110316A1 and U.S. Pat. No. 5,969,850A1.

Other examples of reconfigurable parallax barriers are given in WO 2014/141813, WO 2015/060011, WO 2015/060002, EP1816510, US 2014/198099 and US 2013/021329.

For some applications, particularly on some small displays, a laterally tracked liquid crystal parallax barrier enables sufficient backwards and forwards (longitudinal) movement of the head relative to the display device to enable high quality 3D viewing. However, for other applications, laterally tracking liquid crystal parallax barriers have the disadvantage that movement of the user's head backwards and forwards (longitudinal movement) relative to the display device causes the left eye image to be viewed with the right eye and vice versa i.e. poor quality 3D viewing. U.S. Pat. No. 8,331,023B2 discloses the use of multiple parallax barriers to enable lateral and longitudinal head movement while maintaining good quality 3D viewing. WO2014092172A1, U.S. Pat. No. 8,629,945, US20130187961A1 and US20140078268A1 disclose that a liquid crystal parallax barrier comprised of multiple electrodes can enable lateral and longitudinal head tracking while maintaining good quality 3D viewing. The disclosed method of longitudinal head tracking is performed by changing the pitch of the liquid crystal parallax barrier.

SUMMARY OF INVENTION

One aspect of the present invention provides an autostereoscopic (no glasses) display device 1 that enables viewing of high quality 3D images for a large range of lateral (left and right) head movements and a large range of longitudinal (forwards and backwards) head movements. The autostereoscopic (no glasses) display device 1 includes an image display panel 10 for displaying images and a multi-region liquid crystal parallax barrier panel 20, 200. The multi-region liquid crystal parallax barrier panel 20, 200 may be switch off to enable viewing of 2D images or switched on to enable viewing of autostereoscopic (no glasses) 3D images.

The multi-region liquid crystal parallax barrier panel 20, 200 includes at least a first region that includes a cyclic arrangement of independently addressable electrodes and at least a second region that includes a cyclic arrangement of independently addressable electrodes and at least a first sub-region positioned between said first region and said second region that includes at least a first independently addressable electrode wherein the electrodes of the first region are addressed independently of the electrodes of the second region wherein the electrodes of the first region are addressed independently of the electrode(s) of the first sub-region wherein the electrodes of the second region are addressed independently of the electrode(s) of the first sub-region.

The electrode pitch EP may be constant in each region. The electrode pitch EP may vary in each region. Each region may have a unique electrode pitch.

The independently addressable electrodes may be deposited in a single layer configuration.

The independently addressable electrodes may be deposited in a dual layer configuration.

The independently addressable electrodes may be deposited on the first substrate only or deposited on the second substrate only or deposited on both the first and second substrates.

The autostereoscopic display device 1 further includes a control circuit 40 and a position sensor(s) 41. Control circuit 40 includes an operation unit 42 and a multi-region liquid crystal parallax barrier panel drive unit 43 and an image display panel driver 44 and may include a slit pattern look-up table (LUT) 45. Image display panel drive unit 44 drives the image display panel 10 based on input video signals and displays an image on the image display panel 10. The position sensor(s) and the operation unit determine the head/face/eye position of the autostereoscopic display device user. The parallax barrier panel drive unit 43 drives the multi-region liquid crystal parallax barrier panel 200 based on the head/face/eye position of the user to enable viewing of high quality 3D (low 3D crosstalk).

A time multiplexing method may be used to address the electrodes of the sub-region with two different slit patterns.

A first aspect of the present invention provides a multi-region liquid crystal parallax barrier panel comprising: a first region having a plurality of first electrodes, for addressing the electro-optic material, the first electrodes being independently addressable from one another and comprising two or more electrically connected electrode portions extending along a first direction and laterally spaced from one another along a second direction, the electrode portions of the first electrodes being arranged in a cyclic arrangement; a second region having a plurality of second electrodes for addressing the electro-optic material, the second electrodes being independently addressable of one another and of the first electrodes, and comprising two or more electrically connected electrode portions extending along the first direction and laterally spaced from one another along the second direction, the electrode portions of the second electrodes being arranged in a cyclic arrangement; a first compensation region having a plurality of electrodes for addressing the electro-optic material, the electrodes of the first compensation region extending along the first direction, and being independently addressable of one another and of the first and second electrodes, the first compensation region being disposed between the first region and the second region; the parallax barrier panel being configured such that, in use, the first and second electrodes and the electrodes of the first compensation region are addressed on the basis of at least one received drive signal such that: the first electrodes to define, in the first region of the panel, a parallax barrier array selected from a plurality of predetermined parallax barrier arrays; the second electrodes to define, in the second region of the panel, independently of the first parallax barrier array, a parallax barrier array selected from the plurality of predetermined parallax barrier arrays; and the electrodes of the first compensation region define, dependent on the first parallax barrier array and on the second parallax barrier array at least one slit and/or at least one barrier between the first region and the second region.

The at least one slit and/or at least one barrier defined by the electrodes of the first compensation region is/are at least partially in the first compensation region.

The term "addressing" as used herein refers to applying voltages to one or more electrodes to define regions of desired transmissivity (in general either maximally transmissive or maximally absorbing) in the electro-optic material. In some cases the desired transmissivity may be obtained by applying a zero voltage to one or more electrodes; as used herein, the act of applying a voltage to an electrode in order to obtain a region of desired transmissivity in the electro-optic material is to be regarded as "addressing" the electrode, even if the applied voltage should be zero.

The first compensation region may be adjacent to at least one of the first region and the second region.

In a first mode, the first electrodes may be addressed to define a first one of the predetermined parallax barrier arrays in the first region, the second electrodes may be addressed define a second, different one of the predetermined parallax barrier arrays in the second region, and the electrodes of the first compensation region may define the at least one slit and/or at least one barrier to at least partially obscure any line artefact at the transition between the first one of the predetermined parallax barrier arrays and the second one of the predetermined parallax barrier arrays.

If the first region and the second region are adjacent to one another, when different parallax barrier arrays are defined in the first region and the second region there may be a discontinuity at the boundary between the two parallax barrier arrangements. For example there may be a barrier region having a lower width than the usual width of the barrier regions and/or a slit having a greater width than the usual width of the slits resulting in the observer seeing a bright line, or there may be a barrier region having a greater width than the usual width of the barrier regions and/or a slit having a lower width than the usual width of the slits resulting in the observer seeing a dark line. Providing the third region (compensation region) between the first region and the second region, with the independently addressable third electrodes, allows the effect, as perceived by an observer, of a discontinuity at the boundary between the two parallax barrier arrays to be reduced and possibly eliminated.

Electrode portions of the first electrodes may be arranged in groups in the cyclic arrangement; a boundary group of electrode portions of the first electrodes, the boundary group being the group of electrode portions of the first electrodes nearest the first compensation region, may be missing electrode portions of i ($i \geq 1$) of the first electrodes; and at least some of the electrodes of the first compensation region may be addressed based on the addressing of the first electrodes.

Additionally or alternatively, electrode portions of the second electrodes may be arranged in groups in the cyclic arrangement; a boundary group of electrode portions of the second electrodes, the boundary group being the group of electrode portions of the second electrodes nearest the first compensation region, may be missing electrode portions of j ($j \geq 1$) of the second electrodes; and at least some of the electrodes of the first compensation region may addressed based on the addressing of the second electrodes.

Optionally i=j.

The first compensation region may comprise i+j third electrodes.

In the first mode, the first one of the predetermined parallax barrier arrays defined in the first region may have a first slit position number and the second one of the predetermined parallax barrier arrays defined in the second region may have a second slit position number different to the first slit position number, and the electrodes of the first compensation region may define the at least one slit and/or at least one barrier to compensate for the difference in slit position number between the first region and the second region.

In the first mode, the first electrodes are addressed to define the first one of the predetermined parallax barrier arrays in the first region, the second electrodes are addressed to define the second one of the predetermined parallax barrier arrays in the second region, and the electrodes of the first compensation region are addressed such that a third parallax barrier is defined between the first region and the second region, the third parallax barrier comprising a barrier and a slit, the slit being adjacent to the barrier, the barrier and/or the slit being contained at least partially within the first compensation region, and the slit having a width in the second direction that is less than the width of a slit that is wholly contained in the first or second region and/or the barrier having a width in the second direction that is larger than the width of a barrier that is wholly contained in the first or second region. This may be referred to as a "Dark Line" state since the effect of the barrier that is wider than the normal barrier width, or the slit that is narrower than the normal slit width, cause a dark line artefact at the boundary between the first and second regions.

Alternatively, in the first mode, the first electrodes may be addressed to define the first one of the predetermined parallax barrier arrays in the first region, the second electrodes may be addressed to define the second one of the predetermined parallax barrier arrays in the second region, and the electrodes of the first compensation region may be addressed such that a fourth parallax barrier is defined between the first region and the second region, wherein, the fourth parallax barrier comprises a barrier and a slit, the slit being adjacent to the barrier, the barrier and/or the slit being contained at least partially within the first compensation region, and the slit having a width in the second direction that is larger than the width of a slit that is wholly contained in the first or second region and/or the barrier having a width in the second direction that is less than the width of a barrier that is wholly contained in the first or second region. This may be referred to as a "Bright Line" state since the effect of the barrier that is narrower than the normal barrier width, or the slit that is greater than the normal slit width, cause a bright line artefact at the boundary between the first and second regions.

One of the third and fourth parallax barriers may a barrier:slit ratio greater than the barrier:slit ratio of the predetermined parallax barrier arrays and the other of the third and fourth parallax barriers may have a barrier:slit ratio lower than the barrier:slit ratio of the predetermined parallax barrier arrays. Where the third parallax barrier provides a "Dark line" state and the fourth parallax barrier provides a "Bright line" state, the third parallax barrier will have a barrier:slit ratio that is greater than the barrier:slit ratio of the predetermined parallax barrier arrays, and the fourth parallax barrier will have a barrier:slit ratio that is lower than the barrier:slit ratio of the predetermined parallax barrier arrays (and so is lower than the barrier:slit ratio of the third parallax barrier).

The panel may be adapted to define the third parallax barrier in a first time period and to define the fourth parallax barrier in a second time period. It may be adapted to define the third parallax barrier and the fourth parallax barrier in a time-alternating manner, the ratio of a time period within which the third parallax barrier is defined to a time period within which the fourth parallax barrier is defined being selected to reduce visibility of line artefacts at the transition between the first one of the predetermined parallax barrier arrays that is defined in the first region and the second one of the predetermined parallax barrier arrays that is defined in second first region. The effect of alternately displaying the third parallax barrier and the fourth parallax barrier is to alternate between a Dark Line state and a Bright Line state. Provided that the time periods for which the parallax barrier panel is in the Dark Line and Bright Line states (the Dark Line Time, DLT, and the Bright Line Time, BLT) are sufficiently small, an observer will not perceive the individual Dark Line and Bright Line states and will perceive a time-average of the Dark Line and Bright Line states. The ratio between BLT and DLT may be chosen to eliminate, or at least reduce, any visible line artefacts at the transition between the first region and the second region.

In a second mode, the first and second electrodes may addressed to define the same selected one of the plurality of predetermined parallax barrier arrays in the first region and in the second region, and the electrodes of the first compensation region may be addressed to define in the first compensation region a parallax barrier array continuous with the first and second parallax barrier array. This provides a uniform parallax barrier array over the first and second regions and the first compensation region.

In a third mode, the first electrodes, the second electrodes and the electrodes of the first compensation region may be addressed such that the panel provides no imaging function.

The allows the panel to be used, for example, in a display that is required to operate in either a 2-D display mode or a 3-D display mode.

The panel may further comprise first and second substrates, and the electro-optic material may be disposed between the first substrate and the second substrate; and at least some of the first electrodes may be disposed on the first substrate and at least others of the first electrodes may be disposed on the second substrate. Alternatively, all first electrodes may be disposed on the same substrate as one another.

Electrodes on the first substrate may be offset along the second direction with respect to electrodes on the second substrate. They may be offset by substantially half the electrode pitch.

Alternatively the panel may comprise first and second substrates, and the electro-optic material may be disposed between the first substrate and the second substrate; and each of the first electrodes may be disposed on one of either the first substrate or second substrate.

Each first electrode portion may comprise first and second parts offset from one another in the thickness direction of the panel and offset from one another in the second direction by a distance substantially equal to the electrode gap.

A first subset of the first electrodes may be disposed over one of either the first or second substrate, an insulating layer may be disposed over the first subset of the first electrodes, and a second subset of the first electrodes may be disposed over the insulating layer, first electrodes of the second subset being offset, in the second direction, from first electrodes of the first subset.

The width of a first electrode of the second subset may be less than the width of a first electrode of the first subset, and the width of a first electrode of the second subset may be less than the gap between two neighbouring first electrodes of the second subset.

The width of an electrode of the first subset of first electrodes may be greater than the gap between two neighbouring electrodes of the second subset of first electrodes.

A second aspect of the invention provides an arrangement comprising a parallax barrier panel of the first aspect and a control circuit for addressing the first electrodes, the second electrodes and the electrodes of the first compensation region. The control circuit may be provided on the parallax barrier panel, or it may be separate from, but electrically connectable to, the parallax barrier panel.

A third aspect of the invention provides a display comprising: an image display panel; a parallax barrier panel of the first aspect disposed in an optical path through the image display panel; and a control circuit for addressing the first electrodes, the second electrodes and the electrodes of the first compensation region.

The term "addressing" the electrodes as used herein refers to applying voltages to the electrodes to define regions of desired transmissivity (in general either maximally transmissive or maximally absorbing) in the electro-optic material. In some cases the desired transmissivity may be obtained by applying a zero voltage to one or more electrodes; as used herein, the act of applying a voltage to an electrode in order to obtain a region of desired transmissivity in the electro-optic material is to be regarded as "addressing" the electrode, even if the applied voltage is zero.

In the second and third aspect, the control circuit may be constituted by individual, distributed control circuits that, for example, each drive electrodes of one region of the parallax barrier panel, or it may be constituted by a single control circuit that drives electrodes of all regions of the parallax barrier panel.

The image display panel may comprise a transmissive panel, and the display further comprises a backlight. In this case the parallax barrier panel may be disposed between the backlight and the image display panel (a "rear barrier" configuration) or may be disposed between the image display panel and an observer (a "front barrier" configuration)

Alternatively the image display panel may comprise an emissive panel.

The display may further comprise one or more position sensors for determining the position of an observer. The term "position" may include the observer's position on a horizontal line parallel to the front face of the display (denoted as the x-axis in FIG. 10), and/or the perpendicular distance between an observer and the front face of the display The control circuit may be adapted to address the first and second electrodes in dependence at least on a determined position of the observer. This can provide improved 3-D viewing characteristics.

The display may further comprise an operation processor for determining addressing schemes for the first electrodes, the second electrodes and the electrodes of the first compensation region based on a determined position of the observer.

Alternatively the display may further comprise: a memory storing a plurality of addressing schemes for the first electrodes, the second electrodes and the electrodes of the first compensation region; and an operation processor for retrieving one of the addressing schemes stored in the memory based on a determined position of the observer.

The drive circuit may be adapted to select a ratio of a time period in which the third parallax barrier is defined in the first compensation region to a time period in which the fourth parallax barrier is defined in the first compensation region dependent on a determined position of the observer from the display Additionally or alternatively the drive circuit may be adapted to select a ratio of a time period in which the third parallax barrier is defined in the first compensation region to a time period in which the fourth parallax barrier is defined in the first compensation region dependent on voltages applied to electrodes of the compensation region.

In a display of the invention, the first region may comprises 12 first electrodes; the second region may comprises 12 second electrodes; the parallax barrier panel may further comprise third to ninth regions, the third to ninth regions having 12 third to ninth electrodes respectively for addressing the electro-optic material, the electrodes of the $p^{th}$ ($1 \leq p \leq 39$) region being independently addressable of one another and of the electrodes of the $p'^{th}$ ($1 \leq p' \leq 9$, $p' \neq p$) region, and the third to ninth electrodes may comprise two or more electrically connected electrode portions extending along the first direction and laterally spaced from one another along the second direction, the electrode portions of the electrodes of the $p^{th}$ ($1 \leq p \leq 9$) region being arranged in a cyclic arrangement; the first compensation region of the panel may comprise 8 independently-addressable electrodes for addressing the electro-optic material; the parallax barrier panel may further comprise second to eighth compensation regions each having eight electrodes for addressing the electro-optic material extending along the first direction, the electrodes of the $k^{th}$ ($1 \leq k \leq 8$) compensation region being independently addressable of one another, being addressable independently of the electrodes of the other compensation regions, and being addressable independently of the first to ninth electrodes, the $k^{th}$ compensation region being disposed between the $k^{th}$ region and the $(k+1)^{th}$ region; and the drive circuit may be adapted to address the electrodes of the $k^{th}$ compensation region dependent on the addressing of the $k^{th}$ region and on the addressing of the $(k+1)^{th}$ region.

BRIEF DESCRIPTION OF DRAWINGS

FIG. 9: Relationship between Slit Position Number and electrode state
FIG. 13: Slit patterns for various head positions
FIG. 24: Relationship between Slit Position Numbers and electrode states of Sub-Region 1
FIG. 26: Relationship between Slit Position Numbers and electrode states of Sub-Region 1
FIG. 28: Relationship between Slit Position Numbers and electrode states of Sub-Region 1
FIG. 30: Relationship between Slit Position Numbers and electrode states of Sub-Region 1
FIG. 32: Relationship between Slit Position Numbers and electrode states of Sub-Region 1
FIG. 42: A dual layer electrode liquid crystal parallax barrier
FIG. 43: Sectional view of a dual layer electrode structure
FIG. 44: Sectional view of a dual layer electrode structure

DESCRIPTION OF EMBODIMENTS

Figure 1:
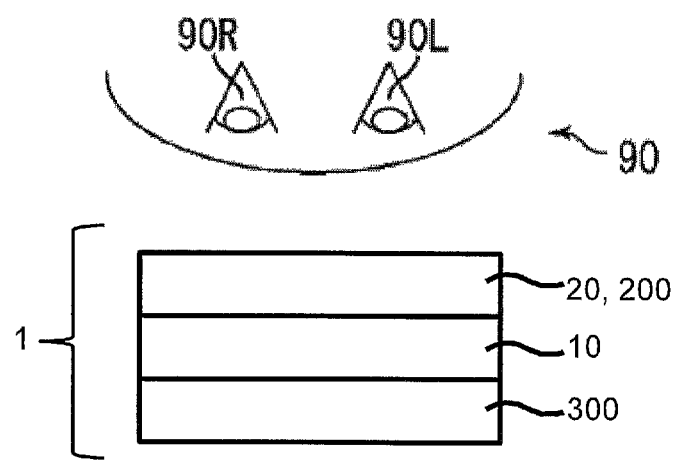
FIG. 1: Front barrier autostereoscopic display device

Below with reference to the accompanying drawings, will be described in detail embodiments of the present invention. The same reference numerals are given to the same or corresponding portions in the drawings, and the description of a component that is used in multiple embodiments will not be repeated for each embodiment. In order to simplify the explanation, in the drawings referred to below, an illustrated configuration may be simplified or a portion of the component may be shown as schematic or omitted. The dimensional ratios between the components shown in the figures are not necessarily related to the actual dimension ratio.

FIG. 1 shows an autostereoscopic display device 1 which includes an image display panel 10 and a switchable liquid crystal parallax barrier panel 20. The image display panel 10 may be a liquid crystal display (LCD) or an Organic Light Emitting Display (OLED) etc. If the image display panel 10 is a liquid crystal display (LCD) then a backlight unit 300 is used. The liquid crystal parallax barrier panel 20 may be disposed on the viewing side 90 of the autostereoscopic display device 1 (i.e. a front barrier system). The switchable liquid crystal parallax barrier panel 20 may be switched to perform a parallax barrier function which directs a first image from the image display panel 10 to the left eye 90L and directs a second image from the image display panel 10 to the right eye 90R to enable the viewing of an autostereoscopic 3D image. The switchable liquid crystal parallax barrier panel 20 may be switched to perform no parallax barrier function which does not direct light so that the same 2D image is simultaneously visible to both the left eye 90L and the right eye 90R. In the 2D mode, the switchable liquid crystal parallax barrier panel 20 is substantially transparent (i.e. has a transparency of >75% and preferably >90% for correctly polarised light).

Figure 2:
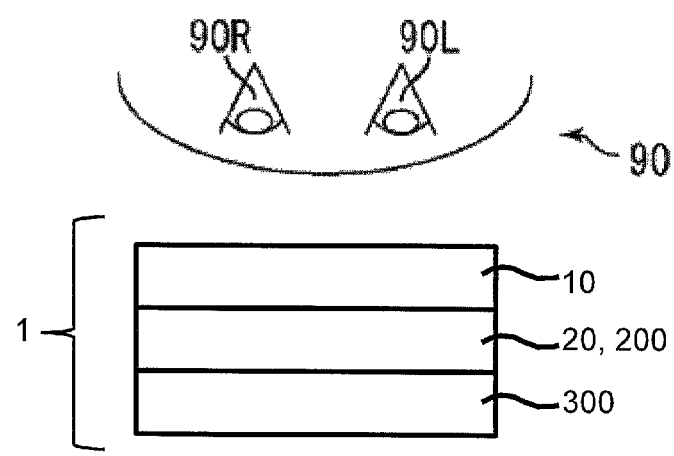
FIG. 2: Rear barrier autostereoscopic display device

FIG. 2 shows an autostereoscopic display device 1 which includes an image display panel 10 and a switchable liquid crystal parallax barrier panel 20. The image display panel 10 may be a liquid crystal display (LCD) or an Organic Light Emitting Display (OLED) etc. If the image display panel 10 is a liquid crystal display (LCD) then a backlight unit 300 is used. The image display panel 10 may be disposed on the viewing side 90 of the autostereoscopic display device 1 (i.e. a rear barrier system). The switchable liquid crystal parallax barrier panel 20 may be switched to perform a parallax barrier function which directs a first image from the image display panel 10 to the left eye 90L and directs a second image from the image display panel 10 to the right eye 90R to enable the viewing of an autostereoscopic image. The switchable liquid crystal parallax barrier panel 20 may be switched to perform no parallax barrier function which does not direct light so that a 2D image is simultaneously visible to both the left eye 90L and the right eye 90R. In the 2D mode, the switchable liquid crystal parallax barrier panel 20 is substantially transparent.

Unless stated otherwise, all subsequent embodiments are written in relation to FIG. 2 where the image display panel 10 is disposed on the viewing side 90 of the autostereoscopic display device 1 but it will be appreciated that the liquid crystal parallax barrier panel 20 may alternatively be disposed on the viewing side 90 of the autostereoscopic display device. Unless stated otherwise, for all subsequent embodiments the image display panel 10 is a liquid crystal display panel, but in principle any suitable emissive or transmissive display panel may be used (with a transmissive display panel requiring a backlight).

Figure 3:
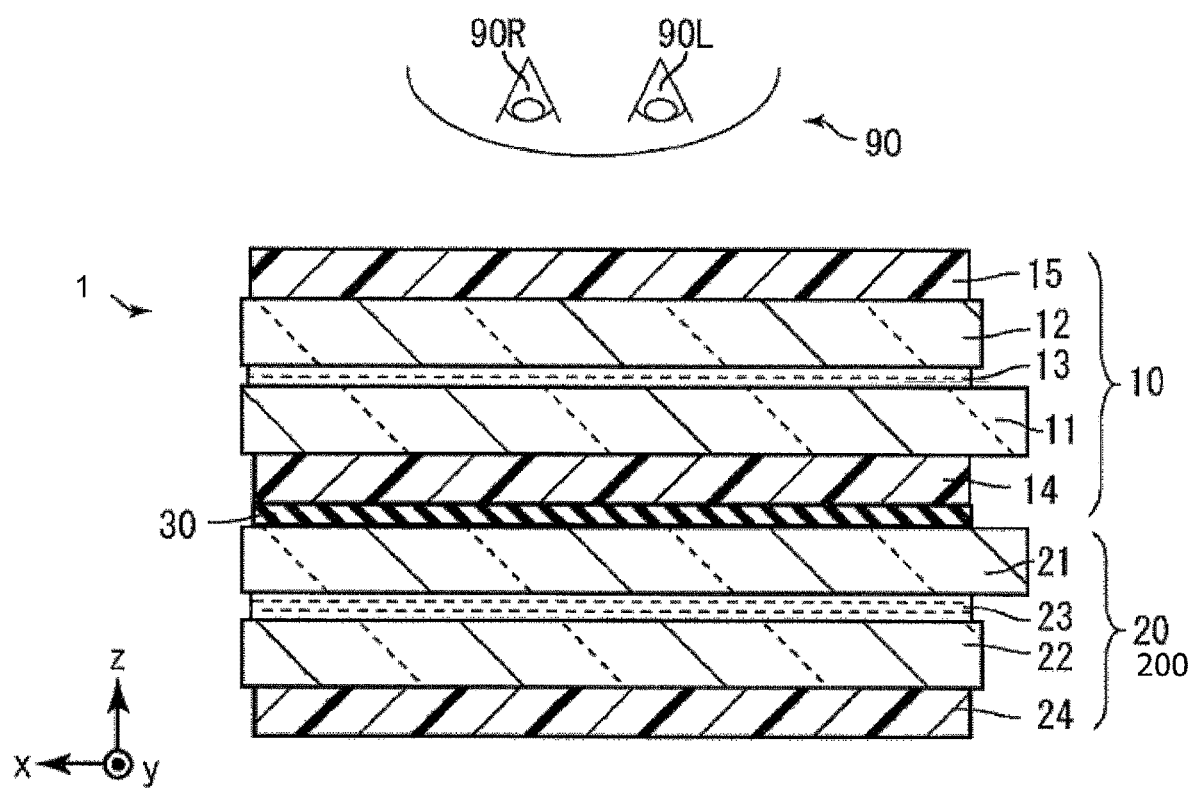
FIG. 3: Sectional view of an autostereoscopic display device (prior art)

FIG. 3 is a schematic sectional view showing a conventional autostereoscopic display device 1. Autostereoscopic display device 1 and may include an image display panel 10, a switchable liquid crystal parallax barrier panel 20 and a bonding resin 30. The image display panel 10 and the switchable liquid crystal parallax barrier panel 20 are arranged to overlap and the image display panel 10 is on the observer 90 side. The image display panel 10 and the switchable liquid crystal parallax barrier panel 20 are bonded by an adhesive resin 30. The image display panel 10 may include a TFT (Thin Film Transistor) substrate 11, a CF (Colour Filter) substrate 12, a liquid crystal layer 13, and polarising plates 14 and 15. Image display panel 10 controls the TFT substrate 11 and the CF substrate 12, to manipulate the orientation of the liquid crystal molecules of the liquid crystal layer 13 in order to yield an image by adjusting the amount of light transmitted through each pixel. The backlight unit 300 is not shown. Switchable liquid crystal parallax barrier panel 20 includes a first substrate 21, a second substrate 22, a liquid crystal layer 23, and a polarizing plate 24. Liquid crystal layer 23 is sandwiched between the first substrate 21 and the second substrate 22.

Figure 4:
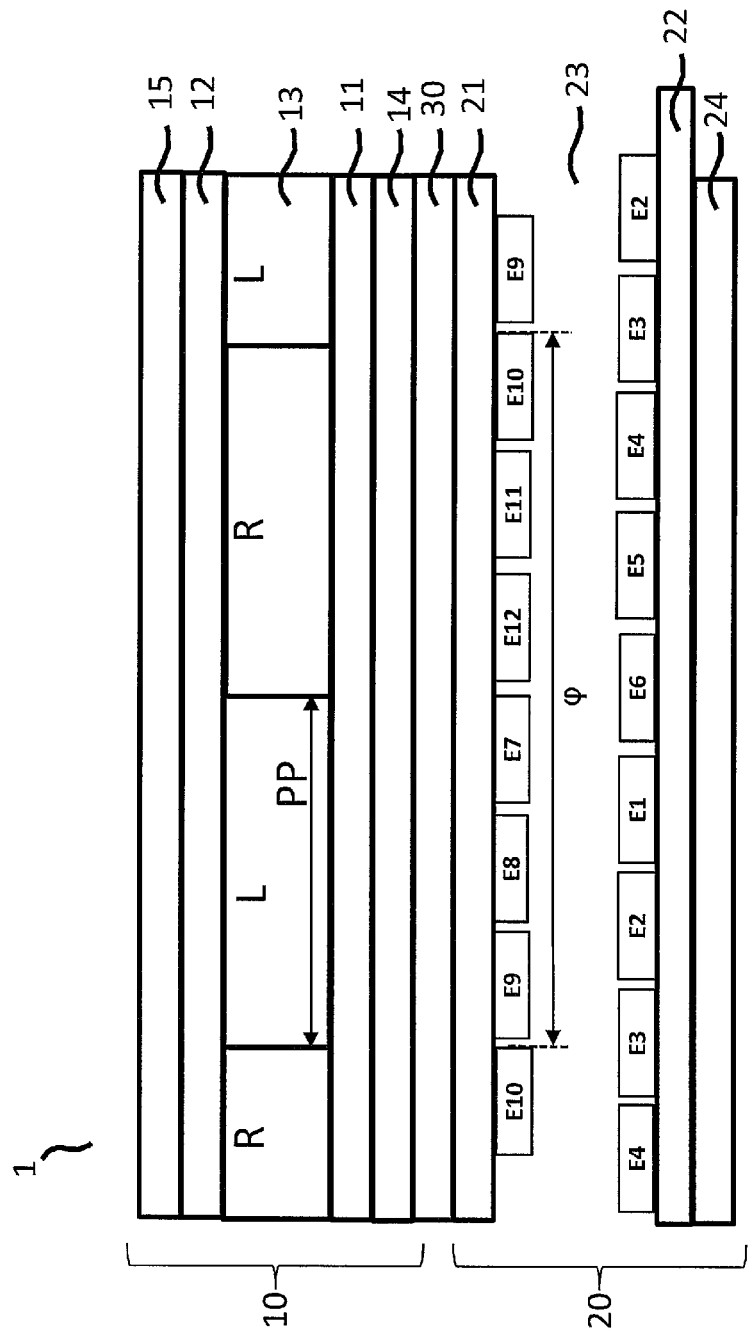
FIG. 4: Sectional view of an autostereoscopic display device

FIG. 4 is a further schematic sectional view showing an autostereoscopic display device 1. The first substrate 21 and the second substrate 22 include a plurality of independently addressable electrodes, labelled E1, E2, E3, E4, E5, E6, E7, E8, E9, E10, E11 and E12. Each electrode comprises two or more electrode portions that extending into the plane of the paper in FIG. 4, and that are laterally spaced from one another (along the horizontal axis in FIG. 4). Thus, two portions with the same labelling in FIG. 4 are portions of the same electrode and are electrically connected together—the two portions labelled "E4" in FIG. 4 are portions of the same electrode, the two portions labelled "E10" in FIG. 4 are portions of the same electrode, and so on. An electrode with three portions would be generally "E"-shaped in plan view, and an electrode with more than three portions would be generally comb-shaped in plan view. The first substrate 21 includes a single layer of independently addressable electrodes, labelled E7, E8, E9, E10, E11 and E12, whose electrode portions are in a cyclic arrangement (i.e. a portion of electrode E7 is adjacent to a portion of electrode E8 and a portion of electrode E12). The second substrate 22 includes a single layer of independently addressable electrodes, labelled E1, E2, E3, E4, E5 and E6, whose electrode portions are in a cyclic arrangement (i.e. a portion of electrode E1 is adjacent to a portion of electrode E2 and a portion of electrode E6). In other words, a different voltage may be applied to (addressed to) each of the electrodes labelled E1 to E12 i.e. each electrode labelled E1 to E12 may be independently controlled. Electrodes labelled E1 to E12 are a group of electrodes. There may be more than 12 electrodes in a group, which may enable better head tracking accuracy. There may be fewer than 12 electrodes in a group, which may enable simpler drive electronics. The use of 12 electrodes in a group was found to be a good balance between tracking accuracy and complexity. Unless stated otherwise, for all subsequent embodiments it is assumed there are 12 electrodes in a group. The electrodes (E1 to E12) may be evenly spaced apart.

Figure 8:
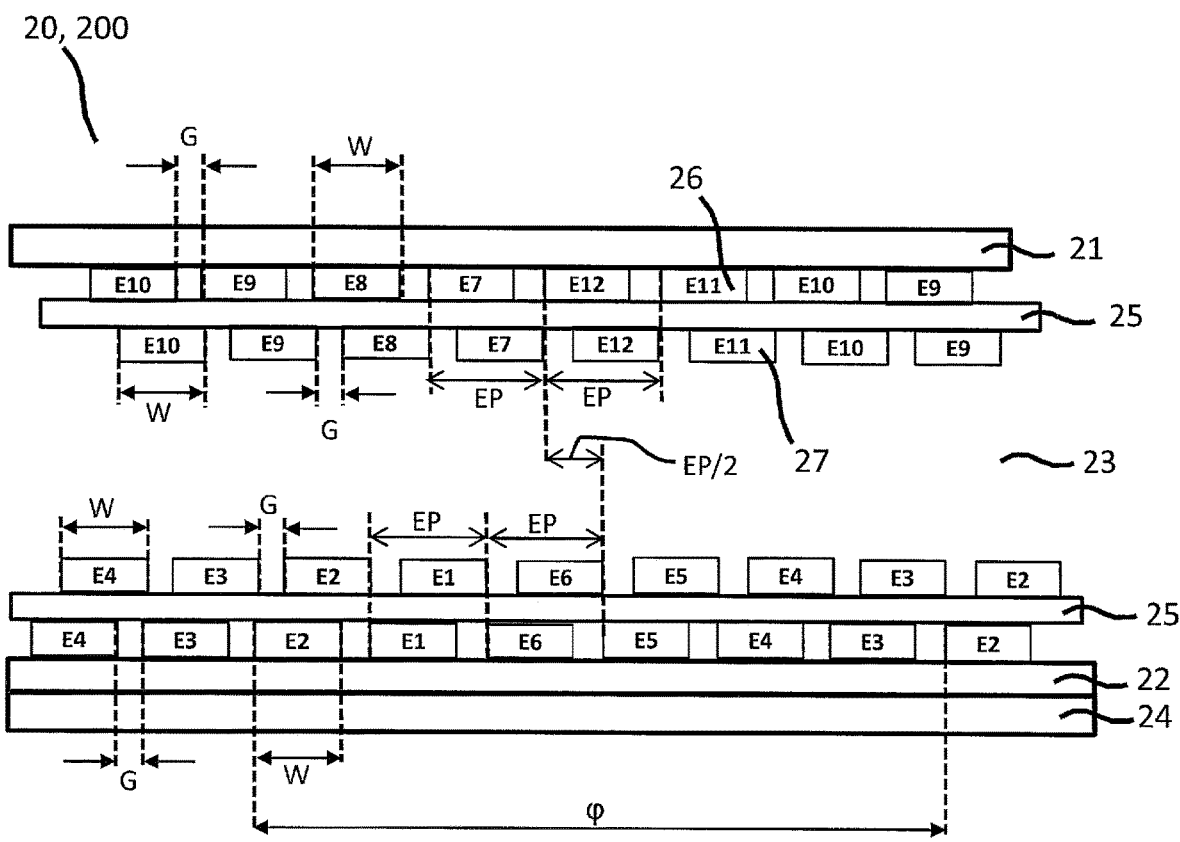
FIG. 8: Sectional view of a dual layer electrode structure

Unless stated otherwise, for all subsequent electrode descriptions it is assumed the electrodes are configured according to either FIG. 4 or FIG. 8 with electrodes E7, E8, E9, E10, E11 and E12 deposited on the first substrate 21 in a cyclic arrangement and electrodes E1, E2, E3, E4, E5 and E6 deposited on the second substrate 22 in a cyclic arrangement. The group pitch, φ, of the independently addressable electrode group is shown in FIG. 4 and FIG. 8. (The group pitch φ of the electrodes on the first substrate is the same as the group pitch φ of the electrodes on the second substrate.) The size of the pixel pitch PP for a pixel of the image display panel 10 is also shown in FIG. 4. In the autostereoscopic 3D mode, alternate pixels may be addressed with a left eye image (L) and a right eye image (R). Two times pixel pitch (2*PP) is approximately equal to the electrode group pitch (φ). More precisely, for a rear barrier autostereoscopic display device 1, φ=2PP/Vd(Vd+s/n) where Vd is the desired viewing distance, s is the separation from the image display panel layer 13 to the switchable liquid crystal layer 23 of the parallax barrier and n is the average refractive index between the image display panel layer 13 to the switchable liquid crystal layer 23 of the parallax barrier.

Figure 5:
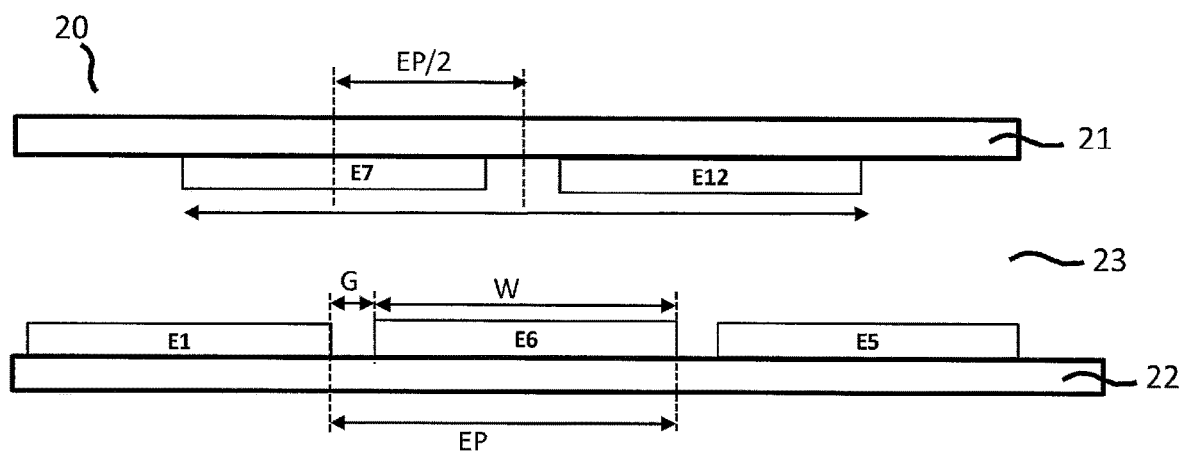
FIG. 5: Relationship between electrode positions

With reference to FIG. 5, the width, W, of each electrode may be the same for each electrode or alternatively may vary from one electrode to another depending upon the position relative to the image display 10. Unless stated otherwise, the width, W, of each electrode is assumed to be the same for each electrode in all subsequent embodiments. With reference to FIG. 5, the gap, G, between two adjacent electrodes may be the same for each pair of adjacent electrodes or alternatively may vary from one electrode pair to another depending upon the position relative to the image display 10. Unless stated otherwise, the gap, G, between two adjacent electrodes is assumed to be the same for each electrode pair in all subsequent embodiments. With reference to FIG. 5, the Electrode Pitch, EP is equal to G+W and may be the same for each electrode or alternatively may vary from one electrode to another depending upon the position relative to the image display 10. Unless stated otherwise, the Electrode Pitch, EP, is assumed to be the same for each electrode in all subsequent embodiments. With reference to FIG. 4, FIG. 5 and FIG. 8, the electrode group pitch, φ, is equal to 6*EP. The electrode group pitch, φ, may be the same for each electrode group or may vary from one electrode group to another depending upon the position relative to the image display 10. Unless stated otherwise, the electrode group pitch, φ, is assumed to be the same for each electrode group in all subsequent embodiments. With reference to FIG. 5 and FIG. 8, the electrodes on the first substrate 21 may be offset from the electrodes on the second substrate 22 by a constant equal to or substantially equal to (i.e. within 10 µm and preferably within 5 µm) EP/2. Since the width of each electrode (W) and the gap (G) between each electrode is defined via a photolithographic process, the width of each electrode (W) and the gap (G) between each electrode and the electrode pitch (EP) and the group pitch (φ) cannot be changed dynamically. In other words, the distances W, G, EP and φ are fixed according to a particular design and said distances may not be actively controlled.

The electrode configuration shown in FIG. 4 and FIG. 5 is just one example of an electrode configuration compatible with the invention. Alternative to FIG. 4 and FIG. 5 and with reference to FIG. 37 the independently addressable electrodes (E1 to E12) may be deposited in a cyclic arrangement on the first substrate 21 only and a common electrode deposited on the second substrate 22. The first substrate 21 may be disposed on the viewing side 90 of the autostereoscopic display device 1 or the second substrate 22 may be disposed on the viewing side 90 of the autostereoscopic display device 1. Alternative to FIG. 4 and FIG. 5, and with reference to FIG. 37, the independently addressable electrodes (E1 to E12) may be deposited in a cyclic arrangement on the second substrate 22 only and a common electrode deposited on the first substrate 21. Note: electrodes E10, 11 and 12 are not shown in FIG. 37. A parallax barrier may be formed in the switchable liquid crystal parallax barrier panel 20 by application of voltages to the independently addressable electrodes (E1 to E12) and the common electrode, ECOM. Depositing the independently addressable electrodes (E1 to E12) on a single substrate only (either the first substrate 21 or the second substrate 22) has the advantage of cheaper manufacturing. If there are 12 independently addressable electrodes deposited on a single substrate only in a cyclic arrangement as described above then electrode E1 is adjacent to electrodes E2 and E12.

Alternative to FIG. 4 and FIG. 5, a dual layer of electrodes may be used for the liquid crystal parallax barrier panel 20. An example of dual layer electrodes is shown in FIG. 8. With reference to FIG. 8, the first substrate 21 has a dual layer electrode structure and the second substrate 22 has a dual layer electrode structure. The first substrate 21 includes a first layer of independently addressable electrodes each formed of multiple electrode portions (E7 to E12) deposited upon the first substrate 21 in a cyclic arrangement, an insulating layer 25 deposited upon the first layer of independently addressable electrodes, and a second layer of independently addressable electrodes each formed of multiple electrode portions (E7 to E12) deposited upon the insulting layer 25 in a cyclic arrangement. That is, each electrode portion is formed in two parts that are offset from one another in the thickness direction of the panel and offset from one another in lateral direction. The two parts of an electrode portion are electrically connected together—electrode portion En pertaining to the first layer is electrically connected to electrode portion En pertaining to the second layer, where n is an integer. An example of the independently addressable electrode E11 pertaining to the first layer of the first substrate 21 is shown by reference 26 in FIG. 8. An example of the independently addressable electrode E11 pertaining to the second layer of the first substrate is shown by reference 27 in FIG. 8. The first layer electrodes of the first substrate 21 may be offset from the second layer of electrodes of the first substrate by an amount equal to, or substantially equal to (i.e. within 6 µm and preferably within 4 µm) G, the electrode gap. so that, when seen from a direction perpendicular to the substrate, a second layer electrode portion (e.g. the second layer electrode portion E11 (27)) fills, or substantially fills, the gap between the corresponding first layer electrode portion and the neighbouring first layer electrode portion (e.g. the gap between the first layer electrode portion E11 (26) and the neighbouring first layer electrode portion E10). This ensures that there is little or no gap between dark regions defined by adjacent electrode portions (e.g., little or no gap between a dark region defined by the electrode portions E11 (26,27) and a dark region defined by the electrode portions E10), thereby improving the quality of the resultant parallax barrier. Similarly, the first layer electrodes of the second substrate may be offset from the second layer of electrodes of the second substrate by an amount equal to, or substantially equal to (i.e. within 6 µm and preferably within 4 µm), G, the electrode gap. The insulating layer 25 (located between the first layer of independently addressable electrodes and the second layer of independently addressable electrodes) prevents electrical contact between the first layer of independently addressable electrodes and the second layer of independently addressable electrodes in the image display area (i.e. the area of the autostereoscopic display device 1 that displays an image). The insulating layer 25 may be, for example, Silicon Nitride (SiNx) and may have a thickness in the range 150 nm to 300 nm.

Figure 38:
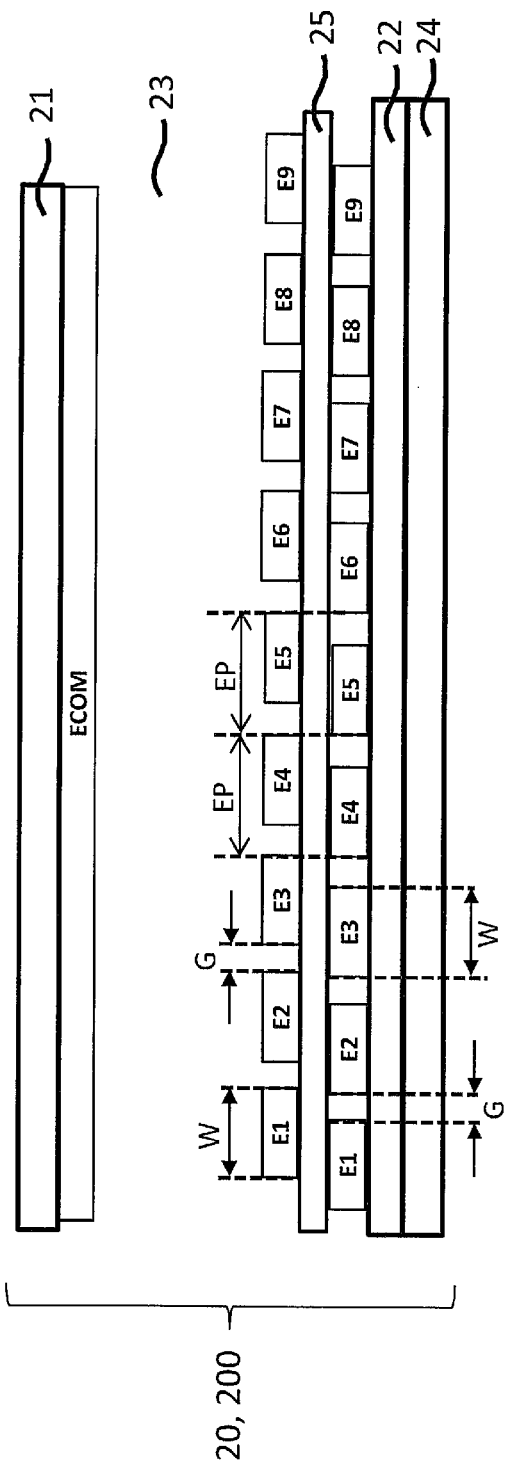
FIG. 38: Sectional view of a dual layer electrode structure

Alternative to FIG. 4 and FIG. 5, and with reference to FIG. 38, all the independently addressable electrodes (E1 to E12) may be deposited in a cyclic arrangement in a dual electrode layer structure on the second substrate 22 only and a common electrode, ECOM, deposited on the first substrate 21. The first substrate 21 may be disposed on the viewing side 90 of the autostereoscopic display device 1 or the second substrate 22 may be disposed on the viewing side 90 of the autostereoscopic display device 1. In figure the second substrate 22 includes a first layer of independently addressable electrodes each formed of multiple electrode portions (E1 to E12) deposited upon the first substrate 22 in a cyclic arrangement, an insulating layer 25 deposited upon the first layer of independently addressable electrodes, and a second layer of independently addressable electrodes each formed of multiple electrode portions (E1 to E12) deposited upon the insulting layer 25 in a cyclic arrangement electrodes E10, 11 and 12 are not shown in FIG. 38. A parallax barrier may be formed in the switchable liquid crystal parallax barrier panel 20 by application of voltages to the independently addressable electrodes (E1 to E12) and the common electrode, ECOM. If there are 12 independently addressable electrodes deposited on a single substrate only in a cyclic arrangement as described above then electrode E1 is adjacent to electrodes E2 and E12. For the reasons described with reference to FIG. 8, the first layer electrodes of the first or second substrate may be offset from the second layer of electrodes by an amount equal to, or substantially equal to (i.e. within 6 µm and preferably within 4 µm) G, the electrode gap.

The electrical connection of an electrode portion in the first layer of electrode portions with the corresponding electrode portion in the second layer of electrode portions occurs outside of the image display area. The electrical connection of the first layer of electrode portions with the second layer of electrode portions is not shown in FIG. 8. Electrode portion En has a width W and gap G between neighbouring electrodes of the same layer.

With reference to FIG. 8, the width W of each independently addressable electrode pertaining to the first layer of electrode portions on a substrate may be the same as, or may be different from, the width W of other independently addressable electrodes pertaining to the first layer of electrode portions on that substrate. The gap G between an adjacent pair of independently addressable electrodes (for example, E9 and E10) pertaining to the first layer on a substrate may be the same as, or may be different from, the gap G between other adjacent pairs of independently addressable electrodes pertaining to the first layer on that substrate. The width W of each independently addressable electrode pertaining to the second layer on a substrate may be the same as, or may be different from, the width W of other independently addressable electrodes pertaining to the second layer on that substrate. The gap G between an adjacent pair of independently addressable electrodes (for example, E8 and E9) pertaining to the second layer of electrode portions on a substrate may be the same as, or may be different from, the gap G between other adjacent pairs of independently addressable electrodes pertaining to the second layer of electrode portions on that substrate. The width W of each independently addressable electrode pertaining to the first layer on a substrate may be the same as, or may be different from, the width W of other independently addressable electrodes pertaining to the second layer on that substrate. The gap G between an adjacent pair of independently addressable electrodes (for example, E9 and E10) pertaining to the first layer of electrode portions on a substrate may be the same as, or may be different from, the gap G between other adjacent pairs of independently addressable electrodes pertaining to the second layer of electrode portions on that substrate (for example E8 and E9). The first layer of independently addressable electrodes on a substrate may be offset from the second layer of independently addressable electrodes on that substrate in order to effectively remove the gap G that exists between electrodes that exists for a non-dual layer electrode configuration. In other words, the first layer of independently addressable electrodes on a substrate may be offset from the second layer of independently addressable electrodes on that substrate by an amount G to effectively remove the gap G. With reference to FIG. 8, the left most edge of electrode E12 pertaining to the first layer is laterally coincident with the right most edge of electrode E7 pertaining to the second layer. With reference to FIG. 8, the right most edge of electrode E12 pertaining to the second layer is laterally coincident with the left most edge of electrode E11 pertaining to the first layer. If electrode E12 of the first layer is electrically connected to electrode E12 of the second layer, then E12 may be considered as a single electrode of width EP. In other words, the electrode pitch effectively contains no gaps between the independently addressable electrodes. For example and with reference to FIG. 8, there is effectively no gap between electrode E12 and electrode E7.

With reference to FIG. 8, the arrangement of dual layer electrodes (E1 to E6) on the second substrate 22 may be configured in a similar manner to the arrangement of dual electrodes on the first substrate 21. The electrode pitch EP pertaining to the electrodes of the first substrate 21 may be offset from the electrode pitch EP pertaining to the electrodes of the second substrate 22 by an amount equal to or substantially equal to (i.e. within 10 µm and preferably within 5 µm) EP/2 as shown in FIG. 8. A dual layer electrode configuration may be used on the first substrate only and a common electrode used on the second substrate. A dual layer electrode configuration may be used on the second substrate only and a common electrode used on the first substrate. A dual layer electrode configuration may be used on both the first and second substrates as shown in FIG. 8.

It should be noted that, in principle, in the embodiment of FIG. 8 the width of an electrode portion of the second layer (such as electrode portion E11 (27) of the second layer) could be made as small as the gap between the corresponding electrode portion of the first layer and the adjacent electrode portion of the first layer (such as as the gap between the electrode portion E11 (26) of the first layer and the adjacent electrode portion E10 of the first layer), as this is sufficient to effectively remove the gap that exists between adjacent electrode portions of the first layer. In practice, however, it may be convenient to define the two layers of electrode portions on a substrate using the same mask, in which case the the width of an electrode portion of the second layer is the same (within manufacturing tolerances) as the width of the corresponding electrode portion of the first layer.

Figure 6:
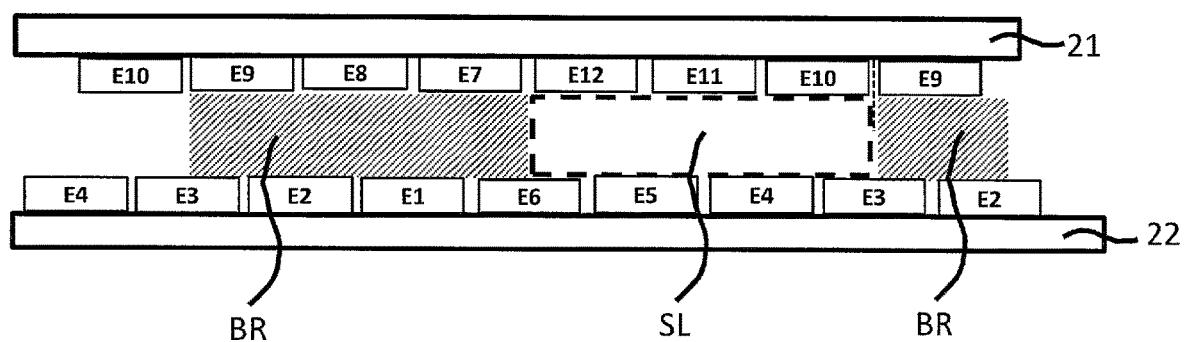
FIG. 6: A liquid crystal parallax barrier
Figure 7:
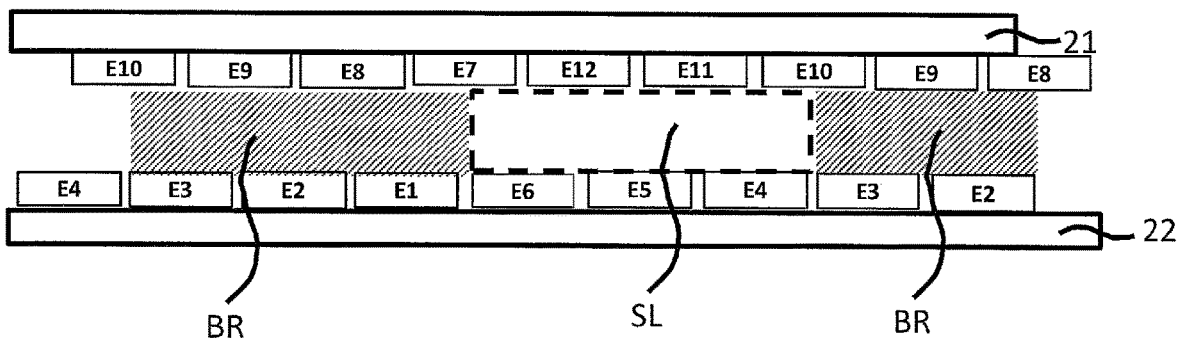
FIG. 7: A liquid crystal parallax barrier

An advantage of the dual layer electrode configuration (FIG. 8) is that it may enable higher quality 3D (lower optical 3D crosstalk) than a single layer electrode configuration (FIG. 4). The dual layer electrode configuration of electrodes effectively eliminates the gap, G, between the independently addressable electrodes to enable higher quality 3D (lower optical 3D crosstalk). This is explained with reference to FIG. 6 and FIG. 7. In FIGS. 6 and 7, the barrier BR appears continuous until a slit SL is reached, but FIG. 6 and FIG. 7 do not show accurately the impact of a finite gap G on the barrier BR. More accurately and, not shown in FIG. 6 and FIG. 7, the barrier BR may have very small slit SL areas that occur at the gap G between adjacent independently addressable electrodes. These unwanted very small slit SL areas (not shown) that puncture the barrier area BR give rise to unwanted optical 3D crosstalk. These very small transmissive slit areas in the barrier area may be eliminated if the dual layer electrode configuration of Figure is used, owing to the offset between the first layer of independently addressable electrodes and the second layer of independently addressable electrodes. A disadvantage of the dual electrode layer configuration of electrodes is that it may be more expensive to fabricate than a single electrode layer configuration.

FIG. 4 and FIG. 8 both show a liquid crystal parallax barrier panel 20. Although the details of the electrode configuration shown in FIG. 8 is different from the electrode configuration shown in FIG. 4, for all subsequent embodiments the liquid crystal parallax barrier panel 20 pertaining to FIG. 4 and FIG. 8 are effectively interchangeable.

With reference to FIG. 6, a parallax barrier may be formed in the switchable liquid crystal parallax barrier panel 20 by application of voltages to the independently addressable electrodes (E1 to E12). FIG. 6 is drawn in relation to FIG. 4 but is also applicable to FIG. 8. The parallax barrier includes a non-transmissive area, henceforth referred to as the barrier, BR, and a transmissive area, henceforth referred to as the slit, SL. (In practice the non-transmissive area or "barrier" will not be completely opaque and the transmissive area or "slit" will not be completely transmissive, and these area should more properly be referred to as "minimally transmissive" and "maximally transmissive" areas. However, the terms "non-transmissive" and "transmissive" are used for convenience.) In one example the barrier BR may be formed via the application of a potential difference between the electrodes on the first substrate 21 and the electrodes on the second substrate 22 in combination with the polarisers 14 and 24 (not shown, but shown in FIG. 4). In other words in this example the switchable liquid crystal parallax barrier panel 20 is a normally white mode. The slit SL may be formed via the application of a potential difference between the electrodes on the first substrate 21 and the electrodes on the second substrate 22 in combination with the polarisers 14 and 24 (not shown). In other words, in this alternative example the switchable liquid crystal parallax barrier panel 20 is a normally black mode. Unless stated otherwise, for all subsequent embodiments it is assumed that the switchable liquid crystal parallax barrier panel 20 is a normally white mode.

FIG. 6 shows that a first voltage is applied to the electrodes E9, E8 and E7 and a second voltage is applied to the remaining electrodes E1, E2, E3, E4, E5, E6, E10, E11 and E12. The potential difference between the first voltage and the second voltage in combination with the polarisers 14 and 24 (not shown) is sufficient to make a barrier (non-transmissive area). The switchable liquid crystal parallax barrier panel 20 may be a 90° Twisted Nematic mode. The potential difference between the first voltage and the second voltage may be in the range 2.5V to 9V. The potential difference between the first voltage and the second voltage may be in the range 4V to 6V. Unless stated otherwise, for all subsequent embodiments it is assumed that the second voltage is grounded, i.e. 0V.

FIG. 6 shows the barrier (BR) width is approximately equal to the slit (SL) width which is approximately equal to the width of 3*EP. Alternatively the barrier width may be made approximately equal to 4*EP for example by applying the first voltage to the electrodes E10, E9, E8 and E7 and applying a second voltage to the remaining electrodes E1, E2, E3, E4, E5, E6, E11 and E12. Alternatively the barrier width may be made approximately equal to 2*EP for example by applying the first voltage to the electrodes E8 and E7 and applying a second voltage to the remaining electrodes E1, E2, E3, E4, E5, E6, E9, E10, E11 and E12. Unless stated otherwise, for all subsequent embodiments it is assumed that the barrier (BR) width is approximately equal to the slit (SL) width which is approximately equal to the width of 3*EP, as shown in FIG. 6.

FIG. 7 shows a first voltage applied to, or addressed to, the electrodes E3, E2 and E1 and a second voltage is applied to, or addressed to, the remaining electrodes E4, E5, E6, E7, E8, E9, E10, E11 and E12. FIG. 7 is drawn in relation to FIG. 4 but is also applicable to FIG. 8. The potential difference between the first voltage and the second voltage in combination with the polarisers 14 and 24 (not shown) is sufficient to make a barrier BR (non-transmissive area). FIG. 7 shows that the position of the barrier (BR) area and the position of the slit (SL) area have moved by a distance approximately equal to EP/2 relative to the position of the barrier (BR) area and the position of the slit (SL) area shown in FIG. 6.

For the electrode arrangement of FIG. 6 and FIG. 7, the slit (SL) position has 12 unique locations. Each slit position has an associated slit position number. With reference to FIG. 6, we define the slit position number as equal to 9. With reference to FIG. 7 we define the slit position number as equal to 10. The full relationship between Slit Position Number and Electrode value is shown in FIG. 9. With reference to FIG. 9, a "0" denotes the second voltage and takes the value of 0V (i.e. the electrode is turned off). With reference to FIG. 9, a "1" denotes the first voltage and takes the value of V volts which may be in the range 2.5V to 9V (i.e. the electrode is turned on). With reference to FIG. 9, the slit position numbers are cyclical and therefore the slit position associated with slit position number 1 is adjacent to the slit positions described by the slit position numbers 2 and 12.

In the following description it will be assumed that the electrode portions are arranged in the same cyclic arrangement in every region of the parallax barrier panel, namely in the cyclic arrangement shown in FIGS. 4, 6, 7 and 8. If this is not the case, and electrode portions in one region should be arranged in a different cyclic arrangement to electrode portions in another region, this difference in the same cyclic arrangement between regions can be compensated for during addressing of the parallax barrier panel.

With reference to FIG. 4, FIG. 8, FIG. 6, FIG. 7, FIG. 9 and the prior arts (especially WO 2014136610 A1), a switchable liquid crystal parallax barrier panel 20 may be used in conjunction with an image display panel 10, a camera, face/head/eye tracking software and a control unit to steer a left image to the left eye 90L and right image to the right eye 90R to enable viewing of high quality 3D images for a large range of lateral head movements. In essence, as the user moves left or right, the face/head/eye tracking software recognises the change in the user's lateral position and sends information to the control unit which switches on the appropriate electrodes to enable viewing of high quality 3D images.

Figure 14:
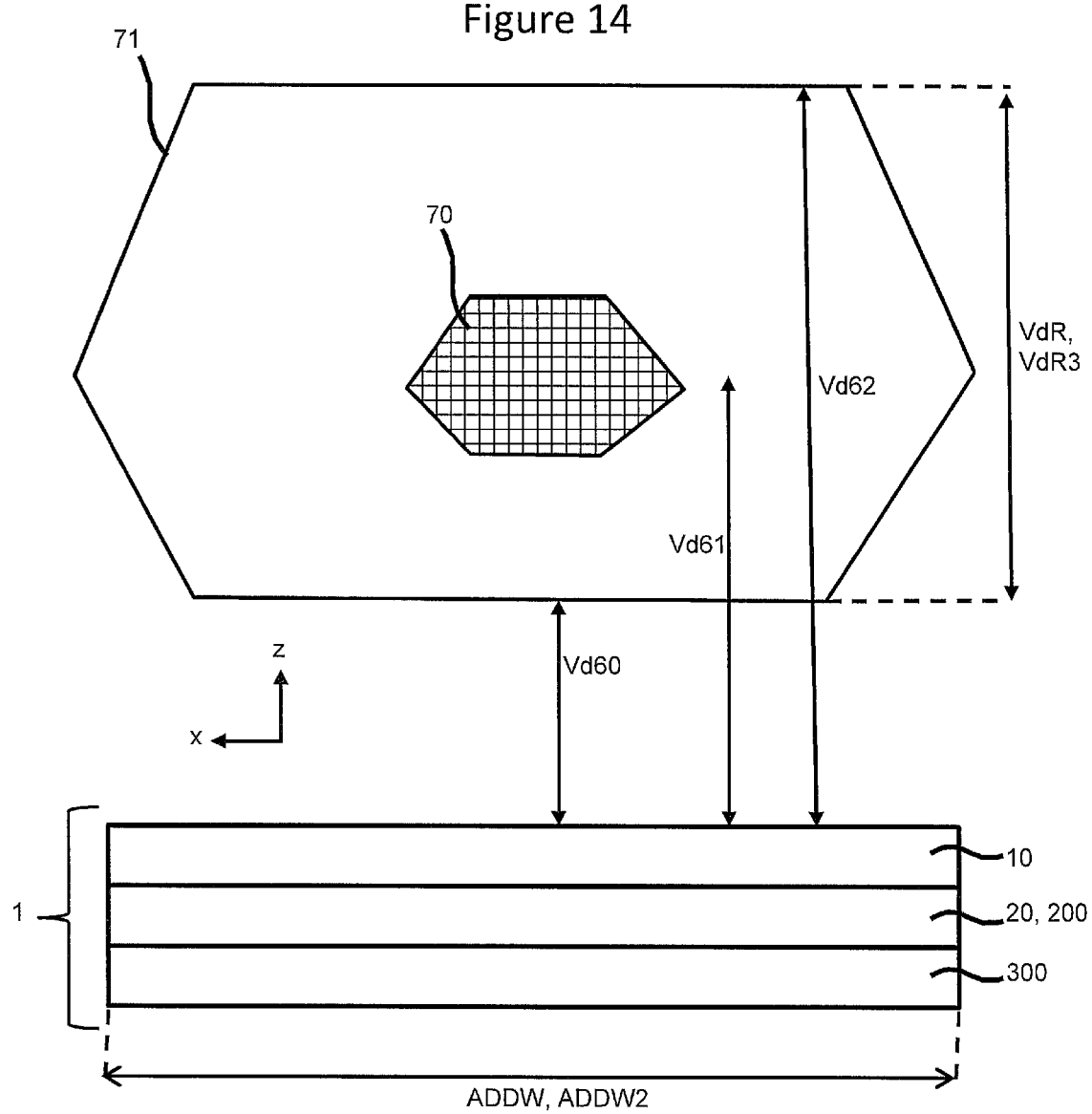
FIG. 14: Illustration of an effective 3D viewing zone

A surprising experimental result was found that has enabled the effective longitudinal viewing distance range VdR to be increased significantly using a parallax barrier design and method that does not actively control the electrode group pitch (φ). This surprising experimental result has enabled the design of a new type of switchable liquid crystal parallax barrier panels 20. The new type of switchable liquid crystal parallax barrier panel 20 enables a larger longitudinal viewing distance range VdR to be realised and thus high quality 3D images may be viewed for a wide variety of head positions. The new type of liquid crystal parallax barrier panel 20 is a multi-region liquid crystal parallax barrier panel 200. With reference to FIG. 14, a multi-region liquid crystal parallax barrier panel 200 enables the 3D viewing zone 70 to be moved in a lateral (left and right) direction and in a longitudinal (forward and backward) direction thus enabling a large effective 3D viewing zone 71 in both the lateral and longitudinal directions. The shape of the effective 3D viewing zone 71 shown in FIG. 14 is for illustrative purposes only. The shape of the effective 3D viewing zone 71 may be square, rectangular, trapezoidal etc. For any given head position, the 3D viewing zone 70 may be relatively small but the ability of the multi-region liquid crystal parallax barrier panel 200 to move the 3D viewing zone 70 left, right, forward and backward creates a large effective 3D viewing zone 71.

In contrast to multi-region liquid crystal parallax barrier panel 200 of the invention, a single region liquid crystal parallax barrier panel with multiple independent electrodes enables the 3D viewing zone 70 to be moved in a lateral (left and right) direction only and consequently a large effective 3D viewing zone 71 may be realised in the lateral direction but not in the longitudinal direction. The multi-region liquid crystal parallax barrier panel 200 is advantageous over a single region liquid crystal parallax barrier panel because it enables a larger effective 3D viewing zone 71 in the longitudinal direction.

Figure 15:
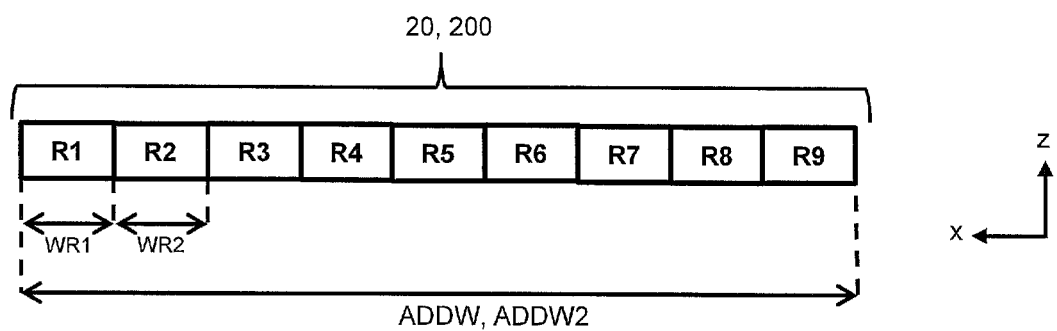
FIG. 15: A multi-region switchable liquid crystal parallax barrier (side view)
Figure 16:
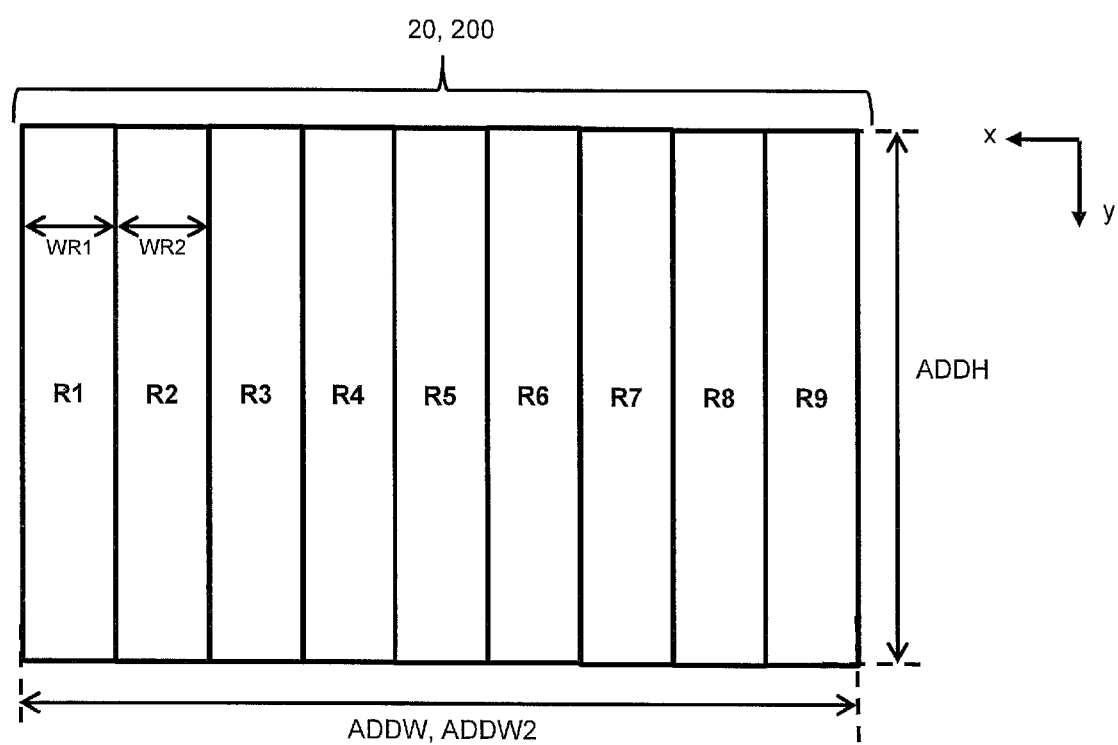
FIG. 16: A multi-region switchable liquid crystal parallax barrier (front view)

An example of a multi-region switchable liquid crystal parallax barrier panel 200 that has 9 regions is shown in FIG. 15 (side view) and FIG. 16 (front view). With reference to FIG. 16 the height of the viewable area of the multi-region switchable liquid crystal parallax barrier panel 200 is shown by ADDH and the width of the multi-region switchable liquid crystal parallax barrier panel 200 is shown by ADDW, ADDW2. With reference to FIG. 16 (front view) the area defined by ADDW×ADDH is the viewable area of the autostereoscopic display device 1 (i.e. the plane of the viewable area of the autostereoscopic display device 1 is coincident with the plane of the page). With reference to FIG. 15 and FIG. 16, region 1 is labelled as "R1", region 2 is labelled "R2" etc. In general, region p is labelled "Rp" where p is an integer. The multi-region switchable liquid crystal parallax barrier panel 200 may have more than 9 regions. The multi-region switchable liquid crystal parallax barrier panel 200 may have fewer than 9 regions. A first advantage of having a greater number of regions enables higher quality 3D image to be perceived by the viewer (i.e. greater accuracy in directing a left image to the left eye 90L and a right image to the right eye 90R, in other words, lower 3D crosstalk). A second advantage of having a greater number of regions enables a larger effective 3D viewing zone 70, especially in the longitudinal direction. An advantage of having fewer regions enables a simpler autostereoscopic display device 1 (simpler drive electronics, simpler implementation etc.). The use of 9 regions was found to be a good compromise between 3D image quality, effective 3D viewing zone size and simplicity of design for an autostereoscopic display device 1 with a display width ADDW in the range 20 cm to 35 cm. The use of 9 regions was found to be a good compromise design for an autostereoscopic display device 1 with a display width ADDW in the range 20 cm to 35 cm and a minimum viewing distance Vd60 in the range 50 cm to 60 cm and a maximum viewing distance Vd62 in the range 80 cm to 100 cm. The use of an odd number of regions was found to be advantageous if the user's head position is substantially centred on-axis when viewing the autostereoscopic display device 1.

The multi-region liquid crystal parallax barrier panel 200 is a novel type of liquid crystal parallax barrier panel 20. With reference to FIG. 1, FIG. 2 and FIG. 3, the positioning of the multi-region liquid crystal parallax barrier panel 200 relative to the image display 10 may be the same as the positioning of the liquid crystal parallax barrier panel 20. Unless stated otherwise, all subsequent embodiments are written in relation to FIG. 2 where the image display panel 10 is disposed on the viewing side 90 of the autostereoscopic display device 1 but it will be appreciated that the multi-region liquid crystal parallax barrier panel 20, 200 may be disposed on the viewing side 90 of the autostereoscopic display device.

A single region liquid crystal parallax barrier panel has a single group of independently addressable electrodes (for example, E1 to E12 as shown in FIG. 4). The single group of independently addressable electrodes are repeated in order to extend across the whole width of the display area ADDW. A multi-region liquid crystal parallax barrier panel 20, 200 of the present invention has at least a first region that includes at least a first group of independently addressable electrodes and at least a second region that includes at least a second group of independently addressable electrodes. The electrodes of the first region are addressed independently of the electrodes pertaining to the second region. In general, a multi-region liquid crystal parallax barrier panel 20, 200 has more than one region. That is, each region R1 . . . R9 of the multi-region parallax barrier has a group of independently addressable electrodes according to one of the examples described herein. For example, each region may include electrodes E1 to E12 having multiple electrode portions. The electrodes in one region are addressable independently of the electrodes in any other region of the parallax barrier panel.

The total number of independently addressable electrodes in a multi-region liquid crystal parallax barrier panel 20, 200 is the sum of the independently addressable electrodes in each of the regions. With reference to FIG. 15 and FIG. 16 if the number of independently addressable electrodes is the same in each region and equals 12, then the total number of independently addressable electrodes is equal to 12×9=108.

The portions of the independently addressable electrodes of the first group pertaining to the first region are repeated in order to extend across the width of the first region (WR1)

of the image display 10. The portions of the independently addressable electrodes of the second group pertaining to the second region are repeated in order to extend across the width of the second region (WR2) of the image display 10, and so on for further regions.

More generally, if the number of independently addressable electrodes is the same in each region, each group contains n independently addressable electrodes and said group is repeated m times (that is, an electrode has m portions) to extend across the width of the pth region (WRp) of the image display 10, where m is an integer. The width of the first region WR1 may be equal to, approximately equal to or not equal to the width of the second region WR2. In general, width of the pth region WRp may be the equal to, approximately equal to or not equal to the width of the p+1 region WRp+1, where p is an integer running from 1 to P, where there are P regions. Unless stated otherwise, for all subsequent embodiments the width of each region is approximately the same. Where two regions have the same width as one another, $m_p$ (where $m_p$ is the value of m for the $p^{th}$ region) may have the same value for each region.

A multi-region liquid crystal parallax barrier panel can operate in one or more modes. In one mode the parallax barrier panel addresses the electrodes in one region and the electrodes in another region on the basis of a received drive signal such the electrodes in one region define a first parallax barrier array in that region and the electrodes in another region define a different parallax barrier array. As described below, for example, with reference to FIG. 13, this can provide a better 3-D image quality for some viewing distances of the observer from the display panel.

The parallax barrier panel may additionally, based on a second drive signal, address the electrodes in the regions of the parallax barrier such that the same parallax barrier array is defined in every region of the panel. As described below, for example, with reference to FIG. 13, there is a viewing distance for which the best 3-D image quality occurs when a uniform parallax barrier array is defined across the entire panel (in the example of FIG. 13, for a viewing distance of 730 mm).

The parallax barrier panel may additionally or alternatively, based on a third drive signal, address the electrodes in the regions of the parallax barrier such that the parallax barrier panel provides no imaging function. An image display panel associated with the parallax barrier panel can then operate in a conventional 2-D display mode.

The first and second drive signal may be derived, for example, using an input from one or more position sensors that determine the separation of the observer from the panel (i.e. determine the viewing distance). The desired configuration of parallax barrier in each region of the parallax barrier panel can then be determined from prestored information such as that shown in FIG. 13 or may be calculated afresh each time, and the electrodes in each region are addressed accordingly. The third drive signal may for example be derived from an input display signal or a user input that indicates that a 2-D display mode is desired.

Figure 12:
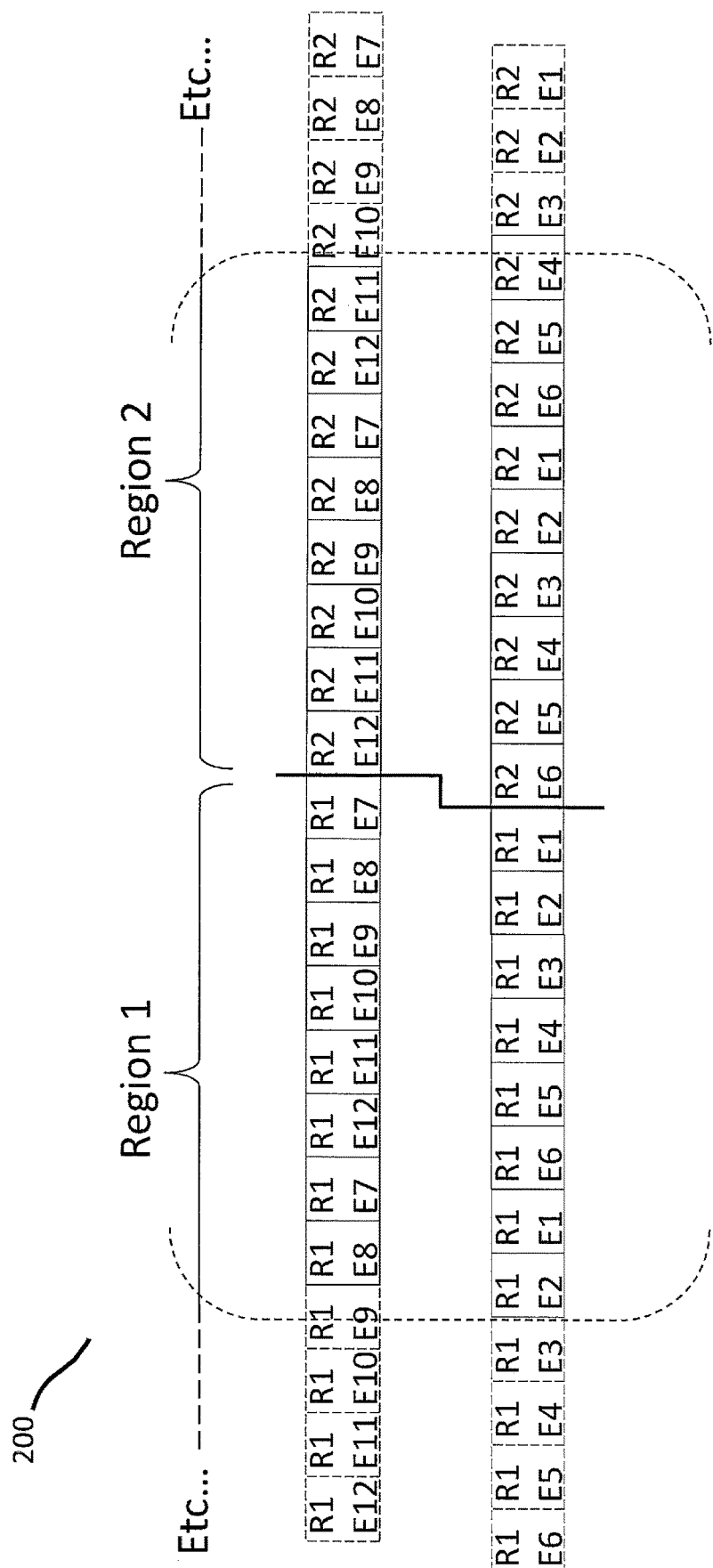
FIG. 12: Electrode configuration showing the boundary between a first region and a second region

With reference to FIG. 12, a schematic layout of independently addressable electrodes at the boundary between a first region (for example, Region 1) and a second region (for example, Region 2) are shown for a multi-region switchable liquid crystal parallax barrier panel 200. FIG. 12 is drawn in relation to the electrode configuration shown by either FIG. 4 or FIG. 8. For clarity, the substrates, polarisers, LC alignment layers etc. are not shown in FIG. 12. Region 1 has 12 independently addressable electrodes in a group, labelled R1E1 to R1E12. The electrodes of Region 1 have a cyclic arrangement, with electrode E1 adjacent to electrode E2 and electrode E6 etc. The electrodes of Region 1 have a cyclic arrangement, with electrode E7 adjacent to electrode E8 and electrode E12 etc. Region 2 has 12 independently addressable electrodes in a group, labelled R2E1 to R2E12. The electrodes of Region 2 have a cyclic arrangement, with electrode E1 adjacent to electrode E2 and electrode E6 etc. The electrodes of Region 2 have a cyclic arrangement, with electrode E7 adjacent to electrode E8 and electrode E12 etc. The cyclic arrangement of electrodes is preserved at the boundary between Region 1 and Region 2. For example, electrode E7 is always adjacent to electrode E8 and E12. Each unique electrode label signifies an independently addressable electrode. FIG. 12 shows 24 independently addressable electrodes.

With reference to FIG. 4, FIG. 5, FIG. 6, FIG. 7 and FIG. 8 the electrode arrangement of a given region (R1, R2 etc.) of the multi-region liquid crystal parallax barrier panel 200 may be the same as the liquid crystal parallax barrier panel 20. The number of independently addressable electrodes in a group pertaining to the first region may be the same as, or differ from, the number of independently addressable electrodes in another group pertaining to the second region. In general, the number of independently addressable electrodes in the pth region may be the same as or different from the number of independently addressable electrodes in the (p+1)th region. Unless stated otherwise, for all subsequent embodiments it will be assumed that the number of independently addressable electrodes in each group pertaining to each region is the same and for example is equal to 12 (except for an end group which, as described below, contains fewer electrodes than other groups).

With reference to FIG. 5, the width, W, of each electrode associated with the first region of the multi-region liquid crystal parallax barrier panel 200 may be the same as, approximately the same as, or different from, the width of each electrode associated with the second region of the multi-region liquid crystal parallax barrier panel 200. In general, the width, W, of each electrode associated with the region p of the multi-region liquid crystal parallax barrier panel 200 may be the same as, approximately the same as or different from, the width of each electrode associated with the region p+1 of the multi-region liquid crystal parallax barrier panel 200, where p is an integer. Unless stated otherwise, for all subsequent embodiments it will be assumed that width, W, of each electrode in each region of the multi-region liquid crystal parallax barrier panel 200 is the same.

With reference to FIG. 5, the gap, G, between each electrode associated with the first region of the multi-region liquid crystal parallax barrier panel 200 may be the same, approximately the same or different from, the gap of each electrode associated with the second region of the multi-region liquid crystal parallax barrier panel 200. In general, the gap, G, between each electrode associated with the region p of the multi-region liquid crystal parallax barrier panel 200 may be the same, approximately the same or different from, the gap between each electrode associated with the region p+1 of the multi-region liquid crystal parallax barrier panel 200, where p is an integer. Unless stated otherwise, for all subsequent embodiments it will be assumed that gap, G, between each electrode in each region of the multi-region liquid crystal parallax barrier panel 200 is the same.

With reference to FIG. 5, electrode pitch, EP, associated with the first region of the multi-region liquid crystal parallax barrier panel 200 may be the same, approximately the same or different from, the electrode pitch associated with the second region of the multi-region liquid crystal parallax barrier panel 200. In general, the electrode pitch, EP, associated with the region p of the multi-region liquid crystal parallax barrier panel 200 may be the same, approximately the same or different from, the electrode pitch, EP, associated with the region p+1 of the multi-region liquid crystal parallax barrier panel 200, where p is an integer. Unless stated otherwise, for all subsequent embodiments it will be assumed that electrode pitch, EP, in each region of the multi-region liquid crystal parallax barrier panel 200 is the same.

Figure 10:
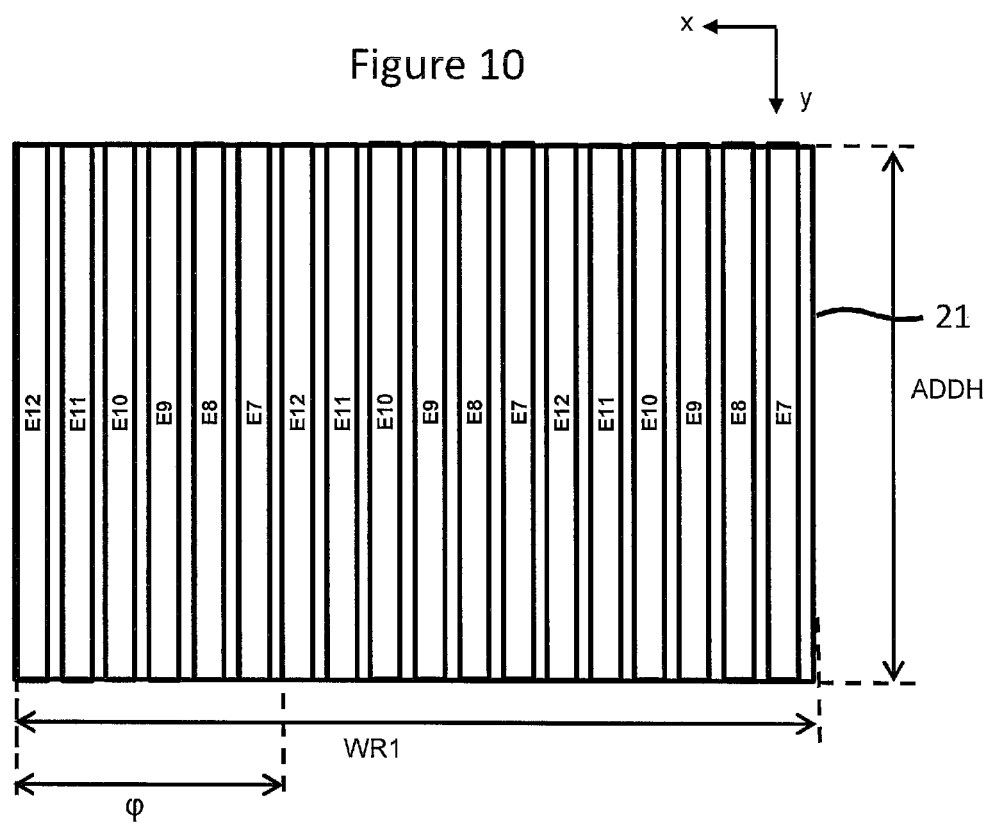
FIG. 10: Electrode arrangement on the first substrate pertaining to the first region.

With reference to FIG. 10, an example of the cyclic electrode layout on the first substrate 21 of the first region, R1, is shown. The electrodes (labelled E7, E8, E9, E10, E11 and E12) extend across the entire height ADDH of the display area. The group pitch, $\varphi$, is also shown. FIG. 10 illustrates the group pitch repeated 3 times in order to fill the width WR1 of the first region R1. In practice, the group pitch may be repeated ml times in order to fill the width WR1 of the first region, where ml is an integer (and generally the group pitch may be repeated mp times in order to fill the width WRp of the pth region). The electrodes pertaining to the first substrate are connected to drive electronics (not shown) via electrical connections (not shown) that are placed outside of the display viewing area. In other words, FIG. 10 illustrates a plurality of first electrodes pertaining to a first region, the first electrodes being independently addressable from one another and comprising two or more electrode portions extending along a first direction (y-direction) and laterally spaced from one another along a second direction (x-direction) different from the first direction, the electrode portions of the first electrodes being arranged in a cyclic arrangement. That is the electrode portions E12 in FIG. 10 are portions of the same electrode (the 12th electrode), and are electrically connected together by a conductive wiring portion that is not shown in FIG. 10. Similarly, the electrode portions E11 in FIG. 10 are portions of the 11th electrode and are electrically connected together, and so on.

Figure 11:
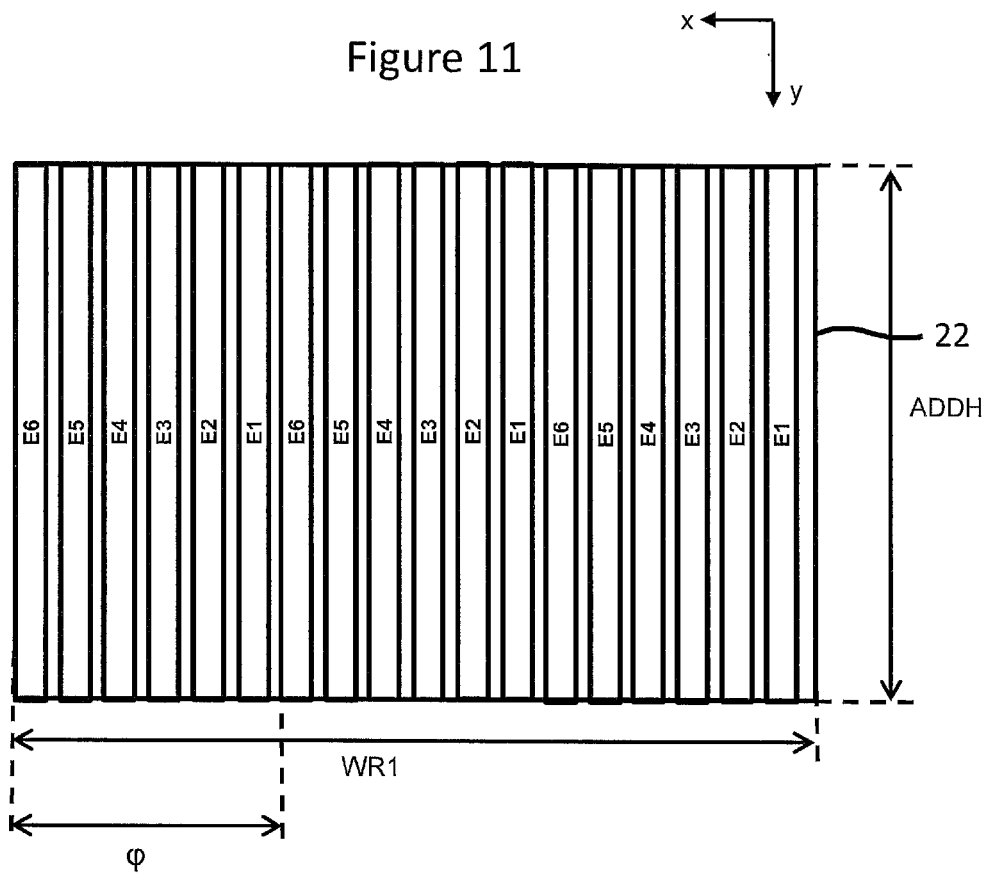
FIG. 11: Electrode arrangement on the second substrate pertaining to the first region.

With reference to FIG. 11, an example of the cyclic electrode layout on the second substrate 22 of the first region, R1, is shown. The electrodes (labelled E1, E2, E3, E4, E5 and E6) extend across the entire height ADDH of the display area. The group pitch, p, is also shown. FIG. 10 illustrates the group pitch repeated 3 times in order to fill the width WR1 of the first region R1. In practice, the group pitch may be repeated ml times in order to fill the width WR1 of the first region, where ml is an integer (and generally the group pitch may be repeated mp times in order to fill the width WRp of the pth region). The electrodes pertaining to the second substrate are connected to drive electronics (not shown) via electrical connections (not shown) that are placed outside of the display viewing area. In other words, FIG. 11 illustrates a plurality of first electrodes pertaining to a first region, the first electrodes being independently addressable from one another and comprising two or more electrode portions extending along a first direction (y-direction) and laterally spaced from one another along a second direction (x-direction) different from the first direction, the electrode portions of the first electrodes being arranged in a cyclic arrangement. That is the electrode portions E6 in FIG. 11 are portions of the same electrode (the 6th electrode), and are electrically connected together by a conductive wiring portion that is not shown in FIG. 11. Similarly, the electrode portions E5 in FIG. 11 are portions of the 5th electrode and are electrically connected together, and so on.

With reference to FIG. 4, FIG. 5, FIG. 6, FIG. 7, FIG. 8, FIG. 10 and FIG. 11 the electrodes pertaining to the first substrate 21 are offset from the electrodes pertaining to the second substrate 22 by an amount equal to, or approximately equal to, half the electrode pitch/2 i.e. EP/2.

With reference to FIG. 13 for a given head position, the first region, R1, may be addressed to define a parallax barrier having a first slit position number and the second region, R2, may be addressed to define a parallax barrier having a second slit position number. The first slit position number may be the same as the second slit position number (that is, the same parallax barrier array is defined in the first region and the second region), or the first slit position number may be different from the second slit position number (that is, different parallax barrier arrays are defined in the first region and the second region). In general, the slit position number of each region (R1, R2 etc.) of the multi-region liquid crystal parallax barrier panel 20, 200 may independently controlled. It may be advantageous to design the multi-region liquid crystal parallax barrier panel 200 with sufficient regions so that the slit position number of adjacent regions never be required to differ by more than 1 slit position number for all head positions. With reference to FIG. 9, slit position 1 is adjacent to slit position 2 and slit position 12.

With reference to FIG. 13, an example of the slit position number for each region (R1, R2 etc.) is shown for an on-axis viewer of the autostereoscopic display device 1 (i.e. the viewer's head position has a constant lateral position situated in the middle of the autostereoscopic display device 1) at various distances from the autostereoscopic display device 1. Driving the regions of the display such that the regions have a parallax barrier with a slit position number according to a row of FIG. 3 will ensure a good quality 3D display for a viewer at a distance from the display corresponding to that row. An on-axis viewer can be considered to be at position x=0, with left of centre viewing being a negative x position and right of centre viewing being a positive x position. As described previously, the slit position number for a conventional single region switchable liquid crystal parallax barrier panel 20 only changes as a function of lateral head position. In contrast, the slit position number for a multi-region switchable liquid crystal parallax barrier panel 200 may change as a function of lateral head position and/or longitudinal head position in order to provide high quality 3D images across then whole display area of the autostereoscopic display device 1. As shown in FIG. 13, the slit position number changes for some regions as the viewing distance (i.e. longitudinal head position) is changed. As also shown there is a viewing distance for which every region of the parallax barrier panel has the same slit position number when addressed for an observer at this viewing distance (in this example a viewing distance of 730 mm). Preferably the parallax barrier panel is configured such that every region of the parallax barrier panel has the same slit position number at the design viewing distance. This viewing distance (Vd) may be selected via solving the equation: $\varphi=2PP/Vd(Vd+s/n)$. At the design viewing distance, the electrode group pitch, $\varphi$, is chosen such that the same slit position number is required for all regions. To a first approximation, for relatively small lateral head movement to the left, all slit position numbers shown in FIG. 13 decrease by the same amount. To a first approximation, for relatively small lateral head movement to the right, all slit position numbers shown in FIG. 13 increase by the same amount. As shown in FIG. 13, as the on-axis viewer's distance departs from the design viewing distance, the slit position number for the regions at the edge of the autostereoscopic display device 1 (i.e. R1 and R9) change first. The further the on-axis viewer departs from the design viewing distance, the greater the change in slit position number of the regions at the edge of the autostereoscopic display device 1 (i.e. R1 and R9) relative to the central region (R5).

With reference to FIG. 9, FIG. 12 and FIG. 13, when the slit position number of two adjacent regions (for example, R3 and R4) is the same, then the width of the slit that is situated closest to the boundary of the adjacent regions (for example, R3 and R4) is equal to 3*EP. In other words, there is no discontinuity in the slit position in adjacent regions when the slit position number in adjacent regions is the same. With reference to FIG. 13, the slit position number at viewing distance 580 mm in R4 is 7 and R3 is 8. This means that the width of the slit that is situated closest to the boundary of the adjacent regions is equal to ((3*EP)+(EP/2)). With reference to FIG. 13, the slit position number at viewing distance 900 mm in R4 is 7 and R3 is 6. This means that the width of the slit that is situated closest to the boundary of the adjacent regions is equal to ((3*EP)−(EP/2)). It is may be advantageous that the slit situated closest to the boundary of two adjacent regions has a maximum width of ((3*EP)+(EP/2)) and a minimum width of ((3*EP)−(EP/2)) to enable high quality 3D viewing (low 3D crosstalk) for distances departed from the design viewing distance.

A first general design rule for determining the number of regions required involves using an analytical method or optical simulation software (ray racing) to determine the maximum region width (WRp maximum) required to enable high quality 3D viewing (low 3D crosstalk) for the desired viewing distance range VdR. The width ADDW of the autostereoscopic display device 1 divided by the WRp maximum yields the number of required regions in the multi region liquid crystal parallax barrier panel 200. A second general design rule for determining the number of regions required involves using an analytical method or optical simulation software (ray racing) to ensure that the slit position number between two adjacent regions is never required to be larger than 1. For example, if R3 has a slit position number of 7, then R2 may have a slit position number of 6 or 7 or 8 only. In other words, the maximum change in slit position between two adjacent regions is equal to the distance EP/2. The first general design rule and second general design rule may be considered together in order to design a multi-region liquid crystal parallax barrier panel 200 design that enables viewing of high quality 3D images for the desired range of lateral and longitudinal head position.

Parameters used in optical simulation software (ray tracing) in order to satisfy these first and second general design rules described above may include: maximum viewing distance Vd62, minimum viewing distance Vd60, design viewing distance Vd61, width of image panel ADDW, ADDW2, pixel pitch PP of image panel 10, pixel aperture in the x-direction (second direction) of the image panel, barrier width BR, slit width SL, electrode pitch EP, group pitch φ (parallax barrier pitch) and number of independently addressable electrodes per region. Another parameter that may be required for the optical simulation is the distance between the image display panel LC layer 13 to multi-region liquid crystal parallax barrier panel 20, 200 LC layer 23. The design viewing distance Vd61 may be equal to the minimum viewing distance Vd60 or may be equal to the maximum viewing distance Vd62 or may be between the minimum and maximum viewing distances Vd60, Vd62.

A first example of an autostereoscopic display device 1 with a rear barrier (see FIG. 2) is as follows: maximum viewing distance (Vd62)=900 mm, minimum viewing distance (Vd60)=580 mm, design viewing distance (Vd61)=740 mm, pixel pitch PP of image display panel 10 in x-direction=50.7 µm, width of image panel ADDW, ADDW2=5760*50.7 µm=292.032 mm, pixel aperture in the x-direction 21 µm (i.e. the pixel pitch PP comprises a transmissive aperture part and a non-transmissive part), barrier width BR=50.742 µm, slit width SL=50.742 µm, group pitch φ (parallax barrier pitch)=101.484 µm and 12 independently addressable electrodes per region arranged as shown in FIG. 4. The distance between the image display panel LC layer 13 to multi-region liquid crystal parallax barrier panel 20, 200 LC layer 23 was 0.92 mm. Simulation results suggested that the first example of an autostereoscopic display device 1 required between 5 and 13 evenly spaced regions with a further optimised design requiring between 7 and 11 evenly spaced regions. An autostereoscopic display device 1 according to the first example was fabricated with 9 evenly spaced regions (R1 to R9). The first example of an autostereoscopic display device 1 had pixels 5760 pixels in the x-direction and 1080 pixels in the y-direction. Therefore each region (R1 to R9) was the width of substantially (within 2 significant figures) 640 image display panel 10 pixels (i.e. WRp=640*50.7 µm where p is an integer from 1 to 9). The pixels in the x-direction had the same colour in order to avoid colour artefact problems. The pixels in the y-direction had a cyclic arrangement of red, green, blue; the three colours comprising a white pixel. The pixel pitch in the x-direction was 50.7 µm wide. Each colour pixel in the y-direction was 33.8 µm long. A white pixel of the image display panel 10 therefore measured 50.7 µm in the x-direction (second direction) and 101.4 µm in the y-direction (first direction). The use of 9 regions with 12 independently addressable electrodes per region for this first example was found to be a good design trade-off enabling relatively low complexity for the electrode layout and viewing of high quality 3D images for an appropriately large range of head positions. A second example of an autostereoscopic display device 1 with a rear barrier (see FIG. 2) is as follows: maximum viewing distance (Vd62)=900 mm, minimum viewing distance (Vd60)=580 mm, design viewing distance (Vd61)=740 mm, pixel pitch PP of image display panel 10 in x-direction=93.75 µm, width of image panel ADDW, ADDW2=2560*93.75 µm=240 mm, pixel aperture in the x-direction 52.75 µm (i.e. the pixel pitch PP comprises a transmissive aperture part and a non-transmissive part), barrier width BR=93.891 µm, slit width SL=93.891 µm, group pitch φ (parallax barrier pitch)=187.782 µm and 12 independently addressable electrodes per region arranged as shown in FIG. 4. The distance between the image display panel LC layer 13 to multi-region liquid crystal parallax barrier panel 20, 200 LC layer 23 was 1.7 mm. Simulation results suggested that the second example of an autostereoscopic display device 1 required between 5 and 11 evenly spaced regions with a further optimised design requiring between 7 and 9 evenly spaced regions. An autostereoscopic display device 1 according to the second example was fabricated with 9 substantially (to within 2 significant figures) evenly spaced regions (R1 to R9). The second example of an autostereoscopic display device 1 had pixels 2560 pixels in the x-direction and 542 pixels in the y-direction. Region R5 (centre region) had a width of substantially (within 2 significant figures) 288 image display panel pixels (i.e. WR5=288*93.75 µm) and the remaining regions (R1, R2, R3, R4, R6, R7, R8 and R9) each had a widths of substantially (within 2 significant figures) of 284 image display panel 10 pixels wide (WR1=WR2=WR3=WR4=WR6=WR7=WR8=WR9= 284*93.75 μm). The pixels in the x-direction had the same colour in order to avoid colour artefact problems. The pixels in the y-direction had a cyclic arrangement of red, green, blue; the three colours comprising a white pixel. The pixel pitch in the x-direction was 93.75 μm wide. Each colour pixel in the y-direction was 62.5 μm long. A white pixel of the image display panel 10 therefore measured 93.75 μm in the x-direction (second direction) and 187.5 μm in the y-direction (first direction). The use of 9 regions with 12 independently addressable electrodes per region for this second example was found to be a good design trade-off enabling relatively low complexity for the electrode layout and viewing of high quality 3D images for an appropriately large range of head positions.

With reference to FIG. 13, for a given lateral and longitudinal head position (x, z), each region has an associated slit position number. The set of slit position numbers for a given head position (x, z) is henceforth referred to as a slit pattern or a barrier pattern. The slit pattern for a given head position (x, z) defines the slit position number in each region for every group of independently addressable electrodes.) For example, with reference to FIG. 13, the slit pattern for head position x=0 mm, z=580 mm is 9 8 8 7 7 7 6 6 5. A slit pattern determines the electrode state (ON or OFF) for each electrode of the multi-region liquid crystal parallax barrier panel 20, 200. The slit pattern that enables optimum viewing of high quality 3D images (low 3D crosstalk) may be ascertained by an analytical approach and/or optical simulation software (ray tracing) and/or experiment. The use of experiment to determine the optimum slit pattern may be advantageous in eliminating construction errors in the autostereoscopic display device 1. In other words, use of experiment to determine the optimum slit pattern may be used to calibrate the autostereoscopic display device 1.

With reference to FIG. 13, for a given lateral and longitudinal head position (x, z), Region 1 may have a slit position number that is either greater than, less than or equal to the slit position number of Region 2. If the slit position number of Region 1 does not equal the slit position number of Region 2 then the difference between the slit position numbers is preferably never greater than 1 to ensure viewing of high quality 3D images. In general, the multi-region liquid crystal parallax barrier 200 is designed so that the slit position number of adjacent regions never differs by more than 1 slit position number for all head positions. Unless stated otherwise, it is assumed that for all subsequent embodiments that the slit position number of adjacent regions never differs by more than 1.

Figure 17:
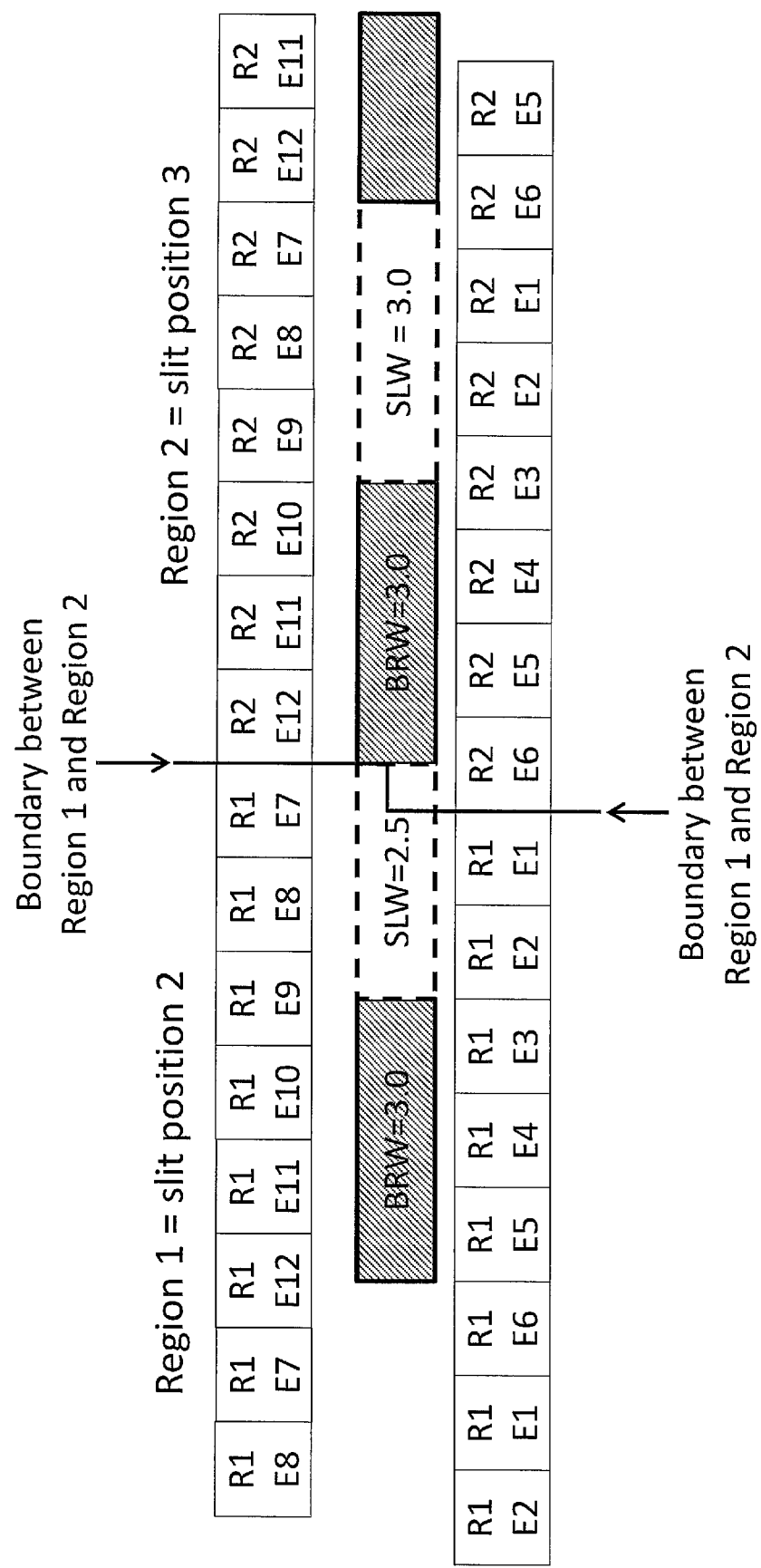
FIG. 17: Slit positions in a first region and in a second region

With reference to FIG. 17, the situation is considered when Region 1 is addressed to define in Region 1 a parallax barrier having slit position number 2 (this will generally be shortened to "has slit position 2" for brevity) and Region 2 has slit position 3. The group of electrodes (R1E1 to R1E12) pertaining to Region 1 may repeat many times across the width of Region 1. The group of electrodes (R2E1 to R2E12) pertaining to Region 2 may repeat many times across the width of Region 2. For diagrammatic clarity, only electrodes in proximity of the boundary between Region 1 and Region 2 are shown in FIG. 17. The boundary between Region 1 and Region 2 is shown with a solid line. With reference to FIG. 9, electrodes E5, E4 and E3 are turned on to enable a barrier in Region 1 (having slit position 2). With reference to FIG. 9, electrodes E12, E11 and E10 are turned on to enable a barrier in Region 2 (having slit position 3). With reference to FIG. 17, if the width of each electrode is considered to be 1.0 unit wide (electrode gaps have been ignored for diagrammatic clarity) then the barrier widths in Region 1 are 3.0 units wide (BRW=3.0) and the barrier widths in Region 2 are also 3.0 units wide (BRW=3.0). The majority of slits in Region 1 are 3.0 units wide (SLW=3.0) and the majority of slits in Region 2 are also 3.0 units wide. However, there will exist a single slit 2.5 units wide (SLW=2.5) that is located either in close proximity to, or straddling the boundary of, Region 1 and Region 2. With reference to FIG. 17, a slit 2.5 units wide is shown to exist straddling the boundary between Region 1 and Region 2. The human eye is very perceptive to changes that occur in an otherwise regular pattern and therefore the irregular slit width of 2.5 units (SLW=2.5) may be visible. Visibility of the irregular slit width may degrade the viewer's impression of the 3D image quality. In general, a similar discussion is true for any two adjacent regions whereby Region p has slit position number i and Region p+1 has slit position number i+1 where p and i are integers.

Figure 18:
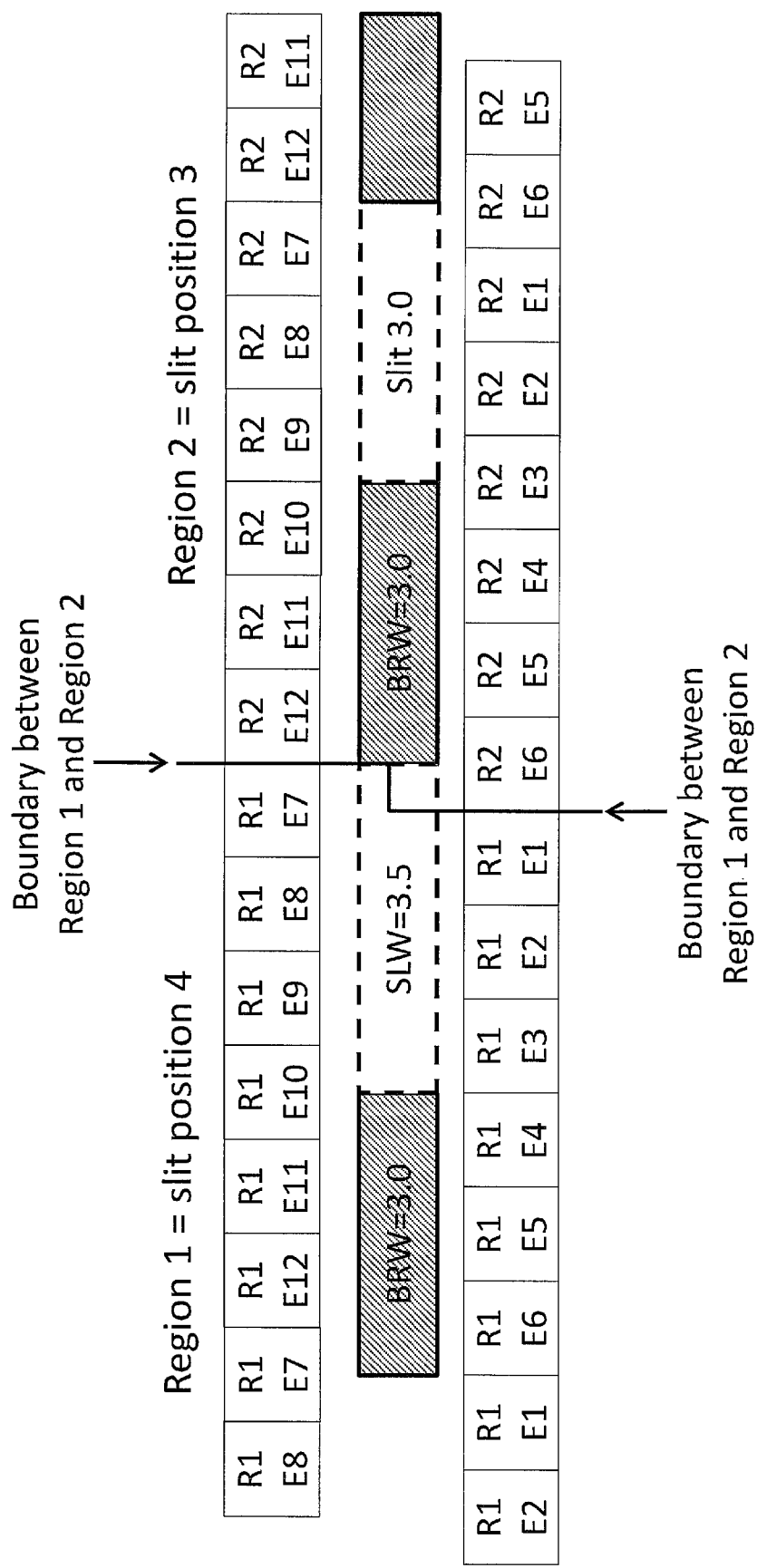
FIG. 18: Slit positions in a first region and in a second region

With reference to FIG. 18, the situation is considered when Region 1 has slit position 4 and Region 2 has slit position 3. The group of electrodes (R1E1 to R1E12) pertaining to Region 1 may repeat many times across the width of Region 1. The group of electrodes (R2E1 to R2E12) pertaining to Region 2 may repeat many times across the width of Region 2. For diagrammatic clarity, only electrodes in proximity of the boundary between Region 1 and Region 2 are shown in FIG. 18. The boundary between Region 1 and Region 2 is shown with a solid line. With reference to FIG. 9, electrodes E6, E5 and E4 are turned on to enable a barrier in Region 1. With reference to FIG. 9, electrodes E12, E11 and E10 are turned on to enable a barrier in Region 2. If the width of each electrode is considered to be 1.0 unit wide (electrode gaps have been ignored for diagrammatic clarity) then the barrier widths in Region 1 are 3.0 units wide (BRW=3.0) and the barrier widths in Region 2 are also 3.0 units wide (BRW=3.0). The majority of slits in Region 1 are 3.0 units wide (SLW=3.0) and the majority of slits in Region 2 are also 3.0 units wide. However, there will exist a single slit 3.5 units wide (SLW=3.5) that is located either in close proximity to, or straddling the boundary of, Region 1 and Region 2. With reference to FIG. 18, a slit 3.5 units wide is shown to exist straddling the boundary between Region 1 and Region 2. The human eye is very perceptive to changes that occur in an otherwise regular pattern and therefore the irregular slit width of 3.5 units (SLW=3.5) may be visible. Visibility of the irregular slit width may degrade the viewer's impression of the 3D image quality. In general, a similar discussion is true for any two adjacent regions whereby Region p has slit position number i and Region p+1 has slit position number i−1 where p and i are integers.

Figure 19:
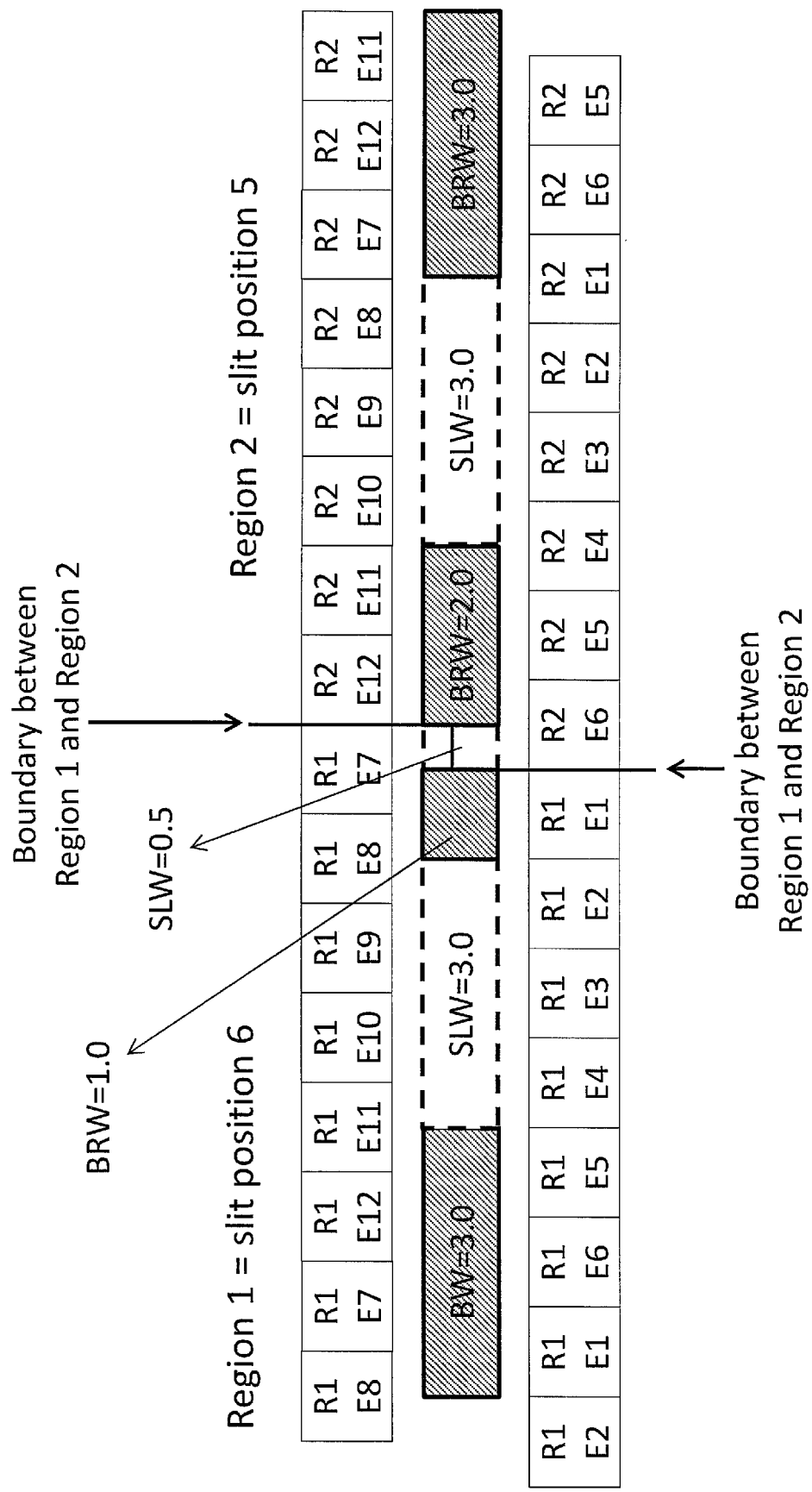
FIG. 19: Slit positions in a first region and in a second region

With reference to FIG. 19, the situation is considered when Region 1 has slit position 6 and Region 2 has slit position 5. The group of electrodes (R1E1 to R1E12) pertaining to Region 1 may repeat many times across the width of Region 1. The group of electrodes (R2E1 to R2E12) pertaining to Region 2 may repeat many times across the width of Region 2. For diagrammatic clarity, only electrodes in proximity of the boundary between Region 1 and Region 2 are shown in FIG. 19. The boundary between Region 1 and Region 2 is shown with a solid line. With reference to FIG. 9, electrodes E1, E6 and E5 are turned on to enable a barrier in Region 1. With reference to FIG. 9, electrodes E7, E12 and E11 are turned on to enable a barrier in Region 2. If the width of each electrode is considered to be 1.0 unit wide (electrode gaps have been ignored for diagrammatic clarity) then the majority of barrier widths in Region 1 are 3.0 units wide (BRW=3.0) and the majority of barrier widths in Region 2 are also 3.0 units wide (BRW=3.0). The majority of slits in Region 1 are 3.0 units wide (SLW=3.0) and the majority of slits in Region 2 are also 3.0 units wide. However, there will exist a combination of slit (SL) and barriers (BR) between Region 1 and Region 2 which includes a barrier width of 1.0 units (BRW=1.0) which is adjacent to a slit width of 0.5 units (SLW=0.5) which is adjacent to a barrier width of 2.0 units (BRW=2.0). The human eye is very perceptive to changes that occur in an otherwise regular pattern and therefore the irregular pattern of slit widths and barriers widths that occur straddling the boundary of Region 1 and Region 2 may be visible. Visibility of the irregular slit width may degrade the viewer's impression of the 3D image quality. In general, a similar discussion is true for any two adjacent regions labelled Region p and Region p+1 where p is an integer.

Figure 20:
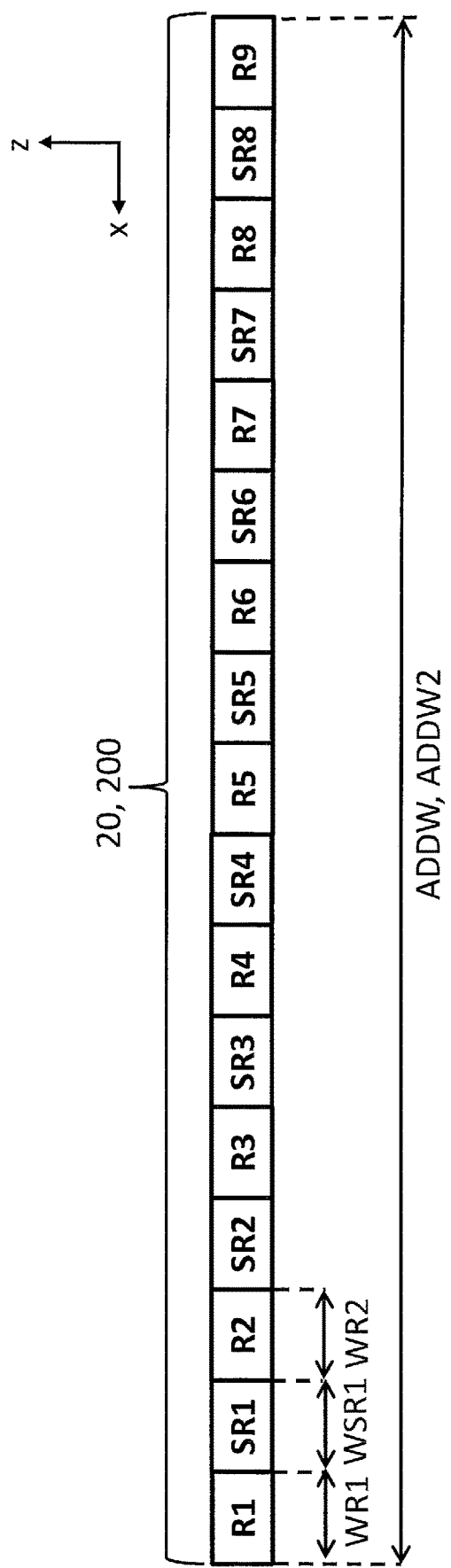
FIG. 20: A multi-region switchable liquid crystal parallax barrier (side view)
Figure 21:
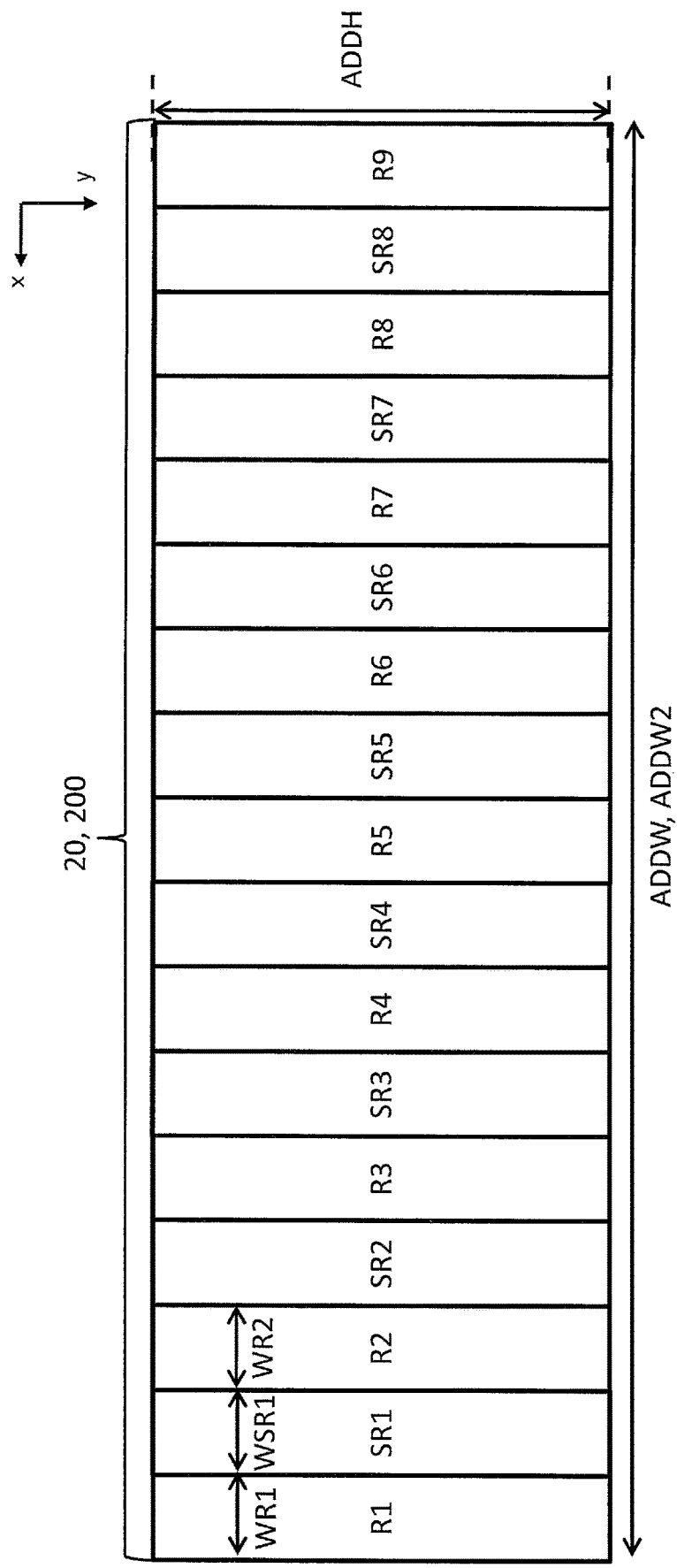
FIG. 21: A multi-region switchable liquid crystal parallax barrier (front view)

With reference to FIG. 20 and FIG. 21 the use of a sub-region situated between two adjacent regions in the multi-region liquid crystal parallax barrier panel 200 was found to obscure the line artefact problem as illustrated in FIG. 19 from the viewer. Obscuring line artefacts has the advantage of improving the perceived quality of the 3D image. Sub-Region 1 (SR1) is situated between Region 1 (R1) and Region 2 (R2), Sub-Region 2 (SR2) is situated between Region 2 (R2) and Region 3 (R3). In general, Sub-Region p (SRp) is situated between Region p (Rp) and Region p+1 (Rp+1) where p is an integer. It will be appreciated that there will be one fewer Sub-Region than there are Regions so that, when denoting Sub-Regions, the index p adopts integer values between 1 and P−1 whereas when denoting Regions the index p adopts integer values between 1 and P (giving P regions and P−1 Sub-Regions). As is described in detail below Sub-Region p acts as a compensation region, since it wholly or partially compensates for any discontinuity between the parallax barrier array in Region p and the parallax barrier array in Region (p+1).

Each sub-region (SR1, SR2, SR3, SR4, SR5, SR6, SR7 and SR8) includes independently addressable electrodes. The electrodes pertaining to the Sub-Region p (SRp) where p is an integer, are addressed independently of the electrodes in the other sub-regions. The electrodes pertaining to the Sub-Region p (SRp) where p is an integer are addressed independently of the electrodes in all of the Regions Rp. The width of Sub-Region p (SRp) is denoted as WSRp where p is an integer.

Figure 22:
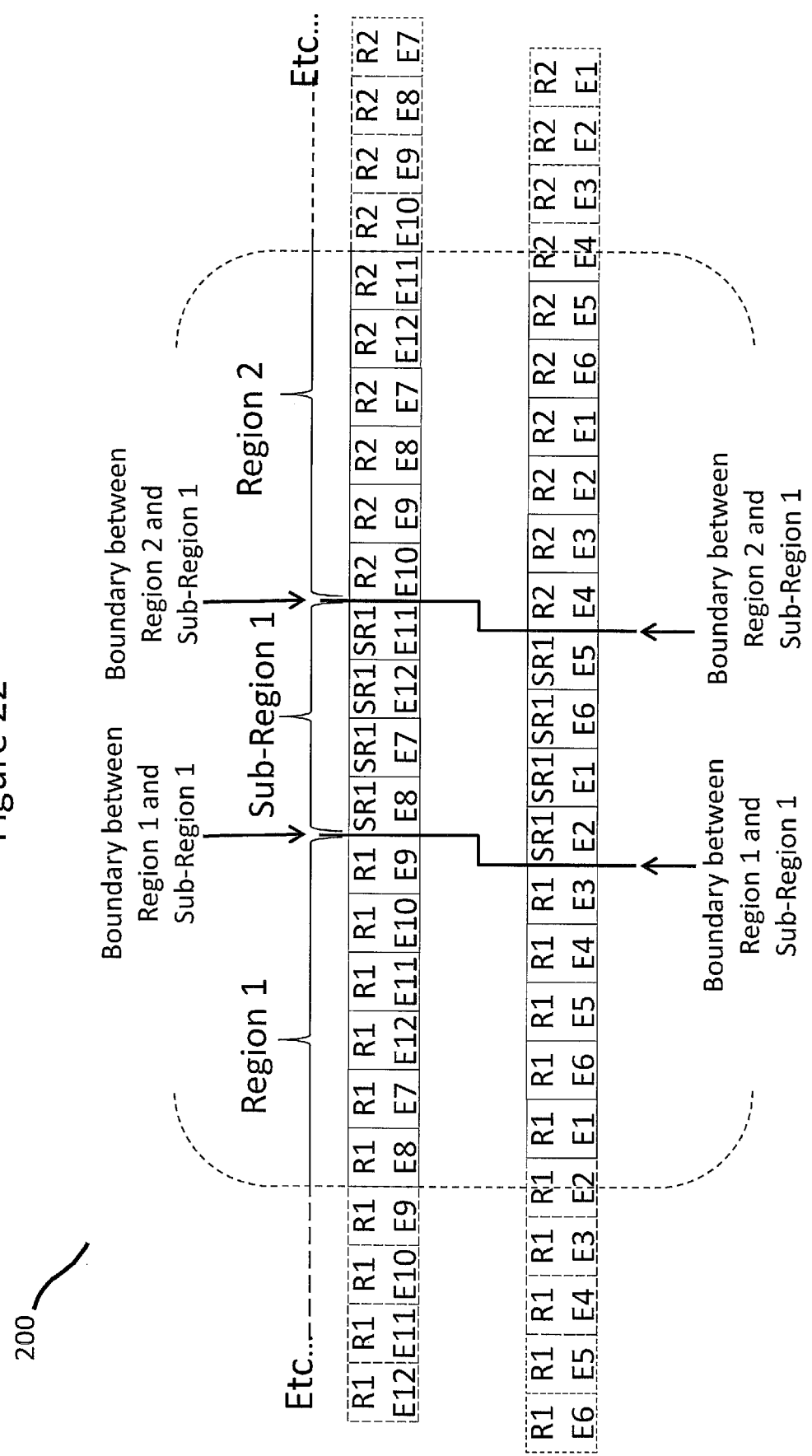
FIG. 22: Electrode configuration showing a first region, a sub-region and a second region

With reference to FIG. 22, there is shown an example of an electrode arrangement in a multi-region liquid crystal parallax barrier panel 200 that includes at least a first region (Region 1), at least a second region (Region 2) and at least a first sub-region (Sub-Region 1). The first sub-region (Sub-Region 1) is situated between and, in this example, adjacent to the first region (Region 1) and the second region (Region 2). Each uniquely labelled electrode is an independently addressable electrode. For example, electrode R1E12 is addressed independently electrode SR1E12 and electrode R1E12 is addressed independently of electrode R2E12 and electrode SR1E12 is addressed independently of electrode R2E12. Region 1 includes 12 independently addressable electrodes labelled R1E1, R1E2, R1E3, R1E4, R1E5, R1E6, R1E7, R1E8, R1E9, R1E10, R1E11 and R1E12. Region 2 includes 12 independently addressable electrodes labelled R2E1, R2E2, R2E3, R2E4, R2E5, R2E6, R2E7, R2E8, R2E9, R2E10, R2E11 and R2E12. Sub-Region 1 includes 8 independently addressable electrodes labelled SR1E1, SR1E2, SR1E5, SR1E6, SR1E7, SR1E8, SR1E11 and SR1E12. The total number of independently addressable electrodes shown in FIG. 22 is 32 (12+8+12). The 12 independently addressable electrodes of Region 1 form a group of electrodes that may be repeated to cover the width of Region 1; however, the last group of electrodes at the right hand edge of Region 1 does not contain the electrodes E1, E2, E7 and E8. The 12 independently addressable electrodes of Region 2 form a group of electrodes that may be repeated to cover the width of Region 2; however, the first group of electrodes at the left hand edge of Region 2 does not contain the electrodes E5, E6, E11 and E12. The 8 independently addressable electrodes of Sub-Region 1 form a group of electrodes. For ease of understanding, the electrodes SR1E1, SR1E2, SR1E7 and SR1E8 can be considered to be the 4 electrodes missing from the last group at the right hand edge of Region 1 but are addressed independently of the electrodes pertaining to Region 1. For ease of understanding, the electrodes SR1E5, SR1E6, SR1E11 and SR1E12 can be considered to be the 4 electrodes missing from the first group at the left hand edge of Region 2 but are addressed independently of the electrodes pertaining to Region 2. The boundary between Region 1 and Sub-Region 1 is shown with a solid line. The boundary between Region 2 and Sub-Region 1 is shown with a solid line. In other words, a first compensation region (also known as a sub-region) of the liquid crystal parallax barrier panel 200 having a plurality of electrodes for addressing the electro-optic material, the electrodes of the first compensation region extending along the first direction (y-direction) and being independently addressable of one another and of the first and second electrodes, the first compensation region being disposed between the first region and the second region.

The electrodes pertaining to Sub-Region 1 may be addressed in order to eliminate the specific line artefact shown in FIG. 19. In general, the electrodes pertaining to Sub-Region 1 may be addressed in order to reduce the visibility of (i.e. at least partially obscure) line artefact(s) that may occur between Region 1 and Region 2 when Region 1 has a first slit position number and Region 2 has second slit position number that is different from the first.

A third example of an autostereoscopic display device 1 with a rear barrier (see FIG. 2) is as follows: maximum viewing distance (Vd62)=900 mm, minimum viewing distance (Vd60)=580 mm, design viewing distance (Vd61)=740 mm, pixel pitch PP of image display panel 10 in x-direction=50.7 µm, width of image panel ADDW, ADDW2=5760*50.7 µm=292.032 mm, pixel aperture in the x-direction 21 µm (i.e. the pixel pitch PP comprises a transmissive aperture part and a non-transmissive part), barrier width BR=50.742 µm, slit width SL=50.742 µm, group pitch φ (parallax barrier pitch)=101.484 µm, 12 independently addressable electrodes per region and 8 independently addressable electrodes per sub-region. The distance between the image display panel LC layer 13 to multi-region liquid crystal parallax barrier panel 20, 200 LC layer 23 was 0.92 mm. Simulation results suggested that the third example of an autostereoscopic display device 1 required between 5 and 13 evenly spaced regions with a further optimised design requiring between 7 and 11 evenly spaced regions. The third example of an autostereoscopic display device 1 had pixels 5760 pixels in the x-direction and 1080 pixels in the y-direction. An autostereoscopic display device 1 according to the third example was fabricated with 9 regions (R1 to R9) and 8 sub-regions (SR1 to SR8). The total number of electrode portions in this third example is the same as the total number of electrode portions in first example. However, this third example has an additional 8 sub-regions (or 8 compensation regions) with 8 independently addressable electrodes in each sub-region. The 8 electrode portions for each of these 8 sub-regions are obtained from the electrode portions at the edge(s) of each region 1 to 9. Regions 1 and 9 of the third example have 4 fewer electrode portions than the corresponding regions 1 and 9 of the first example. Regions 2, 3, 4, 5, 6, 7 and 8 of this third example have 8 fewer electrode portions than the corresponding regions 2, 3, 4, 5, 6, 7 and 8 of the first example.

The width of region 1 (WR1) described in this third example is approximately the same width as the width of region 1 in the first example that has been previously described. More accurately the width of region 1 (WR1) described in this third example is slightly less than the width of region 1 (WR1) described in the first example. This slight reduction in width is attributed to the fact that 4 electrode portions at the right hand edge of region 1 in the first example are not in the region 1 of this third example. These four electrodes now belong to the left hand edge of sub-region 1 and are controlled independently of region 1 and region 2 in this third example.

The width of region 9 (WR9) described in this third example is approximately the same width as the width of region 9 in the first example that has been previously described. More accurately the width of region 9 (WR9) described in this third example is slightly less than the width of region 9 (WR9) described in the first example. This slight reduction in width is attributed to the fact that 4 electrode portions at the left hand edge of region 9 in the first example are not in the region 9 of this third example. These four electrode portions now belong to right hand edge of sub-region 8 and are controlled independently of region 8 and region 9 in this third example.

The width of region 2 (WR2) described in this third example is approximately the same width as the width of region 2 in the first example that has been previously described. More accurately the width of region 2 (WR2) described in this third example is slightly less than the width of region 2 (WR2) described in the first example. This slight reduction in width is attributed to the fact that 4 electrode portions at the left hand edge of region 2 in the first example are not in the region 2 of this third example and 4 electrode portions at the right hand edge of region 2 in the first example are not in the region 2 of this third example. The four electrode portions at the left hand edge of region 2 in the first example now belong to right hand edge of sub-region 1 and are controlled independently of region 1 and region 2. The four electrode portions at the right hand edge of region 2 in the first example now belong to left hand edge of sub-region 2 and are controlled independently of region 2 and region 3. The width of the regions 3, 4, 5, 6, 7 and 8 for this third example follow a similar argument as that discussed above for region 2.

In this third example, the pixels in the x-direction had the same colour in order to avoid colour artefact problems. The pixels in the y-direction had a cyclic arrangement of red, green, blue; the three colours comprising a white pixel. The pixel pitch in the x-direction was 50.7 µm wide. Each colour pixel in the y-direction was 33.8 µm long. A white pixel of the image display panel 10 therefore measured 50.7 µm in the x-direction (second direction) and 101.4 µm in the y-direction (first direction). The use of 9 regions with 12 independently addressable electrodes per region and 8 sub-regions with 8 independently addressable electrodes per sub-region for this third example was found to be a good design trade-off enabling relatively low complexity for the electrode layout and viewing of high quality 3D images for an appropriately large range of head positions.

A fourth example of an autostereoscopic display device 1 with a rear barrier (see FIG. 2) is as follows: maximum viewing distance (Vd62)=900 mm, minimum viewing distance (Vd60)=580 mm, design viewing distance (Vd61)=740 mm, pixel pitch PP of image display panel 10 in x-direction=93.75 µm, width of image panel ADDW, ADDW2=2560*93.75 µm=240 mm, pixel aperture in the x-direction 52.75 µm (i.e. the pixel pitch PP comprises a transmissive aperture part and a non-transmissive part), barrier width BR=93.891 µm, slit width SL=93.891 µm and group pitch φ (parallax barrier pitch)=187.782 µm. The distance between the image display panel LC layer 13 to multi-region liquid crystal parallax barrier panel 20, 200 LC layer 23 was 1.7 mm. Simulation results suggested that the fourth example of an autostereoscopic display device 1 required between 5 and 11 evenly spaced regions with a further optimised design requiring between 7 and 9 evenly spaced regions. The fourth example of an autostereoscopic display device 1 had pixels 2560 pixels in the x-direction and 542 pixels in the y-direction. An autostereoscopic display device 1 according to the fourth example was fabricated with 9 regions (R1 to R9) and 8 sub-regions (SR1 to SR8). The total number of electrode portions in this fourth example is the same as the total number of electrode portions in second example. However, this fourth example has an additional 8 sub-regions with 8 independently addressable electrodes in each sub-region. The 8 electrode portions for each of these 8 sub-regions are obtained from the electrode portions at the edge(s) of each region 1 to 9. Regions 1 and 9 of the fourth example have 4 fewer electrode portions than the corresponding regions 1 and 9 of the second example. Regions 2, 3, 4, 5, 6, 7 and 8 of this fourth example have 8 fewer electrode portions than the corresponding regions 2, 3, 4, 5, 6, 7 and 8 of the second example.

The width of region 1 (WR1) described in this fourth example is approximately the same width as the width of region 1 in the second example that has been previously described. More accurately the width of region 1 (WR1) described in this fourth example is slightly less than the width of region 1 (WR1) described in the second example. This slight reduction in width is attributed to the fact that 4 electrode portions at the right hand edge of region 1 in the second example are not in the region 1 of this fourth example. These four electrodes now belong to the left hand edge of sub-region 1 and are controlled independently of region 1 and region 2 in this fourth example.

The width of region 9 (WR9) described in this fourth example is approximately the same width as the width of region 9 in the second example that has been previously described. More accurately the width of region 9 (WR9) described in this fourth example is slightly less than the width of region 9 (WR9) described in the second example. This slight reduction in width is attributed to the fact that 4 electrode portions at the left hand edge of region 9 in the second example are not in the region 9 of this fourth example. These four electrode portions now belong to right hand edge of sub-region 8 and are controlled independently of region 8 and region 9 in this fourth example.

The width of region 2 (WR2) described in this fourth example is approximately the same width as the width of region 2 in the second example that has been previously described. More accurately the width of region 2 (WR2) described in this fourth example is slightly less than the width of region 2 (WR2) described in the second example. This slight reduction in width is attributed to the fact that 4 electrode portions at the left hand edge of region 2 in the second example are not in the region 2 of this fourth example and 4 electrode portions at the right hand edge of region 2 in the second example are not in the region 2 of this fourth example. The four electrode portions at the left hand edge of region 2 in the second example now belong to right hand edge of sub-region 1 and are controlled independently of region 1 and region 2. The four electrode portions at the right hand edge of region 2 in the second example now belong to left hand edge of sub-region 2 and are controlled independently of region 2 and region 3. The width of the regions 3, 4, 5, 6, 7 and 8 for this fourth example follow a similar argument as that discussed above for region 2.

In this fourth example, the pixels in the x-direction had the same colour in order to avoid colour artefact problems. The pixels in the y-direction had a cyclic arrangement of red, green, blue; the three colours comprising a white pixel. The pixel pitch in the x-direction was 93.75 µm wide. Each colour pixel in the y-direction was 62.5 µm long. A white pixel of the image display panel 10 therefore measured 93.75 µm in the x-direction (second direction) and 187.5 µm in the y-direction (first direction). The use of 9 regions with 12 independently addressable electrodes per region and 8 sub-regions with 8 independently addressable electrodes per sub-region for this fourth example was found to be a good design trade-off enabling relatively low complexity for the electrode layout and viewing of high quality 3D images for an appropriately large range of head positions.

With reference to FIG. 8, FIG. 12 and FIG. 22, regardless of which region a specific electrode belongs to, the same cyclic arrangement of electrodes E1, E2, E3, E4, E5 and E6 pertaining to the second substrate 22 is preserved across the display width (ADDW, ADDW2). For example, electrode E2 is always adjacent to electrodes E3 and E1. Electrodes E2 and E3 may be in the same region, for example Region R1. Electrodes E2 and E3 may be in different regions, for example electrode E2 may be in Sub-Region 1 and electrode E3 may be in Region 1. With reference to FIG. 8, FIG. 12 and FIG. 22, electrode E1 is always adjacent to electrodes E6 and E2 owing to the cyclic arrangement of electrodes.

With reference to FIG. 8, FIG. 12 and FIG. 22, regardless of which region a specific electrode belongs to, the same cyclic arrangement of electrodes E7, E8, E9, E10, E11 and E12 pertaining to the first substrate 21 is preserved across the display width (ADDW, ADDW2). For example, electrode E8 is always adjacent to electrodes E7 and E9. Electrodes E7 and E9 may be in the same region, for example Region R1. Electrodes E7 and E9 may be in different regions, for example electrode E7 may be in Sub-Region 1 and electrode E9 may be in Region 1. With reference to FIG. 8, FIG. 12 and FIG. 22, electrode E7 is always adjacent to electrodes E8 and E12 owing to the cyclic arrangement of electrodes.

Figure 23:
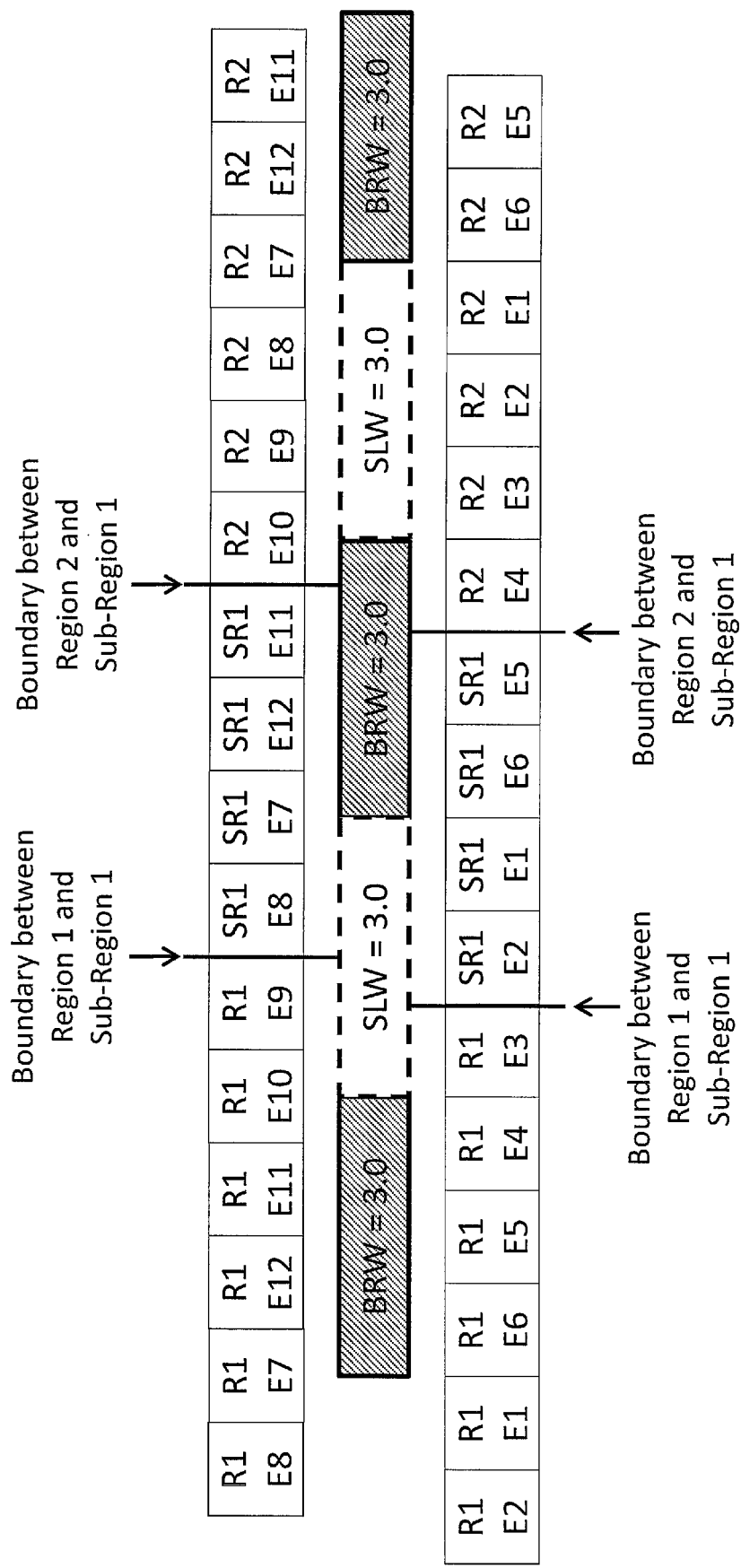
FIG. 23: Slit positions in a first region and in a sub-region and in a second region

With reference to FIG. 23, the specific situation is considered when Region 1 has slit position 4 and Region 2 has slit position 4. The group of electrodes (R1E1 to R1E12) pertaining to Region 1 may repeat many times in a cyclic arrangement across the width of Region 1. The group of electrodes (R2E1 to R2E12) pertaining to Region 2 may repeat many times in a cyclic arrangement across the width of Region 2. The group of electrodes pertaining to Sub-Region 1 (SR1E1, SR1E2, SR1E7, SR1E8, SR1E5, SR1E6, SR1E11 and SR1E12) are also shown. The group of electrodes at the right hand edge of Region 1 do not contain electrodes E1, E2, E7 and E8—these electrodes are now contained in Sub-Region 1. The group of electrodes at the left hand edge of Region 2 do not contain electrodes E5, E6, E11 and E12—these electrodes are now contained in Sub-Region 1. For diagrammatic clarity, only electrodes in proximity of Sub-Region 1 are shown in FIG. 23. The boundary between Region 1 and Sub-Region 1 is shown with a solid line. The boundary between Region 2 and Sub-Region 1 is shown with a solid line. With reference to FIG. 9, electrodes E6, E5 and E4 are turned on to enable a barrier in Region 1 (slit position 4). With reference to FIG. 9, electrodes E6, E5 and E4 are turned on to enable a barrier in Region 2 (slit position 4). Electrodes E5 and E6 are turned on to enable a barrier in Sub-Region 1. With reference to FIG. 23, a continuous barrier exists that is partially in Sub-Region 1 and partially in Region 2. If the width of each electrode is considered to be 1.0 units wide (electrode gaps have been ignored for diagrammatic clarity) then the barrier widths in Region 1 are 3.0 units wide (BRW=3.0) and the barrier widths in Region 2 are 3.0 units wide (BRW=3.0) and the barrier width that is partially in Sub-Region 1 and partially in Region 2 is 3.0 units wide (BRW=3.0). The slits in Region 1 are 3.0 units wide (SLW=3.0) and the slits in Region 2 are 3.0 units wide (SLW=3.0) and the slit that is partially in Sub-Region 1 and partially in Region 1 is 3.0 units wide (SLW=3.0).

With reference to FIG. 24, the general situation is considered when Region 1 has slit position i and Region 2 has slit position i where i is an integer between 1 and 12 inclusive. With reference to FIG. 24, the electrode states of Sub-Region 1 are shown for all cases when Region 1 has slit position i and Region 2 has slit position i, where i is an integer from 1 to 12 inclusive. An electrode state represented by a "1" indicates that the electrode is turned on to create a barrier (BR). An electrode state represented by a "0" indicates the electrode is turned off to create a slit (SL).

Figure 25:
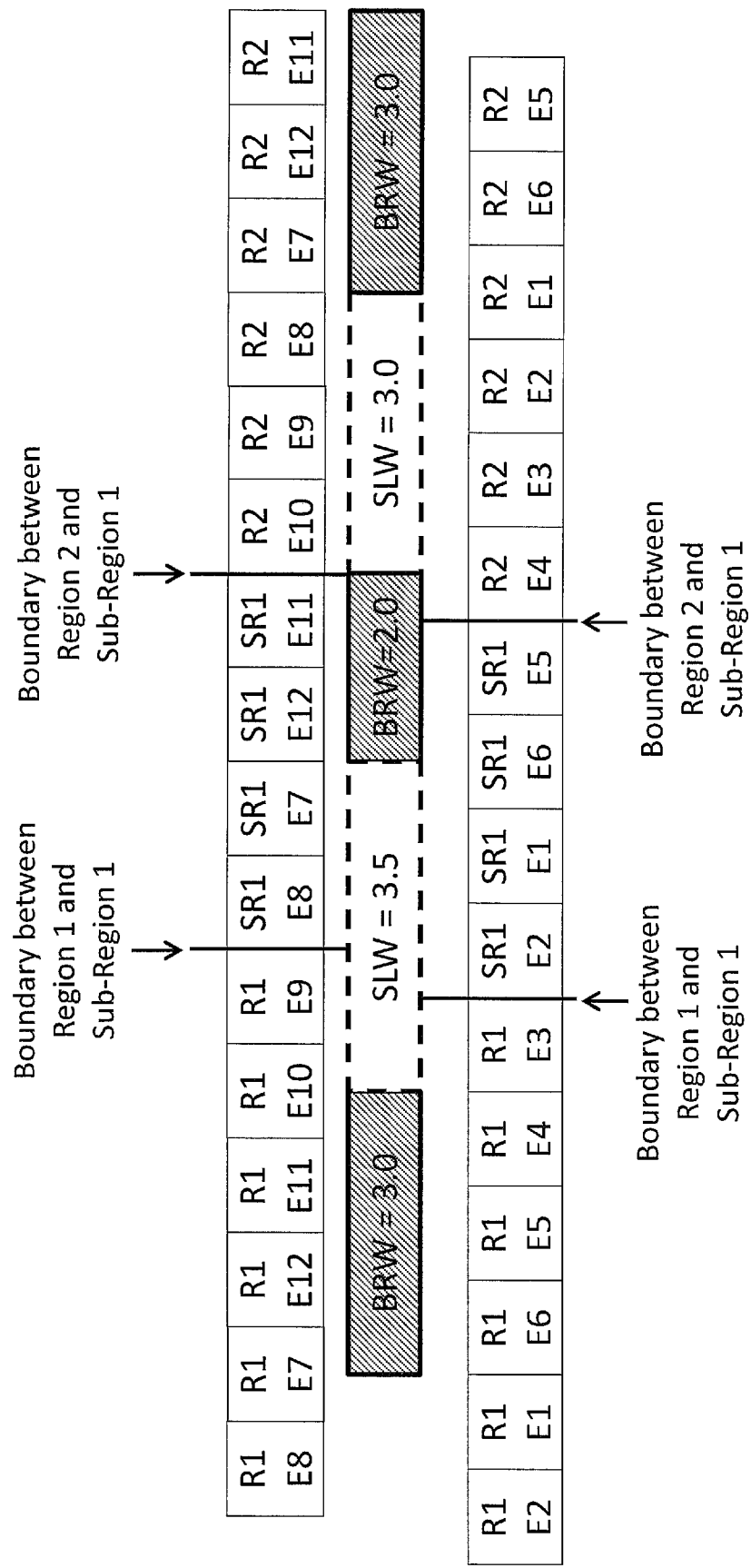
FIG. 25: Slit positions in a first region and in a sub-region and in a second region

With reference to FIG. 25, the specific situation is considered when Region 1 has slit position 4 and Region 2 has slit position 5. FIG. 25 is similar to FIG. 23 but the slit position of Region 2 is different. With reference to FIG. 9, electrodes E7, E12 and E11 are turned on to enable a barrier in Region 2 (slit position 5). Electrodes E12 and E11 are turned on to enable a barrier in Sub-Region 1 (i.e. SR1E12 and SR1E11 are turned on). If the width of each electrode is considered to be 1.0 units wide (electrode gaps have been ignored for diagrammatic clarity) then the barrier widths in Region 1 are 3.0 units wide (BRW=3.0) and the barrier widths in Region 2 are 3.0 units wide (BRW=3.0) and a barrier width in Sub-Region 1 is 2.0 units wide (BRW=2.0). The slits in Region 1 are 3.0 units wide (SLW=3.0) and the slits in Region 2 are 3.0 units wide (SLW=3.0) and the slit partially in Sub-Region 1 is 3.5 units wide (SLW=3.5). The sum of the barrier width (BRW) that is in Sub-Region 1 and the slit width (SLW) that is partially in Sub-Region 1 is 5.5 units (i.e. 2.0+3.5). The sum of a barrier width and a slit width that are both completely in Region 1 is 6.0 units (3.0+3.0). The sum of a barrier width and a slit width that are both completely in Region 2 is 6.0 units (3.0+3.0). FIG. 25 indicates that when Region 1 has slit position i and Region 2 has slit position i+1, then the slits in Region 2 must move towards the slits in Region 1 by an amount equal to 0.5 units. In general, a first method to move the slits in Region 2 closer to the slits in Region 1 is to have a barrier and slit combination comprised of a slit width of 3.5 units adjacent to a barrier width of 2.0 units at some position between Region 1 and Region 2. This slit and barrier combination is at least partially within Sub-Region 1. The barrier part of this slit and barrier combination may be within, or partially within, or in proximity to Sub-Region 1. The slit part of this slit and barrier combination may be within, or partially within, or in proximity to Sub-Region 1.

FIG. 25 is an example of a "bright line" because a slit width of 3.5 units and a barrier width of 2.0 units are positioned between Region 1 and Region 2 in order to move the slits in Region 2 closer to the slits in Region 1. In other words, it is a "bright line" because the slit (SLW=3.5 units) is larger than the barrier (BRW=2.0 units).

With reference to FIG. 26, the general situation is considered when Region 1 has slit position i and Region 2 has slit position i+1 where i is an integer between 1 and 12 inclusive in a cyclic arrangement (i.e. if i=12, then i+1=1). With reference to FIG. 26, the electrode states of Sub-Region 1 are shown for all cases to enable a "bright line" (i.e. a slit width of 3.5 units is adjacent to a barrier width of 2.0 units and this barrier and slit combination are positioned between Region 1 and Region 2). An electrode state represented by a "1" indicates that the electrode is turned on to create a barrier (BR). An electrode state represented by a "0" indicates the electrode is turned off to create a slit (SL). When Region 1 has slit position 12, 5, 6 or 7, then there are two possible electrode states that may be used. The quantity "Bright line entry" is a number for reference purposes.

Figure 27:
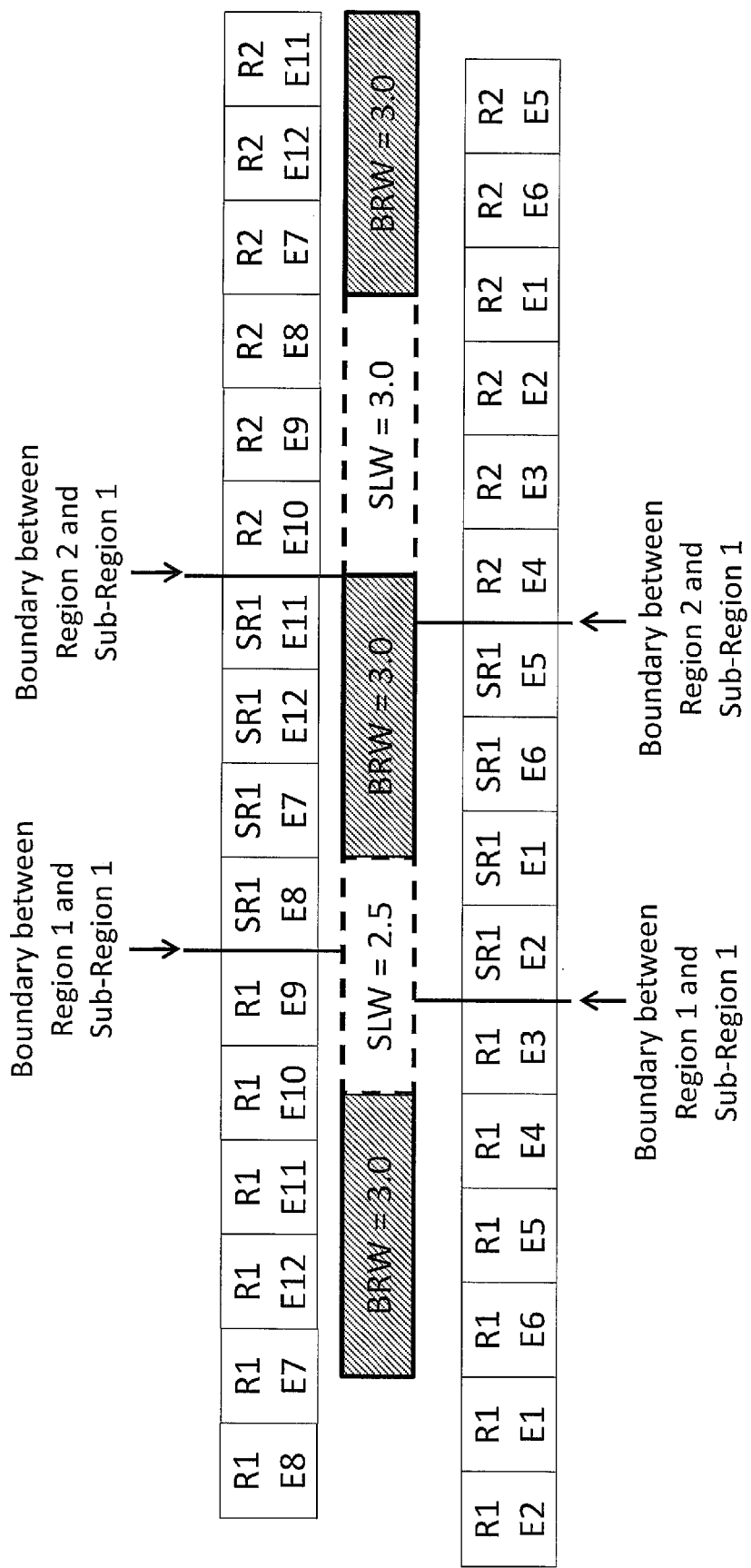
FIG. 27: Slit positions in a first region and in a sub-region and in a second region

With reference to FIG. 27, the specific situation is considered when Region 1 has slit position 4 and Region 2 has slit position 5. FIG. 27 is similar to FIG. 25 but the electrode E7 is also turned on in Sub-Region 1 (i.e. SR1E7 is turned on). If the width of each electrode is considered to be 1.0 unit wide (electrode gaps have been ignored for diagrammatic clarity) then the barrier widths in Region 1 are 3.0 units wide (BRW=3.0) and the barrier widths in Region 2 are 3.0 units wide (BRW=3.0) and the barrier width in Sub-Region 1 is 3.0 units wide (BRW=3.0). The slits in Region 1 are 3.0 units wide (SLW=3.0) and the slits in Region 2 are 3.0 units wide (SLW=3.0) and the slit partially in Sub-Region 1 is 2.5 units wide (SLW=2.5). The sum of the barrier width (BRW) and the slit width (SLW) that is partially in Sub-Region 1 is 5.5 units (3.5+2.0). The sum of a barrier width and the slit width that are both completely in Region 1 is 6.0 units (3.0+3.0). The sum of a barrier width and a slit width that are both completely in Region 2 is 6.0 units (3.0+3.0). FIG. 27 shows when Region 1 has slit position i and Region 2 has slit position i+1, then the slits in Region 2 must move towards the slits in Region 1 by an amount equal to 0.5 units. In general, a second method to move the slits in Region 2 closer to the slits in Region 1 is to have a slit width of 2.5 units and a barrier width of 3.0 units at some position between Region 1 and Region 2. This slit and barrier combination is at least partially within Sub-Region 1. The barrier part of this slit and barrier combination may be within, or partially within, or in proximity to Sub-Region 1. The slit part of this slit and barrier combination may be within, or partially within, or in proximity to Sub-Region 1.

FIG. 27 is an example of a "dark line" because a slit width of 2.5 units and a barrier width of 3.0 units are positioned between Region 1 and Region 2 in order to move the slits in Region 2 closer to the slits in Region 1. In other words, it is a "dark line" because the slit (SLW=2.5 units) is smaller than the barrier (BRW=3.0 units).

With reference to FIG. 28, the general situation is considered when Region 1 has slit position i and Region 2 has slit position i+1 where n is an integer between 1 and 12 inclusive in a cyclic arrangement (i.e. if i=12, then i+1=1). With reference to FIG. 28, the electrode states of Sub-Region 1 are shown for all cases to enable a "dark line" (i.e. a slit width of 2.5 units is adjacent to a barrier width of 3.0 units and this barrier and slit combination are positioned between Region 1 and Region 2). An electrode state represented by a "1" indicates that the electrode is turned on to create a barrier (BR). An electrode state represented by a "0" indicates that the electrode is turned off to create a slit (SL). When Region 1 has slit position 5, 6 or 7, then there are two possible electrode states that may be used. The quantity "Dark line entry" is a number for reference purposes.

Figure 29:
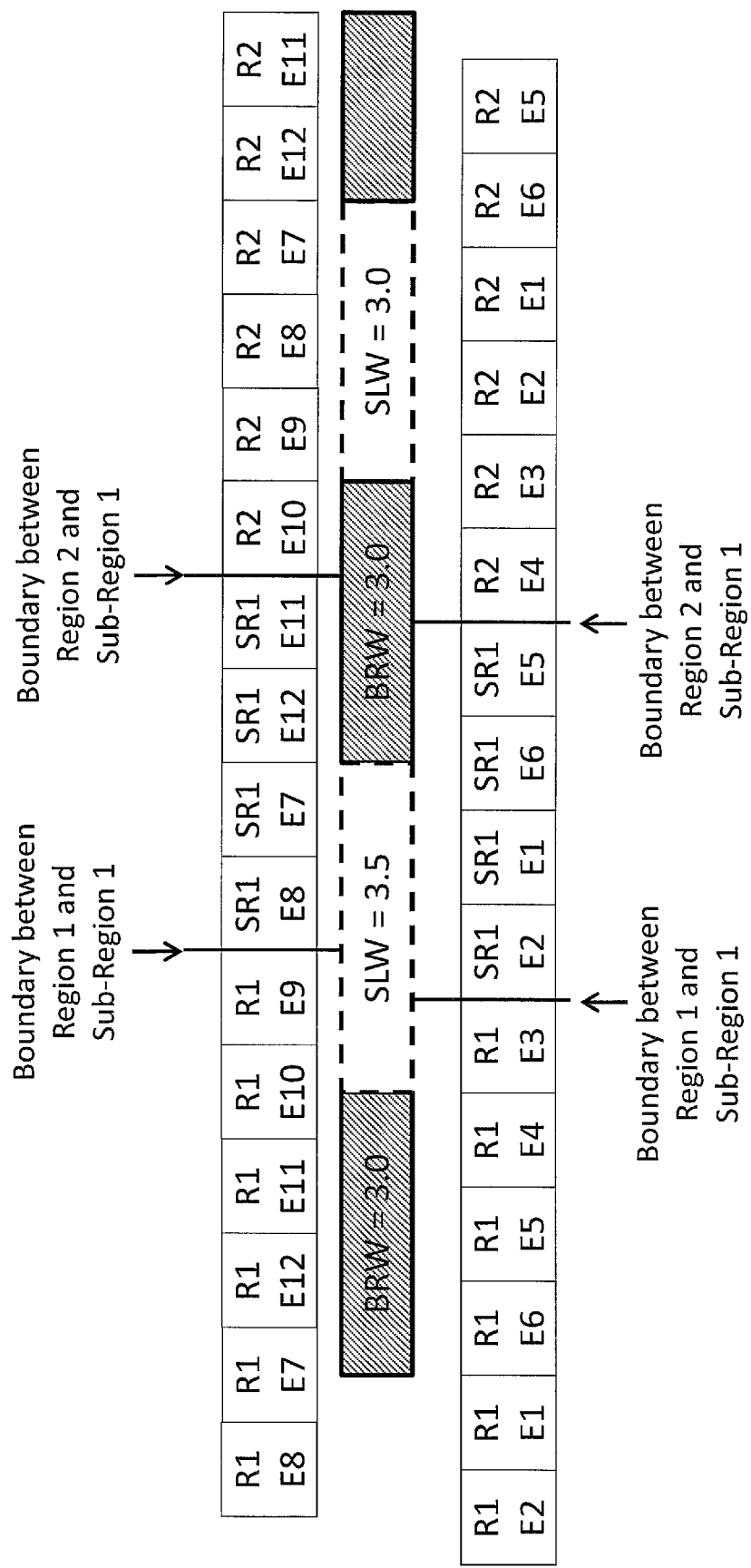
FIG. 29: Slit positions in a first region and in a sub-region and in a second region

With reference to FIG. 29, the specific situation is considered when Region 1 has slit position 4 and Region 2 has slit position 3. FIG. 29 is the same as FIG. 23 expect that the slit position of Region 2 is different. With reference to FIG. 9, electrodes E10, E12 and E11 are turned on to enable a barrier in Region 2 (slit position 3). Electrodes E12 and E11 are turned on to enable a barrier in Sub-Region 1. If the width of each electrode is considered to be 1.0 units wide (electrode gaps have been ignored for diagrammatic clarity) then the barrier widths in Region 1 are 3.0 units wide (BRW=3.0) and the barrier widths in Region 2 are 3.0 units wide (BRW=3.0) and the barrier width partially in Sub-Region 1 is 3.0 units wide (BRW=3.0). The slits in Region 1 are 3.0 units wide (SLW=3.0) and the slits in Region 2 are 3.0 units wide (SLW=3.0) and the slit partially in Sub-Region 1 is 3.5 units wide (SLW=3.5). The sum of the barrier width (BRW) and the slit width (SLW) that are both partially in Sub-Region 1 is 6.5 units (3.0+3.5). The sum of a barrier width and a slit width that are both completely in Region 1 is 6.0 units (3.0+3.0). The sum of a barrier width and a slit width that are both completely in Region 2 is 6.0 units (3.0+3.0). FIG. 29 indicates that when Region 1 has slit position i and Region 2 has slit position i−1, then the slits in Region 2 must move away from the slits in Region 1 by an amount equal to 0.5 units. In general, a first method to move the slits in Region 2 away from to the slits in Region 1 is to have a slit width of 3.5 units adjacent to a barrier width of 3.0 units at some position between Region 1 and Region 2. This slit and barrier combination is at least partially within Sub-Region 1. The barrier part of this slit and barrier combination may be within, or partially within, or in proximity to Sub-Region 1. The slit part of this slit and barrier combination may be within, or partially within, or in proximity to Sub-Region 1.

FIG. 29 is an example of a "bright line" because a slit width of 3.5 units and a barrier width of 3.0 units are positioned between Region 1 and Region 2 in order to move the slits in Region 2 further from the slits in Region 1. In other words, it is a "bright line" because the slit is larger than the barrier.

With reference to FIG. 30, the general situation is considered when Region 1 has slit position i and Region 2 has slit position i−1 where i is an integer between 1 and 12 inclusive in a cyclic arrangement (i.e. if i=1, then i−1=12). With reference to FIG. 30, the electrode states of Sub-Region 1 are shown for all cases to enable a "bright line" (i.e. a slit width of 3.5 units is adjacent to a barrier width of 3.0 units and this barrier and slit are positioned between Region 1 and Region 2). An electrode state represented by a "1" indicates that the electrode is turned on to create a barrier (BR). An electrode state represented by a "0" indicates the electrode is turned off to create a slit (SL). When Region 1 has slit position 7, then there are two possible electrode states that may be used. The quantity "Bright line entry" is a number for reference purposes.

Figure 31:
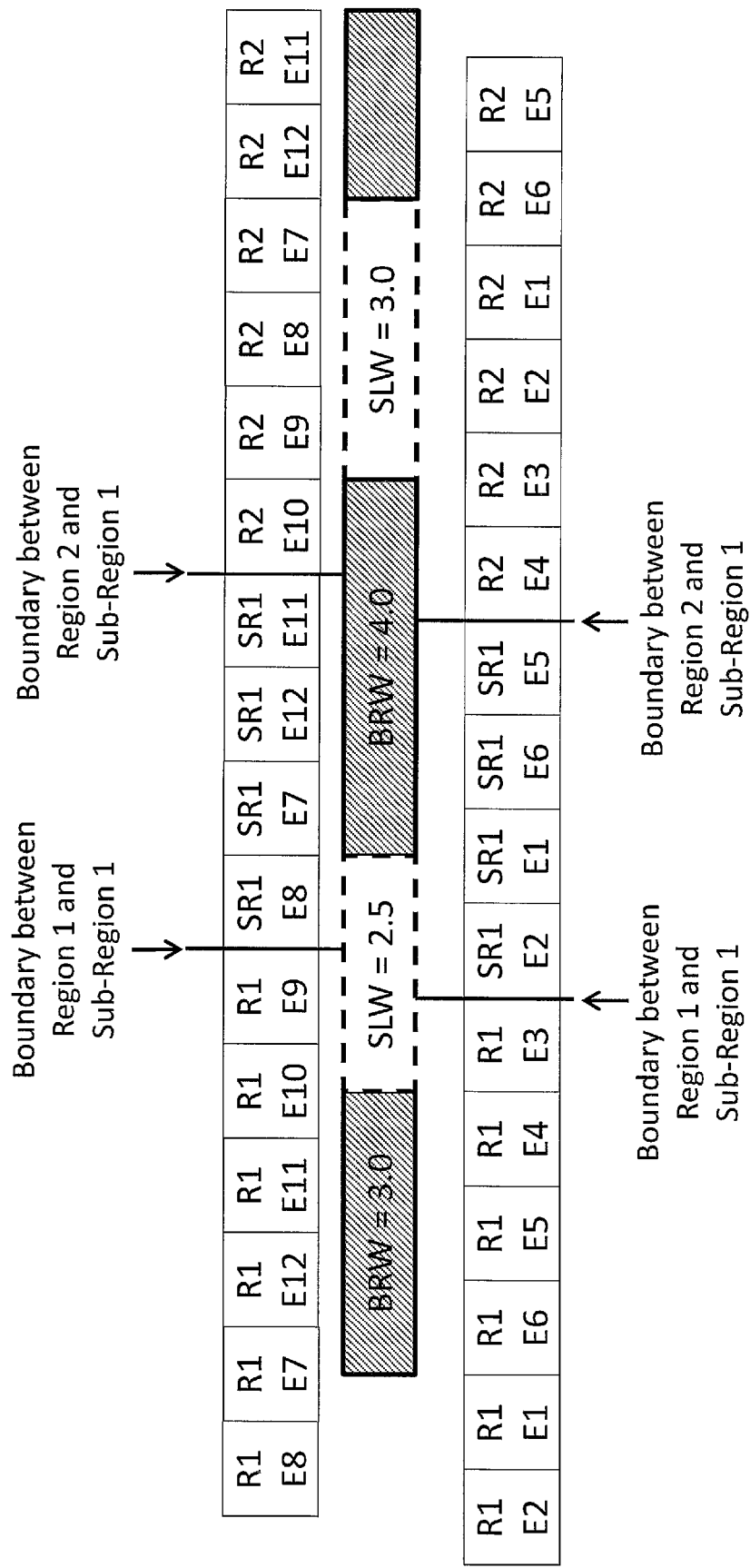
FIG. 31: Slit positions in a first region and in a sub-region and in a second region

With reference to FIG. 31, the specific situation is considered when Region 1 has slit position 4 and Region 2 has slit position 3. FIG. 31 is similar to FIG. 23 but the slit position of Region 2 is different. With reference to FIG. 9, electrodes E10, E12 and E11 are turned on to enable a barrier in Region 2 (slit position 3). Electrodes E12, E11 and E7 are turned on to enable a barrier in Sub-Region 1. If the width of each electrode is considered to be 1.0 units wide (electrode gaps have been ignored for diagrammatic clarity) then the barrier widths in Region 1 are 3.0 units wide (BRW=3.0) and the barrier widths in Region 2 are 3.0 units wide (BRW=3.0) and the barrier width partially in Sub-Region 1 is 4.0 units wide (BRW=4.0). The slits in Region 1 are 3.0 units wide (SLW=3.0) and the slits in Region 2 are 3.0 units wide (SLW=3.0) and the slit partially in Sub-Region 1 is 2.5 units wide (SLW=2.5). The sum of the barrier width (BRW) and the slit width (SLW) that are both partially in Sub-Region 1 is 6.5 units (4.0+2.5). The sum of a barrier width and a slit width that are both completely in Region 1 is 6.0 units (3.0+3.0). The sum of a barrier width and a slit width that are both completely in Region 2 is 6.0 units (3.0+3.0). FIG. 31 indicates that when Region 1 has slit position i and Region 2 has slit position i−1, then the slits in Region 2 must move away from the slits in Region 1 by an amount equal to 0.5 units. In general, a second method to move the slits in Region 2 away from to the slits in Region 1 is to have a slit width of 2.5 units adjacent to a barrier width of 4.0 units at some position between Region 1 and Region 2 and in proximity to Sub-Region 1. FIG. 31 is an example of a "dark line" because a slit width of 2.5 units and a barrier width of 4.0 units are positioned between Region 1 and Region 2. This slit and barrier combination is at least partially within Sub-Region 1. The barrier part of this slit and barrier combination may be within, or partially within, or in proximity to Sub-Region 1. The slit part of this slit and barrier combination may be within, or partially within, or in proximity to Sub-Region 1.

FIG. 31 is an example of a "dark line" because a slit width of 2.5 units and a barrier width of 4.0 units are positioned between Region 1 and Region 2 in order to move the slits in Region 2 further from the slits in Region 1. In other words, it is a "dark line" because the slit is smaller than the barrier.

With reference to FIG. 32, the general situation is considered when Region 1 has slit position i and Region 2 has slit position i−1 where i is an integer between 1 and 12 inclusive in a cyclic arrangement (i.e. if i=1, then i−1=12). With reference to FIG. 32, the electrode states of Sub-Region 1 are shown for all cases to enable a "dark line" (i.e. a slit width of 2.5 units is adjacent to a barrier width of 4.0 units and this barrier and slit are positioned between Region 1 and Region 2). An electrode state represented by a "1" indicates that the electrode is turned on to create a barrier (BR). An electrode state represented by a "0" indicates the electrode is turned off to create a slit (SL). When Region 1 has slit position 1, 2 7 or 12 then there are two possible electrode states that may be used. The quantity "Dark line entry" is a number for reference purposes.

Figure 33:
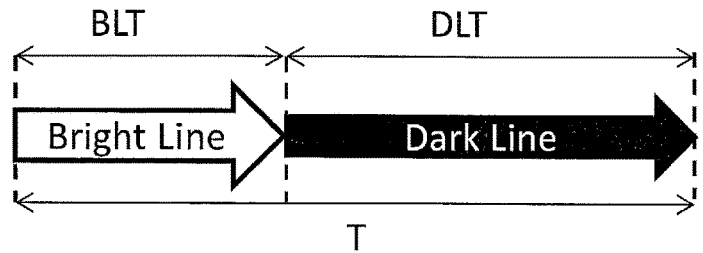
FIG. 33: Timing diagram

FIG. 25 and FIG. 26 illustrate a first method for addressing electrodes in Sub-Region 1 when the slit position in Region 1 is i and the slit position in Region 2 is i+1, where i is an integer between 1 and 12 in cyclic arrangement. This first method has been called "bright line". The use of the first method may yield a visible line artefact between Region 1 and Region 2. The use of the first method may yield a visible bright line artefact between Region 1 and Region 2. FIG. 27 and FIG. 28 illustrate a second method for addressing electrodes in Sub-Region 1 when the slit position in Region 1 is i and the slit position in Region 2 is i+1, where n is an integer between 1 and 12 in cyclic arrangement. This second method has been called "dark line". The use of the second method may yield a visible line artefact between Region 1 and Region 2. The use of the second method may yield a visible dark line artefact between Region 1 and Region 2. A third method for addressing electrodes in Sub-Region 1 when the slit position in Region 1 is i and the slit position in Region 2 is i+1, where i is an integer between 1 and 12 in cyclic arrangement is shown in FIG. 33. The third method is a time multiplexed method that uses both the first method (bright line) and the second method (dark line). The third method involves the use of bright line electrode addressing in Sub-Region 1 for a first time period (BLT) and dark line electrode addressing in Sub-Region 1 for a second time period (DLT). The proportion of the time period BLT to DLT is chosen to minimise, or eliminate, visible line artefacts that occur between Region 1 and Region 2 when the slit position in Region 1 is i and the slit position in Region 2 is i+1, where i is an integer between 1 and 12 in cyclic arrangement.

FIG. 26 illustrates that Bright Line entry 1 (Region 1 has slit position 12 and Region 2 has slit position 1), may be time multiplexed (according to FIG. 33) with the Dark Line entry 1 FIG. 28. Dark Line entry 1 of FIG. 28 may be time multiplexed (according to FIG. 33) with Bright Line entry 1 or Bright Line entry 2. Each Bright Line entry in FIG. 26 (Bright Line entries 1 to 16) has at least 1 corresponding Dark Line entry (Dark Line entries 1 to 15) in FIG. 28 for use in a time multiplexing method (according to FIG. 33) to minimise, or eliminate, line artefacts. Each Dark Line entry in FIG. 28 (Dark Line entries 1 to 15) has at least 1 corresponding Bright Line entry (Bright Line entries 1 to 16) in FIG. 26 for use in a time multiplexing method (according to FIG. 33) to minimise, or eliminate, line artefacts.

FIG. 29 and FIG. 30 illustrate a first method for addressing electrodes in Sub-Region 1 when the slit position in Region 1 is i and the slit position in Region 2 is i−1, where i is an integer between 1 and 12 in cyclic arrangement. This first method has been called "bright line". The use of the first method may yield a visible line artefact between Region 1 and Region 2. The use of the first method may yield a visible bright line artefact between Region 1 and Region 2. FIG. 31 and FIG. 32 illustrate a second method for addressing electrodes in Sub-Region 1 when the slit position in Region 1 is i and the slit position in Region 2 is i−1, where i is an integer between 1 and 12 in cyclic arrangement. This second method has been called "dark line". The use of the second method may yield a visible line artefact between Region 1 and Region 2. The use of the second method may yield a visible dark line artefact between Region 1 and Region 2. A third method for addressing electrodes in Sub-Region 1 when the slit position in Region 1 is i and the slit position in Region 2 is i−1, where i is an integer between 1 and 12 in cyclic arrangement is shown in FIG. 33. The third method is a time multiplexed method that uses both the first method (bright line) and the second method (dark line). The third method involves the use of bright line electrode addressing in Sub-Region 1 for a first time period (BLT) and dark line electrode addressing in Sub-Region 1 for a second time period (DLT). The proportion of the time period BLT and DLT is chosen to minimise, or eliminate, visible line artefacts that occur between Region 1 and Region 2 when the slit position in Region 1 is i and the slit position in Region 2 is i−1, where i is an integer between 1 and 12 in cyclic arrangement.

FIG. 30 illustrates that Bright Line entry 17 (Region 1 has slit position 1 and Region 2 has slit position 12), may be time multiplexed (according to FIG. 33) with the Dark Line entry 16 in FIG. 32 or Dark Line entry 17 in FIG. 32. Dark Line entry 18 of FIG. 32 may be time multiplexed (according to FIG. 33) with Bright Line entry 18. Each Bright Line entry in FIG. 30 (Bright Line entries 17 to 29) has at least 1 corresponding Dark Line entry (Dark Line entries 16 to 31) in FIG. 32 for use in a time multiplexing method (according to FIG. 33) to minimise, or eliminate, line artefacts. Each Dark Line entry in FIG. 32 (Dark Line entries 16 to 31) has at least 1 corresponding Bright Line entry (Bright Line entries 17 to 29) in FIG. 30 for use in a time multiplexing method (according to FIG. 33) to minimise, or eliminate, line artefacts.

With reference to FIG. 33, the period T is the sum of the Bright Line period (BLT) and Dark Line period (DLT). The period T may be chosen to minimise, or eliminate, line artefacts. If the period T is too large (T>100 ms), then the viewer may observe a flashing line artefact as in Sub-Region 1. A period in the range 0.1 ms to 50 ms was found suitable for obscuring line artefacts. A period in the range 1 ms to 10 ms was found suitable for obscuring line artefacts. The optimum ratio of Bright Line period (BLT) to Dark Line period (DLT) may be a function of viewing distance and/or may be a function of the voltage(s) applied to the electrodes of Sub-Region 1.

In general, the use of bright line electrode addressing in Sub-Region 1 for a first time period (BLT) and dark line electrode addressing in Sub-Region 1 for a second time period (DLT) may be used to reduce the visibility of a line artefact to a greater extent than if a bight line only (i.e. DLT=0 ms) electrode addressing was used in Sub-Region 1. In general, the use of bright line electrode addressing in Sub-Region 1 for a first time period (BLT) and dark line electrode addressing in Sub-Region 1 for a second time period (DLT) may be used to reduce the visibility of a line artefact to a greater extent than if a dark line only (i.e. BLT=0 ms) electrode addressing was used in Sub-Region 1. In other words, bright line electrode addressing in Sub-Region 1 for a first time period (BLT) and dark line electrode addressing in Sub-Region 1 for a second time period (DLT) may be used to at least partially obscure any line artefact(s) that may be visible between region 1 and region 2 if either a dark line only (BLT=0 ms) or bright line only (DLT=0 ms) electrode addressing is used in Sub-Region 1.

A first advantage of the electrode arrangement shown in FIG. 22 is that the use of a Sub-Region can avoid visible lines artefacts such as those illustrated in FIG. 19. A second advantage of the electrode arrangement shown in FIG. 22 is that the use of a Sub-Region in conjunction with a time multiplexing method (as shown in FIG. 33) can avoid visible lines artefacts such as those illustrated FIG. 17 and FIG. 18.

Figure 34:
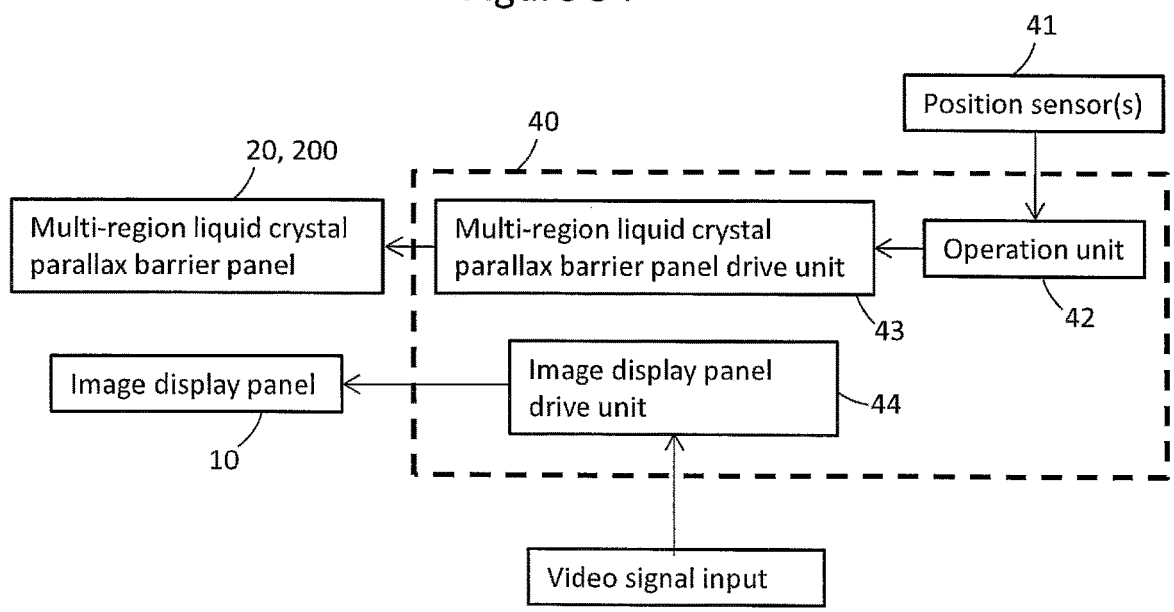
FIG. 34: Block diagram showing a functional configuration of an autostereoscopic display device
Figure 35:
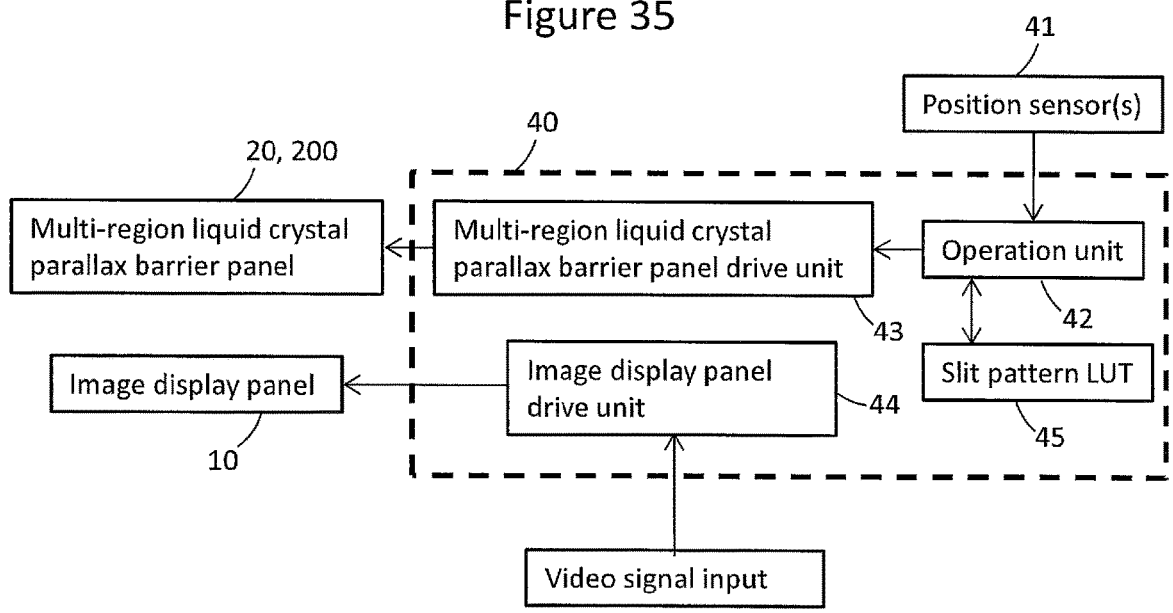
FIG. 35: Block diagram showing a functional configuration of an autostereoscopic display device
Figure 36:
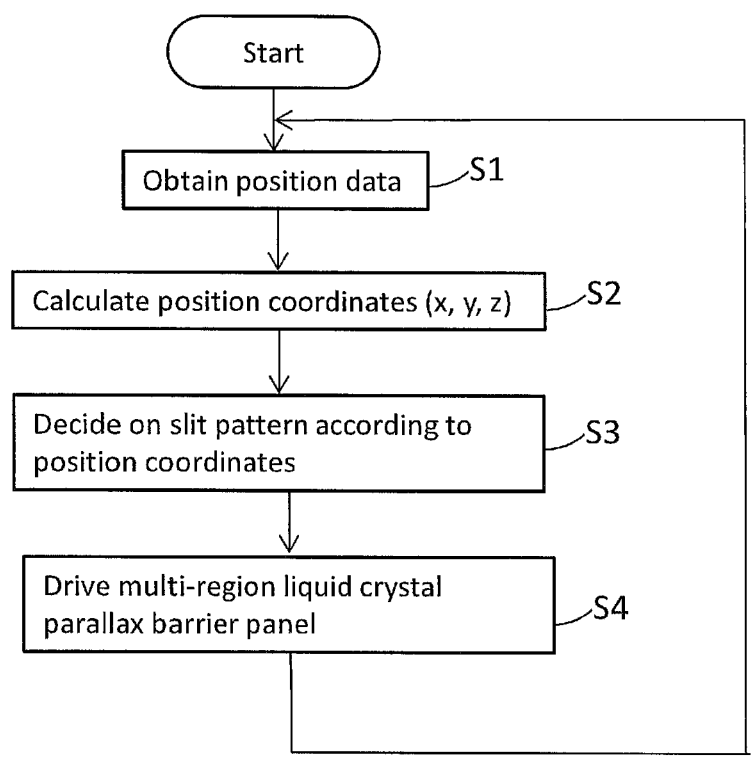
FIG. 36: Flowchart of a process performed by the autostereoscopic display device

FIG. 34 and FIG. 35 are block diagrams showing a functional configuration of an autostereoscopic display device 1. FIG. 36 is a flowchart of a process performed by the autostereoscopic display device 1. The autostereoscopic display device 1 further includes a control circuit 40 and a position sensor(s) 41. Control circuit 40 includes an operation unit 42 and a multi-region liquid crystal parallax barrier panel drive unit 43 and an image display panel driver 44. FIG. 35 further includes a slit pattern look-up table (LUT) 45. A slit pattern look-up table may store the slit patterns for all head positions in the 3D viewing zone 70. A slit pattern look-up table may store, for each parallax barrier slit position number, the electrode states for each independently addressable electrode of the multi-region liquid crystal parallax barrier panel 20, 200 required to obtain that parallax barrier slit position number in each region. Image display panel drive unit 44 drives the image display panel 10 based on input video signals and displays an image on the image display panel 10. Position sensor(s) 41 obtains the positional information of the observer 90 (step S1). Position sensor(s) 41 is, for example, a camera and/or an infrared sensor.

Alternatively, position sensor(s) 41 are, for example, a pair of cameras and/or a pair of infrared sensors. The advantage of using a pair of cameras and/or a pair of infrared sensors separated in the lateral direction (x direction) is that the disparity between the information provided by a pair of sensors enables both lateral (x) and longitudinal (z) head position information to be obtained. The advantage of a large lateral separation between a pair of sensors is that the information gathered from the sensors may enable a more accurate calculation of the longitudinal position to be determined. The advantage of a smaller lateral separation between a pair of sensors is that the sensors may have a smaller field of view. A separation between a pair of sensors in the range from 4 cm to 25 cm was found suitable for a single user autostereoscopic display device 1. Position sensor(s) 41 supplies the acquired position information to the operation unit 42 of the controller 40.

Operation unit 42 analyses the position information of the observer 90 supplied from the position sensor(s) 41, the position coordinates of the observer 90 (x, y, z) are calculated (step S2). Calculation of the position coordinates, for example, may be carried out by an eye-tracking system or face tracking system or head tracking system for detecting the eye position of the observer 90 by an image processing method. Calculation of the position coordinates, for example, may be performed by a head tracking system for detecting a position of the head of the observer 90 by infrared.

After determining the position information of the observer 90, the operation unit 42 determines the required slit pattern for the multi-region liquid crystal parallax barrier panel 20, 200 (step S3). In other words, the position coordinates of the viewer 90 are used to determine the slit position number (the slit position) for each region and each sub-region of the multi-region liquid crystal parallax barrier panel 20, 200. The slit pattern may be calculated from the position coordinates of the observer 90 (x, y, z) using a predetermined mathematical formula or algorithm. Alternatively, all slit patterns for the effective 3D viewing zone 71 may be stored in a memory such as for example a slit pattern look-up table (LUT) 45. In other words, the state (ON or OFF) of each independently addressable electrode pertaining to each region and each sub-region may be stored in a slit pattern look-up table (LUT) 45. If a slit pattern LUT 45 is used, the operation unit 42 retrieves the designated slit pattern for a given set of position coordinates of the observer 90 (x, y, z) from the slit position LUT 45. If a slit pattern LUT 45 is used, the operation unit 42 also retrieves the designated electrode states for each independently addressable electrode in each Sub-Region. If a time multiplexing method is used to obscure line artefacts, the electrode states for Bright Line addressing and Dark Line addressing, for each Sub-Region, are stored on the look-up table LUT 45. The optimum parameters for time period T, Bright Line period (BLT) and Dark Line period (DLT) used to obscure line artefacts may be stored on the look-up table LUT 45. If the optimum ratio of Bright Line period (BLT) and Dark Line period (DLT) is dependent upon viewing distance, then the ratio of Bright Line period (BLT) to Dark Line period (DLT) may be stored on the look-up table LUT 45 as a function of viewing distance.

The operation unit 42 may supply the switchable multi-region liquid crystal parallax barrier panel drive unit 43 with the slit pattern associated with the position coordinates of the observer 90 (x, y, z). The relationship between a given slit pattern and the voltage that is to be addressed to each of the individually addressable electrodes pertaining to the multi-region liquid crystal parallax barrier panel 20, 200 may also be stored on the slit pattern LUT. The operation unit 42 may supply the switchable multi-region liquid crystal parallax barrier panel drive unit 43 with information regarding the voltage that is to be addressed to each of the individually addressable electrode pertaining to the multi-region liquid crystal parallax barrier panel 20, 200. In general, the multi-region liquid crystal parallax barrier panel drive unit 43, based on information supplied from the calculating unit 42, drives the switchable liquid crystal parallax barrier panel 20 (step S4) to enable viewing of high quality 3D images for the desired range of head positions.

Figure 39:
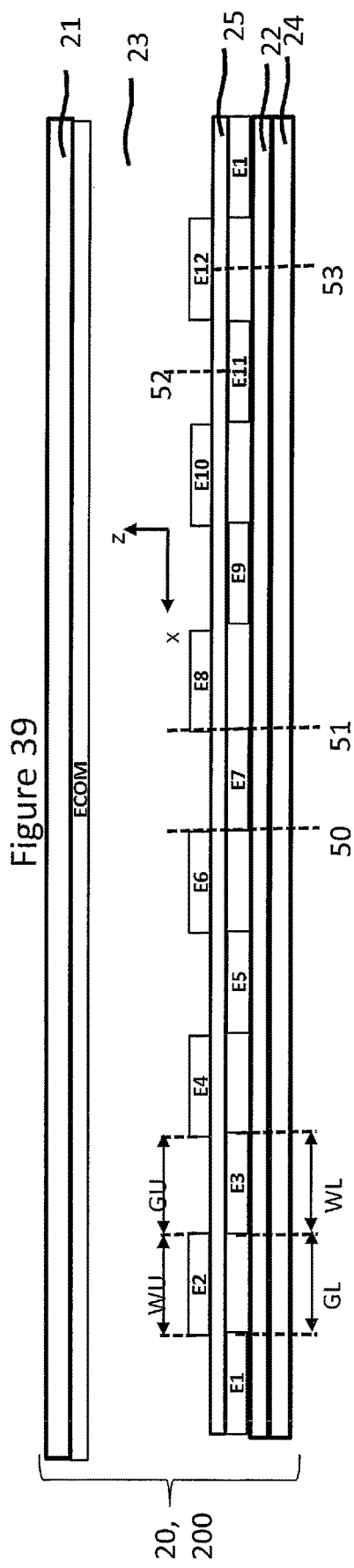
FIG. 39: Sectional view of a dual layer electrode structure

Alternative to FIG. 38, a further example of dual layer electrodes is shown in FIG. 39. With reference to FIG. 39, all the independently addressable electrodes each formed of electrode portions (E1 to E12) may be deposited in a cyclic arrangement in a dual electrode layer structure on the second substrate 22 only and a common electrode, ECOM, deposited on the first substrate 21. The first substrate 21 may be disposed on the viewing side 90 of the autostereoscopic display device 1 or the second substrate 22 may be disposed on the viewing side 90 of the autostereoscopic display device 1. A parallax barrier may be formed in the switchable liquid crystal parallax barrier panel 20 by application of voltages to the independently addressable electrodes (E1 to E12) and the common electrode, ECOM. In the embodiment of FIG. 39, at least some of the electrodes E1 to E12 are disposed in a first layer (the lower layer) upon the second substrate of the multi-region liquid crystal parallax barrier 20,200 to form a first subset of electrodes. An insulating layer 25 is disposed on top of the first subset of electrodes. At least some, and preferably all the remainder, of the electrodes E1 to E12 are disposed in a second layer (the upper layer) on top of the insulating layer 25 to form a second subset of electrodes. The electrodes in the second subset of electrodes are offset in the x-direction relative to the electrodes in the first subset of electrodes. None of the electrodes in the first subset of electrodes are electrically connected to any of the electrodes in the second subset of electrodes.

Figure 37:
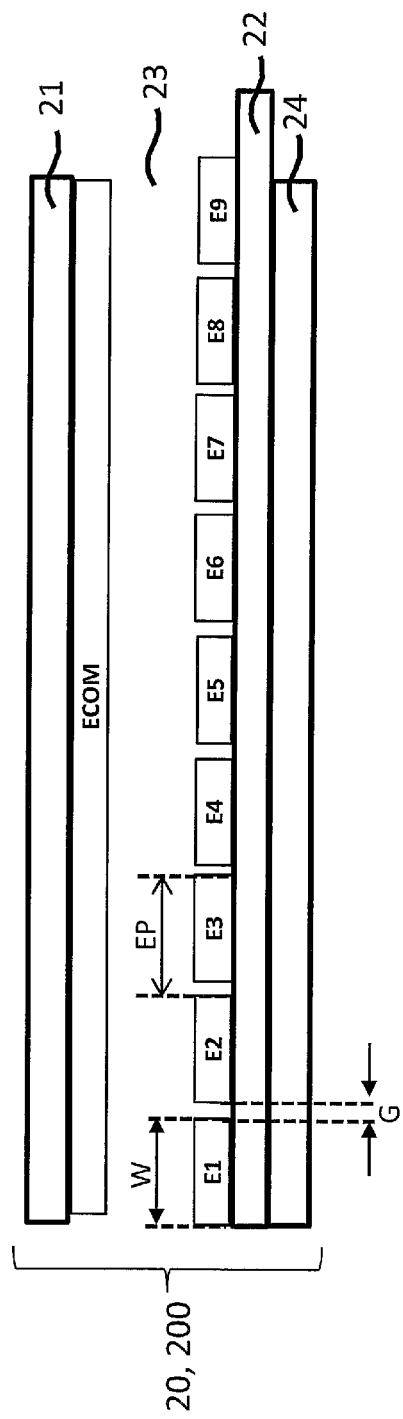
FIG. 37: Sectional view of a single layer electrode structure

It should be noted that the difference between the height over the substrate 22 of the second subset of electrodes (E2, E4 . . . ) and the height over the substrate 22 of the first subset of electrodes (E1, E3 . . . ) is a consequence of the need to provide the insulating layer 25 between the first subset of electrodes and the second subset of electrodes, while making the width of electrodes (E2, E4 . . . ) of the second subset equal to the gap between adjacent electrodes (E1, E3 . . . ) of the lower subset so as to eliminate the gap G that inevitably exists in the single layer electrode arrangement such as in FIG. 37. It will generally be desirable to minimise this height difference, subject to providing effective insulation between the two subsets of electrodes.

The insulating layer 25 may conformably coat the substrate and electrodes of the first subset (lower electrodes); for ease of understanding, a conformal coating is not shown in FIGS. 38 to 44.

With reference to FIG. 39, even numbered electrodes (E2, E4, E6 etc.) are designated the upper electrodes (the second subset) of the dual electrode layer structure. The electrodes pertaining to the upper layer have a width WU. The gap between adjacent electrodes on the upper layer is GU. With reference to FIG. 39, odd numbered electrodes (E1, E3, E5 etc.) are designated the lower electrodes (the first subset) of the dual electrode layer structure. The electrodes pertaining to the lower layer have a width WL. The gap between adjacent electrodes on the lower layer is GL. The electrodes pertaining to the upper layer may have the same width as electrodes pertaining to the lower layer (i.e. WU=WL) or the electrodes pertaining to the upper layer may have a different width to electrodes pertaining to the lower layer (i.e. WU≠WL). Electrode gaps pertaining to the upper layer may have the same width as electrode gaps pertaining to the lower layer (i.e. GU=GL) or the electrodes gaps pertaining to the upper layer may have a different width to electrode gaps pertaining to the lower layer (i.e. GU≠GL). The gap between two adjacent electrodes pertaining to the upper layer may have the same width as electrodes pertaining to the lower layer (i.e. GU=WL) or the gap between two electrodes pertaining to the upper layer may have a different width to the width of electrodes pertaining lower layer (i.e. GU≠WL). With reference to dashed line 50, the right hand edge of an electrode on the upper layer (E6 in this example) is preferably aligned with the left hand edge of an electrode on the lower layer (E7 in this example). With reference to dashed line 51, the left hand edge of an electrode on the upper layer (E8 in this example) is preferably aligned with the right hand edge of an electrode on the lower layer (E7 in this example). The dashed lines 50 and 51 show that there is no gap in the x-direction between the electrodes on the upper layer and the electrodes on the lower layer. A gap in the x-direction between the electrodes on the upper layer and the electrodes on the lower layer may increase optical crosstalk and therefore be detrimental to 3D performance. It is possible that GU, GL, WU and WL may vary as a function of distance across a region and/or the panel in the x-direction; if so, any relationship between electrode parameters such as WU=WL applies locally.

The electrodes in the upper layer and lower layer may be configured to overlap in the x direction in order to account for manufacturing tolerances and therefore ensure low optical crosstalk. In other words, it is desirable to ensure there is at least no gap in the x-direction between the electrodes on the upper layer and the electrodes on the lower layer. Within manufacturing tolerances, the centre (in the x-direction) of each electrode pertaining to the lower layer preferably aligns with the centre of a specific gap pertaining to the upper layer and is illustrated for example by the dashed line 52 on FIG. 39. Within manufacturing tolerances, the centre (in the x-direction) of each electrode pertaining to the upper layer preferably aligns with the centre of a specific gap pertaining to the lower layer and is illustrated for example by the dashed line 53 on FIG. 39.

Figure 40:
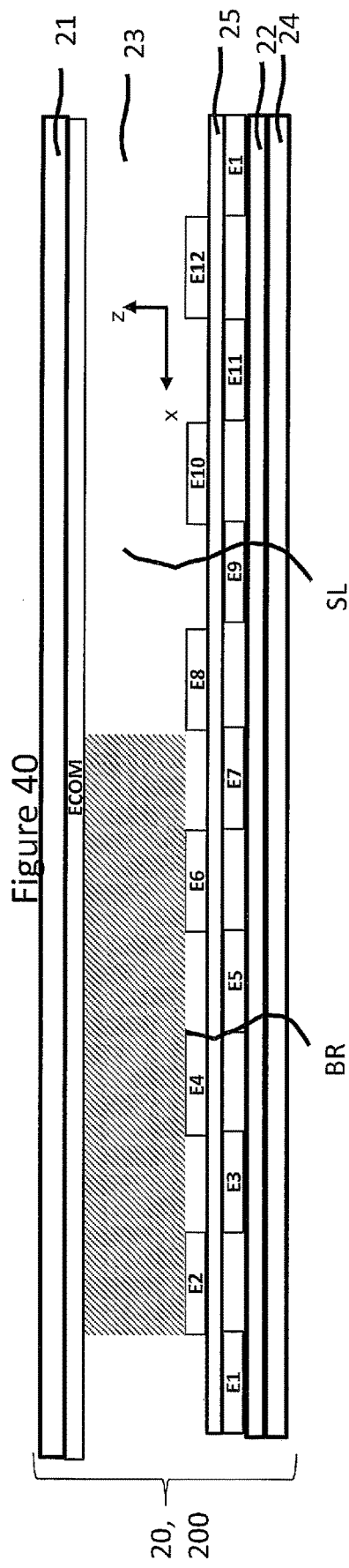
FIG. 40: A dual layer electrode liquid crystal parallax barrier

With reference to FIG. 40, a parallax barrier may be formed in the switchable liquid crystal parallax barrier panel 20 by application of voltages to the independently addressable electrodes (E1 to E12 and ECOM). FIG. 40 shows that a first voltage is applied to the electrodes E2, E3, E4, E5, E6 and E7 and a second voltage is applied to the remaining electrodes E1, E8, E9, E10, E11 E12 and ECOM. The voltage difference between the first voltage and the second voltage is sufficient to put the liquid crystal in a state that, in combination with the polarisers 14 (not shown) and 24, makes a barrier BR (non-transmissive area), whereas the effect of applying a net voltage of zero puts the liquid crystal in a state that, in combination with the polarisers 14 (not shown) and 24, makes a slit SL (transmissive area). FIG. 40 shows that the barrier position is controlled by electrodes E2, E3, E4, E5 E6, E7 and ECOM. FIG. 40 shows the barrier BR width is approximately equal to the slit SL width. (Only one barrier BR is shown in FIG. 40, but the left hand edge of the next barrier region will coincide with the right hand edge of the right-handmost electrode shown in FIG. 40 (the second electrode labelled "E1"). With reference to FIG. 40, as the barrier BR is translated in the x-direction (i.e. moved left or right) to accommodate for head movements and therefore provide high quality 3D viewing, 3 electrodes on the upper layer and 3 electrodes on the lower layer are always used to control the barrier BR position. Thus, to move the parallax barrier to the right by the smallest possible amount (i.e. by a single electrode position), the first voltage is applied to the electrodes E3, E4, E5, E6, E7 and E8 and the second voltage is applied to the remaining electrodes E1, E2, E9, E10, E11 E12 and ECOM, and so on.

In FIG. 40 a barrier region BR and a slit SL have the same width, equal to the width of 6 of the electrodes E1 to E12, giving a parallax barrier with a barrier:slit ratio of 1:1. The width of the barrier region is given by a multiple of (WL+WU), in this example 3WU+3WL, as is the width of a slit. In this case, the width a barrier region, and the width of a slit, remain constant as the parallax barrier is moved to the left or right by one or more electrode positions.

Figure 41:
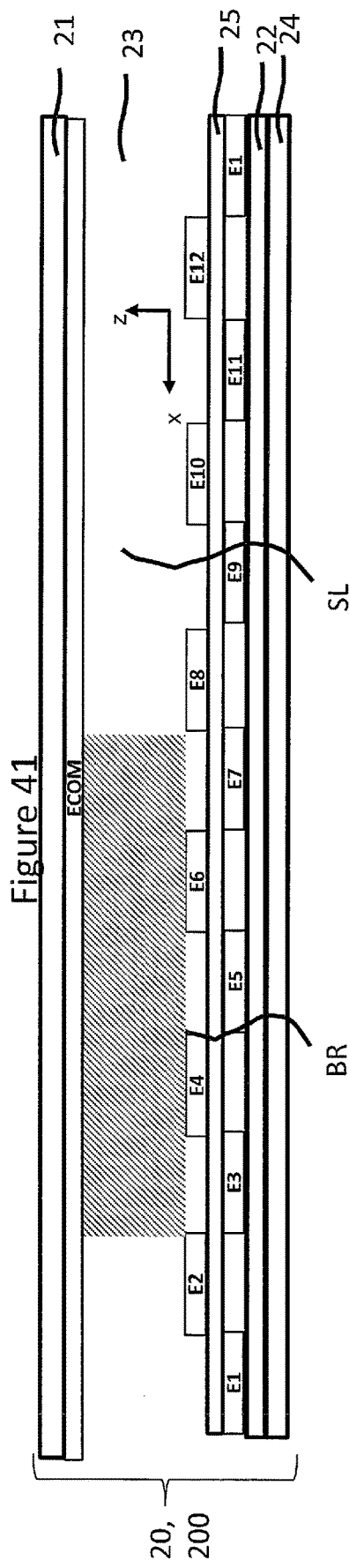
FIG. 41: A dual layer electrode liquid crystal parallax barrier

The invention may also provide a parallax barrier in which the barrier regions BR do not have the same width as the slits, and an example of this is shown in FIGS. 41 and 42. In this embodiment, however, careful design of the electrodes is needed to ensure that the width of the barrier regions and slits remains the same as the parallax barrier is moved to the left or right by one or more electrode positions.

FIG. 41 shows a first barrier position. FIG. 41 shows that a first voltage is applied to the electrodes E3, E4, E5, E6 and E7 and a second voltage is applied to the remaining electrodes E1, E2, E8, E9, E10, E11 E12 and ECOM. The width of the barrier BR is therefore controlled by 2 electrodes on the upper layer (E4 and E6) and 3 electrodes on the lower layer (E3, E5 and E7), and electrode ECOM. FIG. 42 shows a second barrier position that is adjacent to the first barrier position as shown in FIG. 41. With reference to FIG. 42, if the barrier BR is translated in the x-direction by the smallest increment (i.e. by a single electrode position) then the width of the barrier will now be determined by 3 electrodes on the upper layer (E4, E6 and E8) and 2 electrodes on the lower layer (E5 and E7). If GU=GL and WU=WL, then the width (in the x-direction) of the barrier BR shown in FIG. 41 may be different from the width (in the x-direction) of the barrier shown in FIG. 42. This may occur because fringe field effects will cause the electric field applied by an electrode of the upper layer (E4, E6) to "bulge out", so that the width of the liquid crystal region that is switched by an electrode of the upper layer is likely to be greater than the width of the electrode. However, the fringe fields from an electrode of the lower layer will be shielded by electrodes of the upper layer—for example, fringe fields from electrode E3 of the lower layer will be shielded by electrodes E2 and E4 of the upper layer—so that the width of the liquid crystal region that is switched by an electrode of the lower layer is likely to be less than the width of the liquid crystal region switched by an electrode of the upper layer. Thus, even though WU=WL the width of liquid crystal region that is switched by an electrode of the upper layer is likely to be greater than the width of the liquid crystal region that is switched by an electrode of the lower layer. As a result, a barrier region defined by three electrodes of the upper layer and two electrodes of the lower layer may have a different width to a barrier region defined by three electrodes of the lower layer and two electrodes of the upper layer, causing the barrier width (and the barrier:slit ratio) to change as the parallax barrier is moved to the right by one electrode position from FIG. 41 to FIG. 42. This difference in barrier width between FIG. 41 and FIG. 42 is not shown because the difference is relatively small. However, any difference in barrier width between FIG. 41 and FIG. 42 may have a significant impact on the quality of the 3D images. Optical simulations and experiments have confirmed that the width of the barrier in FIG. 41 may be less than the width of the barrier shown in FIG. 42.

As noted, it may be advantageous that the width of the barrier in FIG. 41 and the barrier in FIG. 42 are substantially the same (i.e. <~5 μm difference in width). LC optical simulation and experimental evidence suggest that the width of the barriers shown in FIG. 41 and FIG. 42 can be made to be substantially the same as one another by having a first electrode width for all electrodes pertaining to the upper layer and a second electrode width for all electrodes pertaining to the lower layer whereby the first and second widths are different (i.e. WU≠WL). More preferably, electrodes pertaining to the upper layer may have a smaller width than electrodes pertaining to the lower layer (i.e. WU<WL) and the gap width of the upper layer may be larger than the electrode width pertaining to the upper layer (i.e. GU>WU). In summary, WU<WL and GU>WU.

FIG. 43 illustrates the situation where WU<WL and there is no overlap in the x-direction between electrodes of the lower layer and electrodes of the upper layer. FIG. 44 illustrates the situation where WU<WL and the electrodes on the lower layer overlap the upper electrodes on the upper layer in the x-direction. (It should be understood that the electrode overlap in FIG. 44 is to allow for manufacturing tolerances. In principle there is no need for electrode overlap—if it were possible to manufacture the electrode arrangement shown in FIG. 43 such that the left hand edge of electrode Ei was exactly coincident with the right hand edge of electrode E(i−1), for all electrodes, the embodiment of FIG. 43 would give identical results to the embodiment of FIG. 44.)

With reference to FIG. 43 and FIG. 44, the first substrate 21 may be disposed on the viewing side 90 of the autostereoscopic display device 1 or the second substrate 22 may be disposed on the viewing side 90 of the autostereoscopic display device 1.

The overlap is illustrated by distance 54. FIG. 43 and FIG. 44 show that, within manufacturing tolerances, the centre (in the x-direction) of each electrode pertaining to the lower layer preferably aligns with the centre of a specific gap pertaining to the upper layer and is illustrated for example by the dashed line 52. FIG. 43 and FIG. 44 also show that within manufacturing tolerances, the centre (in the x-direction) of each electrode pertaining to the upper layer preferably aligns with the centre of a specific gap pertaining to the lower layer and is illustrated for example by the dashed line 53. By appropriate choice of the electrode dimensions, it is possible to effectively eliminate the effect of the different fringe fields for electrodes in the upper and lower layers, so that a barrier region defined by 3 electrodes of the upper layer and 2 electrodes of the lower layer has the same width as a barrier region defined by 2 electrodes of the upper layer and 3 electrodes of the lower layer.

As noted, in the embodiments of FIGS. 43 and 44 WU<WL and GU>WU, and in the embodiment of FIG. 44 WL>GU. It is possible that GU, GL, WU and WL may vary as a function of distance across a region and/or the panel in the x-direction, and if so these inequalities will be satisfied locally.

LC optical simulation suggests that to achieve the same barrier width for the conditions shown in FIG. 41 and FIG. 42, the optimum difference between the first electrode width for all upper layer electrodes and the second electrode width for all lower layer electrodes is a function of several parameters which may include:

1) The voltage applied to the upper electrodes and lower electrodes
2) LC alignment direction relative to the electrodes
3) LC material properties (elastic constants etc.)
4) The thickness of the LC layer (in z-direction)
5) The properties of the insulator layer 25 (thickness in z-direction, dielectric constants etc.).
6) Thickness of electrodes (in z-direction)

The optimum width of the lower electrode may also be a function of the width of the upper electrode and vice versa.

As an example and with reference to FIG. 41, FIG. 42 and FIG. 43, simulation suggests that to achieve equal barrier widths for adjacent parallax barrier positions, the upper electrodes width WU is in the range 3-9 μm (and in one preferred embodiment WU~6.5 μm), the lower electrodes width WL is in the range 6-18 μm (and in one preferred embodiment WL~10.5 μm), applied voltage to barrier electrodes=5V, LC adjacent to the upper electrodes is aligned in the x-direction, LC layer thickness=4.6 μm, SiNx dielectric spacer layer 25 thickness of 200 nm, thickness of ITO electrodes=50 nm). Note for this specific simulation, WU<WL, GU>WU and GU=WL and WU−WL=4.0 μm. Since the optimum width of the lower electrode may also be a function of the width of the upper electrode and vice versa, then the ranges quoted above may be larger or smaller for different widths of the upper and lower electrodes.

As a further example and with reference to FIG. 41, FIG. 42 and FIG. 43, simulation suggests that to achieve equal barrier widths for adjacent parallax barrier positions, the upper electrodes width WU is in the range 3-9 μm (and in one preferred embodiment WU~5.5 μm), the lower electrodes width WL is in the range 6-18 μm (and in one preferred embodiment WU~11.5 μm), applied voltage to barrier electrodes=5V, LC adjacent to the upper electrodes is aligned in the y-direction, LC layer thickness=4.6 μm, SiNx dielectric spacer layer 25 thickness of 200 nm, thickness of ITO electrodes=50 nm). Note for this specific simulation, WU<WL, GU>WU and GU=WL and WU−WL=6.0 μm. Since the optimum width of the lower electrode may also be a function of the width of the upper electrode and vice versa, then the ranges quoted above may be larger or smaller for different widths of the upper and lower electrodes.

With reference to FIG. 41, FIG. 42 and FIG. 43, experimental results suggest that the difference between upper electrode width and lower electrode width may be in the range 0.25 μm to 5 μm (i.e. WU<WL), and in one preferred embodiment may be in the range between 0.5 μm and 2 μm. As discussed above, simulation results suggest that the difference between upper electrode width and lower electrode width may be in the range 2 μm to 11 μm (i.e. WU<WL), and in one preferred embodiment may be in the range between 4 μm to 6 μm. Although experimental results differ slightly from simulation results, the general principle of WU<WL and GU>WU was found to be true for both simulation and experiment when optimising electrode design with reference to FIG. 41, FIG. 42, FIG. 43 and FIG. 44.

With reference to all embodiments shown in FIGS. 38 to 44, the patterned electrodes (E1, E2, E3 . . . E12) are disposed on the second substrate and the common electrode (ECOM) is disposed on the first substrate. It will be appreciated that, alternatively, the patterned electrodes may be disposed on the first substrate and the common electrode is disposed on the second substrate.

FIGS. 37-44 show only the electrode arrangement in the first region of the panel, and do not show the electrode arrangement in the second region of the panel or the electrodes of the compensation region that is between the first region of the panel and the second region of the panel. It may be preferable that the common electrode (ECOM) is disposed on a single substrate and is continuous (i.e. not patterned) between the first region of the panel, the compensation region between the first region of the panel and the second region of the panel, and the second region of the panel. Accordingly if, in the first region of the panel, the patterned electrodes (E1, E2, E3 . . . E12) are disposed on the second substrate and the common electrode (ECOM) is disposed on the first substrate, it is preferred that the patterned electrodes of the second region and the electrodes of the compensation region (between first region of the panel and the second region of the panel) are also disposed on the second substrate. If, conversely, in the first region of the panel, the patterned electrodes (E1, E2, E3 . . . E12) are disposed on the first substrate and the common electrode (ECOM) is disposed on the second substrate, it is preferred the patterned electrodes of the second region and the electrodes of the compensation region (between first region of the panel and the second region of the panel) are also disposed on the first substrate. In other words, the patterned electrodes of the second region and the electrodes of the compensation region are disposed on the same substrate as the patterned electrodes of the first region and the common electrode (ECOM) is not disposed on the same substrate as the patterned electrodes of the first region. However, the invention is in principle not limited to this.

The invention has been described with reference to examples of a switchable multi-region liquid crystal parallax barrier. In principle however the invention is not limited to a liquid crystal parallax barrier, and may be effected with other electro-optic materials.

The invention claimed is:

1. A reconfigurable parallax barrier panel comprising an electro-optic material;

a first region of the panel having a plurality of first electrodes located on opposite sides of the electro-optic material for addressing the electro-optic material, the first electrodes being independently addressable from one another and comprising two or more electrically connected electrode portions extending along a first direction and laterally spaced from one another along a second direction, the electrode portions of the first electrodes being arranged in a cyclic arrangement;

a second region of the panel having a plurality of second electrodes located on opposite sides of the electro-optic material for addressing the electro-optic material, the second electrodes being independently addressable of one another and of the first electrodes, and comprising two or more electrically connected electrode portions extending along the first direction and laterally spaced from one another along the second direction, the electrode portions of the second electrodes being arranged in a cyclic arrangement; and a first compensation region of the panel having a plurality of electrodes located on opposite sides of the electro-optic material for addressing the electro-optic material, the electrodes of the first compensation region extending along the first direction and being independently addressable of one another and of the first and second electrodes, the first compensation region being disposed laterally between the first region and the second region;

the parallax barrier panel being configured such that, in use, the first and second electrodes and the electrodes of the first compensation region are addressed on the basis of at least one received drive signal such that:

the first electrodes define, in the first region of the panel, a first parallax barrier array selected from a plurality of predetermined parallax barrier arrays;

the second electrodes define, in the second region of the panel, independently of the first parallax barrier array, a second parallax barrier array selected from the plurality of predetermined parallax barrier arrays; and the electrodes of the first compensation region define, dependent on the first parallax barrier array and on the second parallax barrier array, at least one slit and/or at least one barrier between the first region and the second region.

2. A panel as claimed in claim 1 wherein the first compensation region is adjacent to at least one of the first region and the second region.

3. A panel as claimed in claim 1 wherein, in a first mode, the first electrodes are addressed to define a first one of the predetermined parallax barrier arrays in the first region, the second electrodes are addressed to define a second, different one of the predetermined parallax barrier arrays in the second region, and the electrodes of the first compensation region define the at least one slit and/or at least one barrier to at least partially obscure any line artefact at the transition between the first one of the predetermined parallax barrier arrays and the second one of the predetermined parallax barrier arrays.

4. A panel as claimed in claim 3 wherein, in the first mode, the first one of the predetermined parallax barrier arrays defined in the first region has a first slit position number and the second one of the predetermined parallax barrier arrays defined in the second region has a second slit position number different to the first slit position number, and the electrodes of the first compensation region define the at least one slit and/or at least one barrier to compensate for the difference in slit position number between the first region and the second region.

5. A panel as claimed in claim 4 wherein, in the first mode, the first electrodes are addressed to define the first one of the predetermined parallax barrier arrays in the first region, the second electrodes are addressed to define the second one of the predetermined parallax barrier arrays in the second region, and the electrodes of the first compensation region are addressed such that a third parallax barrier is defined between the first region and the second region, wherein the third parallax barrier comprises a barrier and a slit, the slit being adjacent to the barrier, the barrier and the slit being contained at least partially within the first compensation region, and the slit having a width in the second direction that is less than the width of a slit that is wholly contained in the first or second region and/or the barrier having a width in the second direction that is larger than the width of a barrier that is wholly contained in the first or second region.

6. A panel as claimed in claim 5 wherein, in the first mode, the first electrodes are addressed to define the first one of the predetermined parallax barrier arrays in the first region, the second electrodes are addressed to define the second one of the predetermined parallax barrier arrays in the second region, and the electrodes of the first compensation region are addressed such that a fourth parallax barrier is defined between the first region and the second region, wherein the fourth parallax barrier comprises a barrier and a slit, the slit being adjacent to the barrier, the barrier and the slit being contained at least partially within the first compensation region, and the slit having a width in the second direction that is larger than the width of a slit that is wholly contained in the first or second region and/or the barrier having a width in the second direction that is less than the width of a barrier that is wholly contained in the first or second region.

7. A panel as claimed in claim 6 wherein one of the third and fourth parallax barriers has a barrier:slit ratio greater than the barrier:slit ratio of the predetermined parallax barrier arrays and the other of the third and fourth parallax barriers has a barrier:slit ratio lower than the barrier:slit ratio of the predetermined parallax barrier arrays.

8. A panel as claimed in claim 6 and adapted to define the third parallax barrier in a first time period and to define the fourth parallax barrier in a second time period.

9. A panel as claimed in claim 6 and adapted to define the third parallax barrier and the fourth parallax barrier in a time-alternating manner, the ratio of a time period within which the third parallax barrier is defined to a time period within which the fourth parallax barrier is defined being selected to reduce visibility of line artefacts at the transition between the first one of the predetermined parallax barrier arrays and the second one of the predetermined parallax barrier arrays.

10. A panel as claimed in claim 1 wherein
electrode portions of the first electrodes are arranged in groups in the cyclic arrangement;
a boundary group of electrode portions of the first electrodes, the boundary group being the group of electrode portions of the first electrodes nearest the first compensation region, is missing electrode portions of i (i≥1) of the first electrodes; and
at least some of the electrodes of the first compensation region are addressed based on the addressing of the first electrodes.

11. A panel as claimed in claim 10 wherein the first compensation region comprises i+j third electrodes.

12. A panel as claimed in claim 1 wherein
electrode portions of the second electrodes are arranged in groups in the cyclic arrangement;
a boundary group of electrode portions of the second electrodes, the boundary group being the group of electrode portions of the second electrodes nearest the first compensation region, is missing electrode portions of j (j≥1) of the second electrodes; and
at least some of the electrodes of the first compensation region are addressed based on the addressing of the second electrodes.

13. A panel as claimed in claim 12 wherein i=j.

14. A panel as claimed in claim 1 and configured, in a second mode, such that the first and second electrodes and the electrodes of the first compensation region are addressed on the basis of at least one received second drive signal such that the first and second electrodes define the same selected one of the plurality of predetermined parallax barrier arrays in the first region and in the second region, and the electrodes of the first compensation region define in the first compensation region a parallax barrier continuous with the first and second parallax barrier arrays.

15. A parallax barrier panel as claimed in claim 1 and configured, in a third mode, such that the first electrodes, the second electrodes and the electrodes of the first compensation region are addressed on the basis of at least one received third drive signal such that the panel provides no imaging function.

16. A panel as claimed in claim 1 and further comprising first and second substrates, the electro-optic material being disposed between the first substrate and the second substrate; wherein at least some of the first electrodes are disposed on the first substrate and at least others of the first electrodes are disposed on the second substrate.

17. A panel as claimed in claim 16 wherein the electrodes on the first substrate are offset along the second direction with respect to the electrodes on the second substrate.

18. A panel as claimed in claim 16 wherein the electrodes on the first substrate are offset along the second direction with respect to the electrodes on the second substrate by substantially half the electrode pitch.

19. A panel as claimed in claim 1 and further comprising first and second substrates, the electro-optic material being disposed between the first substrate and the second substrate; wherein each of the first electrodes is disposed on one of either the first substrate or second substrate.

20. A panel as claimed in claim 19, wherein a first subset of the first electrodes is disposed over one of either the first or second substrate, an insulating layer is disposed over the first subset of the first electrodes, and a second subset of the first electrodes is disposed over the insulating layer, first electrodes of the second subset being offset, in the second direction, from first electrodes of the first subset.

21. A panel as claimed in claim 20, wherein the width of a first electrode of the second subset is less than the width of a first electrode of the first subset, and the width of a first electrode of the second subset is less than the gap between two neighbouring first electrodes of the second subset.

22. A panel as claimed in claim 21, wherein the width of an electrode of the first subset of first electrodes is greater than the gap between two neighbouring electrodes of the second subset of first electrodes.

23. A panel as claimed in claim 1 wherein each first electrode portion comprises first and second parts offset from one another in the thickness direction of the panel and offset from one another in the second direction by a distance substantially equal to the electrode gap.

24. A display comprising: an image display panel; a parallax barrier panel disposed in an optical path through the image display panel, where the parallax barrier panel is a parallax barrier panel as defined in claim 1; and a control circuit for supplying at least one drive signal to the parallax barrier panel.

25. A display as claimed in claim 24 and further comprising one or more position sensors for determining the position of an observer.

26. A display as claimed in claim 25 wherein the control circuit is adapted to address the first and second electrodes in dependence on a determined position of the observer.

27. A display as claimed in claim 24,
wherein the first region comprises 12 first electrodes;
wherein the second region comprises 12 second electrodes;
wherein the parallax barrier panel further comprises third to ninth regions, the third to ninth regions having 12 third to ninth electrodes respectively for addressing the electro-optic material, the electrodes of the $p^{th}$ ($1 \leq p \leq 9$) region being independently addressable of one another and of the electrodes of the $p'^{th}$ ($1 \leq p' \leq 9$, $p' \neq p$) region, and the third to ninth electrodes comprising two or more electrically connected electrode portions extending along the first direction and laterally spaced from one another along the second direction, the electrode portions of the electrodes of the $p^{th}$ ($1 \leq p \leq 9$) region being arranged in a cyclic arrangement;
wherein the first compensation region of the panel comprises 8 independently-addressable electrodes for addressing the electro-optic material;
wherein the parallax barrier panel further comprises second to eighth compensation regions each having eight electrodes for addressing the electro-optic material, the electrodes of the $p^{th}$ compensation region extending along the first direction and laterally spaced from one another along the second direction, being independently addressable of one another, being addressable independently of the electrodes of the other compensation regions, and being addressable independently of the first to ninth electrodes, and the $p^{th}$ compensation region being disposed between the $p^{th}$ region and the $(p+1)^{th}$ region; and
wherein the drive circuit is adapted to address the electrodes of the pth compensation region dependent on the addressing of the $p^{th}$ region and on the addressing of the $(p+1)^{th}$ region.

* * * * *